US008085924B2

(12) United States Patent
Shaffer et al.

(10) Patent No.: US 8,085,924 B2
(45) Date of Patent: *Dec. 27, 2011

(54) ONE NUMBER, INTELLIGENT CALL PROCESSING SYSTEM

(75) Inventors: James D. Shaffer, Rancho Santa Fe, CA (US); George G. Moore, Great Falls, VA (US)

(73) Assignee: Targus Information Corporation, Vienna, VA (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/613,984

(22) Filed: Dec. 20, 2006

(65) Prior Publication Data

US 2007/0127657 A1 Jun. 7, 2007

Related U.S. Application Data

(63) Continuation of application No. 10/732,147, filed on Dec. 9, 2003, now Pat. No. 7,167,553, which is a continuation of application No. 10/082,669, filed on Feb. 22, 2002, now Pat. No. 6,661,884, which is a continuation of application No. 09/690,661, filed on Oct. 17, 2000, now Pat. No. 6,381,324, which is a continuation of application No. 09/477,181, filed on Jan. 4, 2000, now Pat. No. 6,185,290, which is a continuation of application No. 09/211,475, filed on Dec. 14, 1998, now Pat. No. 6,058,179, which is a continuation of application No. 08/748,192, filed on Nov. 12, 1996, now Pat. No. 5,901,214.

(60) Provisional application No. 60/019,526, filed on Jun. 6, 1996.

(51) Int. Cl.
*H04M 7/00* (2006.01)

(52) U.S. Cl. ......... 379/221.14; 379/211.02; 379/220.01; 379/88.01; 379/88.13; 379/219

(58) Field of Classification Search ............ 379/211.02, 379/220.01, 221, 221.14, 272, 88.01, 88.13, 379/219

See application file for complete search history.

(56) References Cited

U.S. PATENT DOCUMENTS

| 1,737,520 A | 11/1929 | Richardson |
| 2,455,209 A | 11/1948 | Anderson |
| 2,455,210 A | 11/1948 | Anderson |
| 3,614,328 A | 10/1971 | McNaughton et al. |

(Continued)

FOREIGN PATENT DOCUMENTS

CA 2056203 11/1991

(Continued)

OTHER PUBLICATIONS

"AT&T Set for Frame-Relay—American Tel & Tel: To unveil several data services, including frame-relay & low-speed dial-up", CommunicationsWeek, ISSN: 0764-8121, Nov. 18, 1991, p. 1 (Article).

(Continued)

*Primary Examiner* — Ahmad Matar
*Assistant Examiner* — Antim Shah
(74) *Attorney, Agent, or Firm* — Procopio, Cory, Hargreaves & Savitch, LLP

(57) ABSTRACT

A one number, multi-application, intelligent call processing system provides service benefits to a caller, a servicing location and/or a vanity number advertiser during a call, parallel to the call and/or post call in an integrated common architecture. The system utilizes VRU technology in conjunction with the national telecommunications network connected via Computer Telephone Integration (CTI) to a virtual telephone number database containing a nationwide master list of telephone numbers with attribute data items associated by Spatial Key linkage to each telephone number. The process of the invention is initiated by a caller dialing a selected telephone number to request information and/or services. Based on the number dialed, a caller or network provided ten-digit telephone number and VRU prompted for and received caller input, the system retrieves the application requested data from the virtual telephone number database and provides it to the network.

63 Claims, 28 Drawing Sheets

U.S. PATENT DOCUMENTS

| | | |
|---|---|---|
| 3,881,060 A | 4/1975 | Connell et al. |
| 3,928,724 A | 12/1975 | Byram et al. |
| 3,968,573 A | 7/1976 | Poliniere |
| 4,139,739 A | 2/1979 | von Meister et al. |
| 4,164,025 A | 8/1979 | Dubnowski et al. |
| 4,178,476 A | 12/1979 | Frost |
| 4,191,860 A | 3/1980 | Weber |
| 4,310,726 A | 1/1982 | Asmuth |
| 4,310,727 A | 1/1982 | Lawser |
| 4,311,876 A | 1/1982 | Endo et al. |
| 4,313,035 A | 1/1982 | Jordan et al. |
| 4,341,929 A | 7/1982 | Alexander et al. |
| 4,484,192 A | 11/1984 | Seitz et al. |
| 4,577,062 A | 3/1986 | Hilleary et al. |
| 4,608,460 A | 8/1986 | Carter et al. |
| 4,611,094 A | 9/1986 | Asmuth et al. |
| 4,611,096 A | 9/1986 | Asmuth et al. |
| 4,645,873 A | 2/1987 | Chomet |
| 4,672,660 A | 6/1987 | Curtin |
| 4,737,916 A | 4/1988 | Ogawa et al. |
| 4,737,927 A | 4/1988 | Hanabusa et al. |
| 4,737,983 A | 4/1988 | Frauenthal et al. |
| 4,744,033 A | 5/1988 | Ogawa et al. |
| 4,757,267 A | 7/1988 | Riskin |
| 4,760,531 A | 7/1988 | Yasui et al. |
| 4,761,742 A | 8/1988 | Hanabusa et al. |
| 4,766,555 A | 8/1988 | Bennett |
| 4,782,509 A | 11/1988 | Shepard |
| 4,788,643 A | 11/1988 | Trippe et al. |
| 4,797,818 A | 1/1989 | Cotter |
| 4,805,119 A | 2/1989 | Maeda et al. |
| 4,817,043 A | 3/1989 | Brown |
| 4,827,500 A | 5/1989 | Binkerd et al. |
| 4,843,569 A | 6/1989 | Sawada et al. |
| 4,870,576 A | 9/1989 | Tornetta |
| 4,873,513 A | 10/1989 | Soults et al. |
| 4,908,850 A | 3/1990 | Masson et al. |
| 4,924,491 A | 5/1990 | Compton et al. |
| 4,924,510 A | 5/1990 | Le |
| 4,937,572 A | 6/1990 | Yamada et al. |
| 4,942,599 A | 7/1990 | Gordon et al. |
| 4,951,212 A | 8/1990 | Kurihara et al. |
| 4,953,204 A | 8/1990 | Cuschleg, Jr. et al. |
| 4,954,958 A | 9/1990 | Savage et al. |
| 4,974,170 A | 11/1990 | Bouve et al. |
| 4,987,587 A | 1/1991 | Jolissaint |
| 5,001,710 A | 3/1991 | Gawrys et al. |
| 5,008,930 A | 4/1991 | Gawrys et al. |
| RE1,470 E | 5/1991 | Riskin |
| 4,757,267 A | 5/1991 | Riskin |
| 5,018,191 A | 5/1991 | Catron et al. |
| 5,023,904 A | 6/1991 | Kaplan et al. |
| 5,027,384 A | 6/1991 | Morganstein |
| 5,029,196 A | 7/1991 | Morganstein |
| 5,032,989 A | 7/1991 | Tornetta |
| 5,033,079 A | 7/1991 | Catron et al. |
| 5,036,535 A | 7/1991 | Gechter et al. |
| 5,043,736 A | 8/1991 | Darnell et al. |
| 5,046,088 A | 9/1991 | Margulies |
| 5,095,505 A | 3/1992 | Finucane et al. |
| 5,097,528 A | 3/1992 | Gursahaney et al. |
| 5,109,399 A | 4/1992 | Thompson |
| 5,136,636 A | 8/1992 | Wegrzynowicz |
| 5,148,522 A | 9/1992 | Okazaki |
| 5,161,180 A | 11/1992 | Chavous |
| 5,163,087 A | 11/1992 | Kaplan |
| 5,168,515 A | 12/1992 | Gechter et al. |
| 5,179,652 A | 1/1993 | Rozmanith et al. |
| 5,197,009 A | 3/1993 | Hoffman, Jr. et al. |
| 5,214,688 A | 5/1993 | Szlam et al. |
| 5,235,630 A | 8/1993 | Moody et al. |
| 5,235,633 A | 8/1993 | Dennison et al. |
| 5,237,323 A | 8/1993 | Saito et al. |
| 5,237,499 A | 8/1993 | Garback |
| 5,253,288 A | 10/1993 | Frey et al. |
| 5,255,183 A | 10/1993 | Katz |
| 5,259,023 A | 11/1993 | Katz |
| 5,287,498 A | 2/1994 | Perelman et al. |
| 5,289,195 A | 2/1994 | Inoue |
| 5,289,371 A | 2/1994 | Abel et al. |
| 5,289,527 A | 2/1994 | Tiedemann, Jr. |
| 5,293,163 A | 3/1994 | Kakihara et al. |
| 5,299,132 A | 3/1994 | Wortham |
| 5,311,572 A | 5/1994 | Friedes et al. |
| 5,329,108 A | 7/1994 | Lamoure |
| 5,329,578 A | 7/1994 | Brennan et al. |
| 5,333,266 A | 7/1994 | Boaz et al. |
| 5,334,974 A | 8/1994 | Simms et al. |
| 5,353,023 A | 10/1994 | Mitsugi |
| 5,361,295 A | 11/1994 | Solomon et al. |
| 5,379,337 A | 1/1995 | Castillo et al. |
| 5,379,421 A | 1/1995 | Palazzi, III et al. |
| 5,381,338 A | 1/1995 | Wysocki et al. |
| 5,389,935 A | 2/1995 | Drouault et al. |
| 5,390,232 A | 2/1995 | Freeman et al. |
| 5,396,254 A | 3/1995 | Toshiyuki |
| 5,402,474 A | 3/1995 | Miller et al. |
| 5,414,432 A | 5/1995 | Penny, Jr. et al. |
| 5,422,809 A | 6/1995 | Griffin et al. |
| 5,430,782 A | 7/1995 | Brady et al. |
| 5,432,841 A | 7/1995 | Rimer |
| 5,436,965 A | 7/1995 | Grossman et al. |
| 5,457,738 A | 10/1995 | Sylvan |
| 5,465,286 A | 11/1995 | Clare et al. |
| 5,465,290 A | 11/1995 | Hampton et al. |
| 5,470,233 A | 11/1995 | Fruchterman et al. |
| 5,471,392 A | 11/1995 | Yamashita |
| 5,479,488 A | 12/1995 | Lennig et al. |
| 5,481,594 A | 1/1996 | Shen et al. |
| 5,481,603 A | 1/1996 | Gutierrez et al. |
| 5,488,652 A | 1/1996 | Bielby et al. |
| 5,506,897 A | 4/1996 | Moore et al. |
| 5,524,202 A | 6/1996 | Yokohama |
| 5,528,518 A | 6/1996 | Bradshaw et al. |
| 5,528,672 A | 6/1996 | Wert |
| 5,533,107 A | 7/1996 | Irwin et al. |
| 5,539,809 A | 7/1996 | Mayer et al. |
| 5,543,788 A | 8/1996 | Mikuni |
| 5,546,445 A | 8/1996 | Dennison et al. |
| 5,548,637 A | 8/1996 | Heller et al. |
| 5,553,119 A | 9/1996 | McAllister et al. |
| 5,555,299 A | 9/1996 | Maloney et al. |
| 5,559,707 A | 9/1996 | DeLorme et al. |
| 5,570,283 A | 10/1996 | Shoolery et al. |
| 5,584,025 A | 12/1996 | Keithley et al. |
| 5,588,048 A | 12/1996 | Neville |
| 5,590,186 A | 12/1996 | Liao et al. |
| 5,592,541 A | 1/1997 | Fleischer, III et al. |
| 5,596,634 A | 1/1997 | Fernandez et al. |
| 5,602,901 A | 2/1997 | Redden et al. |
| 5,633,922 A | 5/1997 | August et al. |
| 5,635,953 A | 6/1997 | Hayami et al. |
| 5,640,319 A | 6/1997 | Beuning et al. |
| 5,642,410 A | 6/1997 | Walsh et al. |
| 5,646,977 A | 7/1997 | Koizumi |
| 5,652,784 A | 7/1997 | Blen et al. |
| 5,666,400 A | 9/1997 | McAllister et al. |
| 5,668,852 A | 9/1997 | Holmes |
| 5,680,446 A | 10/1997 | Fleischer, III et al. |
| 5,680,448 A | 10/1997 | Becker |
| 5,682,525 A | 10/1997 | Bouve et al. |
| 5,684,870 A | 11/1997 | Maloney et al. |
| 5,692,038 A | 11/1997 | Kraus et al. |
| 5,710,886 A | 1/1998 | Christensen et al. |
| 5,715,299 A | 2/1998 | Mosley et al. |
| 5,721,832 A | 2/1998 | Westrope et al. |
| 5,724,408 A | 3/1998 | Morganstein |
| 5,727,057 A | 3/1998 | Emery et al. |
| 5,727,201 A | 3/1998 | Burke |
| 5,729,600 A | 3/1998 | Blaha et al. |
| 5,729,731 A | 3/1998 | Yajima et al. |
| 5,734,709 A | 3/1998 | DeWitt et al. |
| 5,754,850 A | 5/1998 | Janssen |
| 5,768,360 A | 6/1998 | Reynolds et al. |
| 5,771,283 A | 6/1998 | Chang et al. |
| 5,784,059 A | 7/1998 | Morimoto et al. |
| 5,796,634 A | 8/1998 | Craport et al. |

| | | | |
|---|---|---|---|
| 5,796,813 A | 8/1998 | Sonnenberg | |
| 5,802,163 A | 9/1998 | Miloslavsky | |
| 5,802,513 A | 9/1998 | Bowie, III | |
| 5,805,688 A | 9/1998 | Gillespie et al. | |
| 5,805,689 A | 9/1998 | Neville | |
| 5,812,654 A | 9/1998 | Anderson et al. | |
| 5,812,950 A | 9/1998 | Tom | |
| 5,815,551 A | 9/1998 | Katz | |
| 5,822,416 A | 10/1998 | Goodacre et al. | |
| 5,839,088 A | 11/1998 | Hancock et al. | |
| 5,848,131 A | 12/1998 | Shaffer et al. | |
| 5,848,373 A | 12/1998 | DeLorme et al. | |
| 5,850,433 A | 12/1998 | Rondeau | |
| 5,852,809 A | 12/1998 | Abel et al. | |
| RE36,111 E | 2/1999 | Neville | |
| 5,867,563 A | 2/1999 | Kato et al. | |
| 5,878,126 A | 3/1999 | Velamuri et al. | |
| 5,894,507 A | 4/1999 | Hatamura | |
| 5,901,214 A * | 5/1999 | Shaffer et al. | 379/211.02 |
| 5,905,773 A | 5/1999 | Wong | |
| 5,907,608 A | 5/1999 | Shaffer et al. | |
| 5,910,982 A | 6/1999 | Shaffer et al. | |
| 5,930,764 A | 7/1999 | Melchione et al. | |
| 5,940,793 A | 8/1999 | Attwater et al. | |
| 5,946,618 A | 8/1999 | Agre et al. | |
| 5,948,041 A | 9/1999 | Abo et al. | |
| 5,948,061 A | 9/1999 | Merriman et al. | |
| 5,956,397 A | 9/1999 | Shaffer et al. | |
| 5,961,569 A | 10/1999 | Craport et al. | |
| 5,961,572 A | 10/1999 | Craport et al. | |
| 5,963,861 A | 10/1999 | Hanson | |
| 5,966,695 A | 10/1999 | Melchione et al. | |
| 5,970,131 A | 10/1999 | Sonnenberg | |
| 5,974,133 A | 10/1999 | Fleischer, III et al. | |
| 5,978,747 A | 11/1999 | Craport et al. | |
| 5,982,868 A | 11/1999 | Shaffer et al. | |
| 5,991,739 A | 11/1999 | Cupps et al. | |
| 6,035,280 A | 3/2000 | Christensen | |
| 6,041,103 A | 3/2000 | La Porta et al. | |
| 6,047,236 A | 4/2000 | Hancock et al. | |
| 6,058,179 A | 5/2000 | Shaffer et al. | |
| 6,075,853 A | 6/2000 | Boeckman et al. | |
| 6,078,657 A | 6/2000 | Alfieri et al. | |
| 6,085,085 A | 7/2000 | Blakeney, II et al. | |
| 6,091,810 A | 7/2000 | Shaffer et al. | |
| 6,097,802 A | 8/2000 | Fleischer, II et al. | |
| 6,108,533 A | 8/2000 | Brohoff | |
| 6,108,650 A | 8/2000 | Musk et al. | |
| 6,148,289 A | 11/2000 | Virdy | |
| 6,154,535 A | 11/2000 | Velamuri et al. | |
| 6,163,597 A | 12/2000 | Voit | |
| 6,167,128 A | 12/2000 | Fuller et al. | |
| 6,185,282 B1 | 2/2001 | Boeckman et al. | |
| 6,185,290 B1 | 2/2001 | Shaffer et al. | |
| 6,202,023 B1 | 3/2001 | Hancock et al. | |

FOREIGN PATENT DOCUMENTS

| | | |
|---|---|---|
| EP | 0493896 A2 | 5/1991 |
| EP | 0 498 594 A2 | 8/1992 |
| JP | 01258183 A1 | 10/1989 |
| JP | 03070075 A1 | 3/1991 |
| JP | 03116379 A1 | 5/1991 |
| JP | 03196366 A1 | 8/1991 |
| JP | 3235562 | 10/1991 |
| JP | 05027676 A1 | 2/1993 |
| JP | 5165401 | 7/1993 |
| JP | 5191504 | 7/1993 |
| JP | 5300061 | 11/1993 |
| WO | WO 92/14215 | 8/1992 |
| WO | WO 94/27398 | 11/1994 |
| WO | WO 94/29808 | 12/1994 |
| WO | WO 94/29995 | 12/1994 |
| WO | WO 97/50002 | 12/1997 |

OTHER PUBLICATIONS

"AT&T Unveils Frame Relay: Data Service to be Offered Outside U.S. Next Year", Communications Week International, ISSN: 1042-6086, Dec. 16, 1991, New York, p. 21 (Article).

"About Touch New York", Touch City Guide Network, Jul. 22, 1993, 1 page (Advertisement).

"Access Idaho", Official Idaho Recreation Guide, 1992, 7 pages (Article).

Advanced Communication Design, Inc. Letter and Brochure, Jun. 26, 1991, 7 pages.

American National Standards Institute, ANSI TI.110-1992, "American National Standard for Telecommunications—Signalling System No. 7 (SS7)—General Information", Jun. 2, 1992, New York, New York, 79 pages.

American National Standards Institute, ANSI TI.609-1999, "American National Standard for Telecommunications—Interworking between the ISDN User-Network Interface Protocol and the Signalling System No. 7 ISDN User Part", May 24, 1999, New York, New York, 84 pages.

American National Standards Institute, ANSI TI.112-1996, "American National Standard for Telecommunications—Signalling System No. 7—Signalling Connection Control Part (SCCP)", TOC and pp. 33-34, 46-52, Jan. 12, 1996, New York, New York.

American National Standards Institute, ANSI TI.113-1995, "American National Standard for Telecommunications—Signalling System No. 7 (SS7)—Integrated Services Digital Network (ISDN) User Part", TOC, Jan. 3, 1995, New York, New York, 4 pages.

American National Standards Institute, ANSI TI.609-1999, "American National Standard for Telecommunications—Interworking between the ISDN User-Network Interface Protocol and the Signalling System No. 7 ISDN User Part", TOC, May 24, 1999, New York, New York, 6 pages.

American National Standards Institute, ANSI TI.621-1992, "American National Standard for Telecommunications—Integrated Services Digital Network (ISDN) User-to-User Signaling Supplementary Service", Sep. 1, 1992, New York, New York, 41 pages.

"Ancient Pompeii Culture Revealed by GIS", GIS World, Dec. 1990, Fort Collins, CO, pp. 27-31 (Article).

Anderson et al., "Design Considerations for Computer-Based Interactive Map Display Systems", Computer Graphics Hardware, Santa Monica, CA, 1980, pp. 9-34.

Angus, "Map Software; CityGuide Takes the Guesswork Out of Business Travel", InfoWorld, Mar. 1, 1993, p. 81.

Applied Telematics, Inc., "InstaLink," brochure.

Atai et al., "Architectural Solutions to Internet Congestion Based on SS7 and Intelligent Network Capabilities", Telcordia Technologies, pp. 1-19.

Bell Communications Research, Bellcore, Generic Requirements GR-1298-CORE, Issue 2, "Advanced Intelligent Network (AIN) Switching Systems Generic Requirements", TOC and pp. 1-9-1-10, 5-111-5-131, Dec. 1994, 31 pages.

Bell Communications Research, Bellcore, GR-1229-CORE, Issue 3, "AINGR: Switch—Intelligent Peripheral Interface (IPI) Non-Call Associted (NCA) Signaling for BRI", pp. 6-1-6-34, Sep. 1997, Revision 1, Oct. 1998, 34 pages.

Bell Communications Research, Bellcore, GR-1298-CORE, Issue 4, "AINGR: Switching Systems SSP Processing of SCP/Adjunct Messages Create Call", pp. 5-133-5-154, Sep. 1997, Revision 1, Oct. 1998, 22 pages.

Bell Communications Research, Bellcore, Special Report SR-NPL-001555, Issue 1, "Advanced Intelligent Network Release 1 Baseline Architecture", TOC and pp. 4-22-4-23, Mar. 5-20, 1990, 7 pages.

Bell Communications Research, Bellcore, Special Report SR-NPL-001623, Issue 1, "Advanced Intelligent Network Release 1 Network and Operations Plan", TOC and pp. 3-23-3-24, Jun. 1990, 6 pages.

Bell Communications Research, Bellcore, Technical Reference TR-NWT-001284 Issue 1, "Advanced Intelligent Network (AIN) 0.1 Switching Systems Generic Requirements", Aug. 1992, 337 pages.

Benning, "Digital Maps on Compact Disc", SAE Technical Paper Series, International Congress and Exposition, Detroit, Michigan, Feb. 24-28, 1986, pp. 115-120.

Berman et al., "Evolvability of the Advanced Intelligent Network", IEEE International Conference on Communications, ICC '91, Conference Record, vol. 2 of 3, pp. 622-626.

Berman, "Advanced Intelligent Network: 1993 Snapshot", Globecom '90 IEEE Global Telecommunications Conference & Exhibition, vol. 3 of 3, Dec. 2-5, 1990, pp. 1628-1632.

Bierman, "Distributed Network Control", International Switching Symposium 1987, Mar. 20, 1987 vol. 4 of 4, Phoenix, AZ, pp. 952-958.

Bowers, "Alternatives for the Transport of ISDN Customer Network Management Messages", IEEE Globecom '89, Dallas, Texas, Nov. 27-30, 1989,Conference Record vol. 2 of 3, pp. 0856-0860.

Bowyer et al., "Intelligent Network Services for Data Customers" Supercomm ICC '90 Conference Record, vol. 2 of 4, pp. 602-606.

Bowyer et al., "The Line Information Data Base", International Switching Symposium, vol. 4 of 4, 1987, Phoenix AZ, pp. 959-963.

Boyles et al., "Common Channel Signaling: The Nexus of an Advanced Communications Network", IEEE Communications Magazine, Jul. 1990, pp. 57-63.

Braegas, "Function, Equipment, and Field Testing of a Route Guidance and Information System for Drivers (ALI)" IEEE Transactions on Vehicular Technology, May 1980, vol. VT 29, No. 2, pp. 216-225.

Business GEOgraphics, vol. 4 No. 5, May 1996, http://www.geoplace.com/by/1996/0596/0596toc.asp (Table of Contents).

Caliper Corporation Brochure, "TransCAD Transportation GIS Software", undated, Newton, Mass., 24 pages.

Capell et al., "Evolution of the North Carolina Information Highway", IEEE Network, Nov./Dec. 1994, pp. 64-70.

Cartography Specialty Group, "Words From the Chair", vol. 17, No. 1, Fall 1996, http://www.csun.edu~hfgeg003/csg/fall96.html.

Castle, III, "Profiting From a Geographic Information System", Stet, ed, 1993 GIS World Book, Fort Collins, CO, pp. 23, 30, 31, 85, 90.

Chiou et al., "FNMS Communications Platform", IEEE International Conference on Communications, ICC 91, Conference Record, vol. 3 of 3, Jun. 1991, pp. 1586-1590.

Chow et al., "CCITT Signalling System No. 7, The Backbone for Intelligent Network Services", Globecom Tokyo '87, Nov. 15-18, 1987 Tokyo, Japan, pp. 40.1.1-40.1.5.

"Computer Navigation Coming to Law Enforcement", Law and Order, vol. 33, Feb. 1985, pp. 24 et seq. (Article).

Cooke, "Map Storage on CD-ROM", BYTE Jul. 1987, pp. 129-130, 132, 134-136, 138.

Corn et al., "Service Deployment in the Advanced Intelligent Network Moving Toward Implementation", ISS '92, Oct. 1992, vol. 2, pp. 182-186.

"Covia Partnership", GEO Systems, Lancaster, PA, undated, 1 page (Brochure).

Crabb, MapInfo 2.0; "The Latest Release of MapInfo Goes to the Head of the Class for Geographic-Data Mapping"; MacUser, Aug. 1993; vol. 9; No. 8; p. 65; ISSN: 0884-0997; Troy, NY.

Croswell, "Developments in Data Transfer Between Geographic Information Systems and Mainframe Computer Databases", Papers From the 1986 Annual Conference of the Urban and Regional Information Systems Association; Conference Theme: What's the Difference?, vol. II, Denver, CO, pp. 47-61.

Dawson, "The Smart Way to Handle Incoming Callers", publication unknown, undated, 8 pages.

De Wiele et al., "Meeting Network Management Challenges: Customization, Integration and Scalability", IEEE ICC '93, Geneva, May 23-26, 1993, Geneva, Switzerland, Technical program, Conference Record vol. 2 of 3, pp. 1197-1204.

Defendant Vicinity Corporation and Pizza Hut, Inc.'s Notice of Declaration of Rodney Vignes in Support of Defendants' Defenses and Counterclaims of "On-Sale Bar" and Inequitable Conduct and Declaration of Rodney Vignes (May 23, 2002) in *Murex Securities Limited and Murex Licensing Corporation v. Vicinity Corporation and Pizza Hut*, U.S. District Court for the Eastern District of Virginia, Civil Action No. 01-1895-A.

Defendant Vicinity Corporation and Pizza Hut, Inc.'s Notice of Declaration of Brian Follett in Support of Defendants' Defenses and Counterclaims of Invalidity and Declaration of Brian L. Follett (May 23, 2002) in *Murex Securities Limited and Murex Licensing Corporation v. Vicinity Corporation and Pizza Hut*, U.S. District Court for the Eastern District of Virginia, Civil Action No. 01-1895-A.

Deposition Transcript of Donald Edward Blanchard, Jr., *Murex Securities Limited and Murex Licensing Corporation v. Vicinity Corporation and Pizza Hut*, U.S. District Court for the Eastern District of Virginia, Civil Action No. 01-1895-A, May 10, 2002.

Deposition Transcript of John Matson, *Murex Securities Limited and Murex Licensing Corporation v. Vicinity Corporation and Pizza Hut*, U.S. District Court for the Eastern District of Virginia, Civil Action No. 01-1895-A, May 7, 2002.

Deposition Transcript of Rodney E. Vignes, *Murex Securities Limited and Murex Licensing Corporation v. Vicinity Corporation and Pizza Hut*, U.S. District Court for the Eastern District of Virginia, Civil Action No. 01-1895-A, Sep. 26, 2002.

Deposition Transcript of Thomas Tulinski, *Murex Securities Limited and Murex Licensing Corporation v. Vicinity Corporation and Pizza Hut*, U.S. District Court for the Eastern District of Virginia, Civil Action No. 01-1895-A, May 9, 2002.

"Domino's delivers using new call routing service"; *Network World*, vol. 8, No. 32, dated Aug. 12, 1991, pp. 1 and 55.

Dupree, "Amoco Graphics System", Harvard University, Management's Use of Maps: Commercial and Political Applications, 1979, Cambridge, Mass. pp. 13-18.

Fairlie, "Software Integrates City Data, Maps; Personal Travel Technologies Develops Pathfinding Systems for Travelers; Personal Travel Guide; Automation Report", Travel Weekly, vol. 51, No. 94, ISSN: 0041-2982, Nov. 23, 1992, p. 53.

Fasulo, "I hate Computers", Do we communicate in cyberspace, or just talk?, vol. 3, No. 31, Sep. 13, 1996, http://extlab7.entnem.ufl.edu/IH8PCs/vol3/V3N31.htm.

Figurski et al., "User-Centered Programmability of Intelligent Network Features", IEEE ICC '91, Jun. 23-26, 1991, vol. 2 of 3, Denver, pp. 936-940.

Fishbine, "Future Directions in Public Service Computer Cartography: The Challenge of the Pinball Mentality", Harvard University, Urban, Regional, and State Government Applications of Computer Mapping, 1979, Cambridge, Mass., vol. 11, pp. 61-67.

Foard et al., ". . . In the Nineties: The Evolution of AT&T's Switch-Computer Interfaces", AT&T Technical Journal, Sep./Oct. 1991, pp. 45-58.

Folchi et al., "A New Perspective in GIS: Databases and Emerging Markets", GIS World, Aug./Sep. 1990, Fort Collins, CO., pp. 66 et seq.

Forrest, "Seeing Data in New Ways", ComputerWorld, Jun. 29, 1992, pp. 85-86.

Freedman, "Mich. Launches Nations 'Most Complete' Tourism Data Base", TravelAge MidAmerica, undated, pp. 1, 50.

GeoSystems pamphlet, undated, 25 pages.

"Geosystems Electronic Future", Directory World, Fall 1993, 1 page (Article).

Gooding, "Charting a New Course—Claire Gooding looks at the benefits of an innovative geographical information system, in a series on getting the most out of software /Software at Work", The Financial Times, Oct. 28, 1993, London, p. 20.

Greenfield, "The Provisioning Operation Support System Impacts of Intelligent Network Deployment", IEEE international Conference on Communications, ICC '91, vol. 2 of 3, Denver, Jun. 23-26, 1991, pp. 627-631.

Gregg, "Application of Thematic Maps in Management Information Systems: The Experience of Upland Industries Corporation Market Research Department", Harvard University, Management's Use of Maps, undated, Cambridge, Mass. vol. 7, pp. 33-40.

Hamlen, "Fleet Management with Automatic Vehicle Location", 36th IEEE Vehicular Technology Conference, May 20-22, 1986, Dallas, Texas, pp. 374-380.

Harris et al., "Intelligent Network Realization and Evolution: CCITT Capability Set 1 and Beyond", ISS '92, Oct. 1992, vol. 2, pp. 127-131.

Harvey et al., "Call Center Solutions", AT&T Technical Journal, Sep./Oct. 1991, pp. 36-44.

Hemenway, Jr., "Internet Users Select Favorite Web Sites—Best Nonprofit GIS Site", GEOWorld, vol. 9, No. 1, Jan. 1996, www.geoplace.com/gw/1996/0196/0196feat.asp.

Honey et al., "Extending Low Cost Land Navigation Into Systems Information Distribution and Control", ETAK, Inc., Paper Prepared for IEEE Position Location & Navigation Symposium, Las Vegas, Nevada, Nov. 4-7, 1986, 6 pages.

Hrut, "Navigation Technologies: Executive Summary", Undated, 19 pages.

Hudson, "Prestel: The Basis of an Evolving Videotex System—The first Videotex system in the world is flexible enough to adopt anticipated technological advances", Jul. 1983, BYTE Publications Inc., p. 61 et seq.

Huélamo, "Multimedia Control Stations for ATM Broadband Networks Providing Multimedia Intelligent Network Services", IEEE ICC '93 Geneva, May 23-26, 1993, Geneva, Switzerland, Technical Program, Conference Record vol. 2 of 3, pp. 650-655.

"IBM Creative Services and Federal Express: Multimedia Express", IBM Multimedia Innovations, Special Advertising Report, Undated, pp. IBM-1-IBM-6 (Advertisement).

IBM, Special Advertising Report, "Networked Multimedia for the Masses", undated, 1 page.

Information Disclosure Statement with Declaration of James D. Shaffer for Automatic Information and Routing System for Telephonic Services (U.S. Appl. No. 08/598,392) Jun. 19, 1997.

Isaacson, "A Technical Overview of BellSouth Telecommunications' Advanced Intelligent Network", BellSouth Telecommunications, AIN IBU—Network, Mar. 1994, pp. 1-41.

Jackson et al., "Integrated Services for the 1990's", IEEE ICC '91 Jun. 23-26, 1991, vol. 2 of 3, Denver, pp. 959-963.

Jain, "Intelligent Peripheral: Signaling and Protocols", International Switching Symposium, vol. 2, Oct. 1992, pp. 117-121.

Juhl, "California's Sins, GIS-based Information Network Helps Law Enforcement Efforts to Curtail Drug Traffic", GEO Info Systems, Aug. 1993, Eugene, OR, pp. 36-45.

Juhl, "Coping With Rapid Development County "Reinvents" Government with GIS Assistance", GIS World, Jan. 1994, Fort Collins, CO, pp. 30-34.

Kano et al., "Network Architectures and Switch Interface Scenarios", NTT, Tokyo, Japan, Publication Unknown, Undated 5 pages.

Kettler et al., "Evolution of the Intelligent Network to Support Global Services", International Switching Symposium, vol. 2, Oct. 1992, pp. 53-57.

Kevany, "The Evolution of Automated Mapping Systems Over the Past Dozen Years", Papers From the 1986 Annual Conference of the Urban and Regional Information Systems Association; Conference Theme: What's the Difference?, vol. IV, Denver, CO, pp. 139-147.

"Kiosk", NASIRE 1993 Annual Meeting, Sep. 1, 1993, 29 pages (Article).

Kositpaiboon et al., "Customer Network Management for B-ISDN/ATM Services", IEEE ICC '93, May 23-26, 1993, Geneva, Switzerland, Technical Program Conference Record vol. 1 of 3, pp. 1-7.

"LSSGR: Class Feature: Calling Number Delivery", Bellcore, Technical Reference, TR-NWT-000031, Issue 4, Dec. 1992, 35 pages.

"LSSGR: CLASSM Feature: Calling Name Delivery Generic Requirements", Bellcore, Technical Reference, TR-NWT-001188, Issue 1, Dec. 1991, 120 pages.

Lapi et al., "Diverse Service Architectures Using Alternate AIN Elements", IEEE, 1990, pp. 1633-1639.

Lax et al., "NAPLPS Standard Graphics and the Microcomputer, Why a Graphics Standard is Important and How It Can Be Implemented in a Microcomputer", Jul. 1983, BYTE Publications Inc., p. 82.

LeBlanc, "Intelligent Network Basic Call Model Rapid Prototype", IEEE, 1993, pp. 1543-1547.

Maeda et al., "An Intelligent Customer-Controlled Switching System", IEEE Global Telecommunications Conference & Exhibition, Hollywood, Florida, Nov. 28-Dec. 1, 1988, Conference Record vol. 3 of 3, pp. 1499-1503.

Magedanz, "A Preliminary Model for an Integrated Intelligent Network Management Support System", Supercomm/ICC '92, Conference Record vol. 1 of 4, pp. 169-173.

Malloy, "The World to Your Doorstep", Jul. 1983, BYTE Publications Inc., pp. 40-41.

MapInfo 4.50 Release Notes, Mapping Information Systems Corporation, Troy, NY, undated, 167 Pages.

MapInfo for DOS, Command Reference Version 5.0, MapInfo Corporation, Troy, New York, Copyright 1985-91, 272 pages.

MapInfo, "Microcomputer Mapping Software Version 2.00", Mapping Information Systems Corporation, Troy, NY, Undated, 287 pages.

MapInfo, MapInfo v. 5.0, Mapping Information Systems Corporation, Troy, New York, Undated, 401 pages.

Marshall, "Tracking the Wild Ambulance Fleet", JEMS, vol. 12, Sep. 1987, pp. 58-61.

McCarron, "Supermaps; Computers Put Big Cities on Road to High Efficiency", Chicago Tribune, Aug. 3, 1986, Tomorrow Section, p. 1.

McConnell et al., "Feature Interaction Analysis in the Advanced Intelligent Network: A Telephone Company Perspective", IEEE, 1993, pp. 1548-1552.

Michaelides, "Lyme Firm Intent on Digitizing the Nation", Vermont Business, Section 1, May 1986, p. 76.

Miller, "Videotex—Science Fiction or Reality?", Jul. 1983, BYTE Publications Inc., pp. 42-56.

Minhas, "Intelligent Network Services and Architecture", IEEE MILCOM '91, 1991, pp. 207-211.

Mobile World, Conference Proceedings, Table of Contents, Undated, 2 pages.

Morehead et al., "Introduction to United States Government Information Sources", $4^{th}$ ed., Libraries Unlimited, Inc., Englewood, Colorado, 1992, p. 330-331.

Morris et al., "Kiosks: A Technological Overview", Los Alamos National Laboratory, Jan. 10, 1995, Los Alamos, NM, 23 pages.

"Multimedia Makes the 1996 Olympic Team", Government Technology, vol. 5, No. 9 Sep. 1992, pp. 1, 50, 53 (Article).

Multimedia Monitor, "Geo Systems Involved in Two Mapping Projects", Sep. 1993, p. 8.

Natarajan et al., "A Framework Architecture for Information Networks", IEEE Communications Magazine, Apr. 1992, pp. 102-109.

Natarajan et al., "A Framework Architecture for Multimedia Information Networks", IEEE Communications Magazine, Feb. 1992, vol. 31, No. 2, pp. 97-104.

"Network Multimedia Servers, The Maitre D' of Multimedia New IBM Solutions Provide "Five-Star" Multimedia Service on a Network", IBM Multimedia Innovations, Special Advertising Report, Undated, pp. IBM-1-IBM-5.

Newman et al., "Customer Control of Intelligent Network Services", IEEE Global Telecommunications Conference & Exhibition "Communications for the Information Age", 1988, pp. 7-10.

Order in *Murex Securities Limited and Murex Licensing Corporation v. Vicinity Corporation and Pizza Hut*, U.S. District Court for the Eastern District of Virginia, Civil Action No. 01-1895-A, May 9, 2002.

Parenteau et al., "Internet Pricing and Prioritization", Publication Unknown, Undated, 10 pages.

Peterson et al., "Operating System Concepts," Second Edition, Section 3.3.3, pp. 70-71.

Poli, "The Big Switch to Data Over Cellular", Communications, Apr. 1987, pp. 56 et seq., 6 pages.

Proposal to The Corporation for Public Broadcasting, "Mapping a Brighter Future : Expanding St. Louis' Community Information Network", St. Louis Development Corporation, Aug. 16, 1996, http://stlouis.missouri.org/cin/grants/cpb/cpbgrant.htm.

Qutub, "A Knowledge-based Information-Access System for the Telecommunications Environment", IEEE, 1991, pp. 408.2.1-408.2.7.

"R. R. Donnelley GeoSystems Introduces GEOLOCATE Plus", GeoSystems, Mar. 10, 1992, San Francisco, CA, 3 pages (Advertisement).

Rabie et al., "Activity-Based User Interface for Network Management", IEEE Dallas Globecom '89 Conference Record vol. 1 of 3, Dallas, Texas, Nov. 27-30, 1989, pp. 196-200.

Rabie et al., "An Integrated Architecture for LAN/WAN Management", IEEE NOMS 1992 Symposium Record, vol. 2 of 3, pp. 254-264.

Ramani et al., "Placement of Feature Management Functionality in IN", IEEE International Conference on Communications, ICC '91, vol. 2 of 3, Denver, Jun. 23-26, 1991, pp. 632-636.

"Real Life Multimedia", ComputerLand Magazine, May/Jun. 1992, pp. 20-22, 26 (Article).

Reinhold, "Revolution Changes the World of Maps", The New York Times, Sep. 23, 1990, Section C, col. 1, p. 2.

Rishe, "Managing Network Resources for Efficient, Reliable Information Systems", IEEE, 1994, pp. 223-226.

Robrock II, "The Intelligent Network—Changing the Face of Telecommunications", Proceedings of the IEEE, vol. 79, No. 1, Jan. 1991, pp. 7-20.
Roehr, Jr., "Signalling System No. 7", Open Systems Data Transfer, Feb. 1985, pp. 1-16.
Russo, "Advanced Intelligent Network Service Model", Intelligent Network Requirements Planning District, Bell Communications Research, Publication Unknown, Undated, 7 pages.
Ryan "Software Application and Management Issues for AIN", IEEE ICC '91, Jun. 23-26, 1991, vol. 2 of 3, Denver, pp. 637-641.
Salm et al., "Exploring Intelligent Network Control of Active Calls on a CO Switch", IEEE, 1993, pp. 1558-1562.
Schroeder et al., "The Emergence of Smart Traveler Kiosks and the User Interface Requirements for their Successful Deployment", IVHS America, Atlanta, GA, 1994 Annual Meeting, Apr. 17-20, 1994, 18 pages.
Schwabach, "Computerized Maps Go Beyond Paper Versions", Star Tribune, Sep. 23, 1993, Minneapolis, MN, p. 2D.
Screen Prints, "Travel Match Express", AAA, undated, 8 pages.
"Section 3, Exemplary Systems and Critical Performance Factors Accessibility Evaluation", Undated, pp. 3-1 to 3-11, H-1 to H-4 (Pamphlet Excerpt).
Shneiderman, "Designing the User Interface, Strategies for Effective Human-Computer Interaction", Second Edition, Preface, Addison-Wesley Publishing Co., Reading, Mass. pp. 428-431, 1992.
"Sites to see on the Web—ATM Locator Guide", Campus Computing & Communications, University of British Columbia, Sep. 1995, www.cc.ubc.ca/campus-computing/sep95/sites.html (Newsletter).
Statistica, Inc., Outline and Letter, undated, 2 pages.
Steiner, "SCO and Pizza Hut Announce Pilot Program for Pizza Delivery on the Internet—'PizzaNet' Program Enables Computer Users to Electronically Order Deliveries", Wichita, KS and Santa Cruz, CA SCO Forum 94, Aug. 22, 1994, http://www.Interestingpeople.org/archives/interesting-people/199408/msg00057.html.
"Strategic Mapping introduces next generation of desktop mapping software" Business Wire, Nov. 1, 1993, Santa Clara, CA, 2 pages (Article).
Supplemental Information Disclosure Statement with Declaration of James D. Shaffer for One Number Intelligent Call Procession System (U.S. Appl. No. 08/748,192) Sep. 22, 1998.
Sweeney, "An Overview of IVHS Sensor Requirements", Proceedings, Sensors Expo West, Mar. 2-4, 1993, San Jose, California, pp. 229-233.
Target Store Locator System, Basic Call Flow, Ver. 1.0, Undated (reference to 1989), 2 pages.
Targus Information Corporation, brochure, Jan. 17, 1995, "DART Intelligent Call Processing."
Targus Information Corporation, brochure, Mar. 19, 1993, "DART Intelligent Call Processing."
"Technical Program Chairman's Message", IEEE ICC '93 Geneva, May 23-26, 1993, Geneva, Switzerland, 1 page.
Tetzeli, "Mapping for Dollars", Fortune, Oct. 18, 1993, pp. 91 et seq.
"The Development of a GIS-Based Transit Advanced Traveler Information System", 1995 URISA Proceedings, pp. 695-709.
TIGER Technical Guide, Oct. 1991, pp. 3-5, "Topological Integrated Geographic Encoding and Referencing System/Zone Improvement Plan."
Totani et al., "Automotive Navigation System", The Second International Pacific Conference on Automotive Engineering, Motor Vehicle Technology: Progress and Harmony, Proceedings vol. 2, Japan, Nov. 7-10, 1983, 11 pages.
Treadway, Topic Posting, "CPSC 2263—Periodicals", SWU's OnLine Classroom Forum, Dec. 9, 1996, http://medsch.wisc.edu/cgi-netforum/swuclass/a/3--16.
Uchida et al., "Customer-Defined Service Model and Definition Method for Intelligent Networks", IEEE International Conference of Communications, ICC 91, Conference Record, vol. 2 of 3, Denver, Jun. 1991, pp. 954-958.
Van Demark, "Development Surveillance using GBF/DIME Technology", Papers From the Annual Conference of the Urban and Regional Information Systems Association; Urban, Regional, and Environmental Information: Needs, Sources, Systems, and Uses; Aug. 16-19, 1981 New Orleans, LA, pp. 307-314.
"Vehicular Navigation & Location Systems Technology", Navigation Technology Seminars, Inc., Syllabus for Course 231 on Dec. 2-4, in San Diego, California, 2 pages.

Vizaro, "Orienteering in the Electronic Age", Inside Track, San Francisco International Auto Show, Nov. 23, 1986, pp. 31, 35, 36.
Voice/5 Reference Manual for Ross Stores, Inc., Revised Feb. 15, 1993, 70 pages.
Warner, "Smart Maps: New Route to Profits: Digital-Map Systems Can Save Business Up to $ 50 Billion Annually", High Technology Business, vol. 8, No. 12, ISSN: 0895-8432, Dec. 1998, p. 20.
"Weight Watchers reduces customers' wait for service"; *PBX/Key/Centrex*, dated Jul. 1995, p. 11.
Weihmayer et al., "A Distributed AI Architecture for Customer Network Control", IEEE Globecom '90, San Diego, CA, Dec. 2-5, 1990 Conference Record, vol. 1 of 3, pp. 656-662.
Weisser et al., "The Intelligent Network and Forward-Looking Technology", IEEE Communications Magazine, Dec. 1988, pp. 64-69.
"When Will Multimedia Meet Expectations?", Government Technology, vol. 5, No. 9, Sep. 1992, pp. 30, 32-33 (Article).
"The Worlds First Automotive Navigation System The Etak Navigator", publisher unknown, undated, 5 pages (Brochure).
Worrall, Virtual Network Capabilities—The Next Phase of the 'Intelligent Network', Globecom Tokyo'87, Sponsored by IEEE Comsoc IEICE and FAIS, 1987, pp. 40.2.1-40.2.4.
"Yahoo!'s Picks of the Week", Sep. 9, 1996, http://docs.yahoo.com/picks/960909.html (Article).
Zanella, "Customer Network Reconfiguration Applications Utilizing Digital Cross-Connect Systems", IEEE Global Telecommunications Conference & Exhibition, Hollywood, FL, Nov. 28-Dec. 1, 1988, vol. 3 of 3, pp. 1538-1543.
Zavioli et al., ETAK, Inc., "A System View of Digital Road Map Databases in an IVHS with Emphasis on Subsystem Interface Requirements", The 3$^{rd}$ International Conference on Vehicle Navigation & Information Systems RTI/IVHS, Conference Record of Papers, Sep. 1992, pp. 600-606.
(Tampa) Tribune Newspaper articles, One phone number is the latest Domino's theory, Sep. 14, 1992 and Springston, C. Dominos tries out 950 prefix, Sep. 18, 1992, 2 pages.
Ambrosch, W.D. et al. The Intelligent Network, A Joint Study by Bell Atlantic, IBM and Siemens, Title page, Copyright Page, and Ch. 9 pp. 162-177, ISBM 3-540-50897-X, Copyright Springer-Verlag Berlin Heidelbert 1989.
Andrews, Jr., F.T. et al. Stored Program Controlled Network, The Bell System Technical Journal, Sep. 1982, vol. 61, No. 7, Part 3, Title page and pp. 1573-1815.
Applied Telematics, Inc. Brochure and Information Sheet, The Applied Telematics Dealer Search Method and How to Increase the Effectiveness of Your Advertising Without Changing a Word, Apr. 26, 1988, 3 pages.
*Applied Telematics, Inc.* v. *Sprint Communications*, Declaration of Bryan Beaty, Civil Action No. 94-4603, U.S. District Court, Eastern District of Pennsylvania, Mar. 20, 1995, 107 pages.
*Applied Telematics, Inc.* v. *Sprint Communications*, Deposition of Bryan Beaty, Civil Action No. 94/4603, U.S. District Court, Eastern District of Pennsylvania, Jan. 18, 1996, 211 pages.
Applied Telematics, Inc., Headquarters and Remote Routing Center Call Processing schematics, Jan. 14, 1987, 3 pages.
Atlas Software Boundary and Data File Catalog, Copyright 1987, 1988, 1989, 1990 Strategic Mapping, Inc., 5 pages.
Atlas Software Desktop Map Library, Strategic Mapping, Inc., date unknown, 5 pages.
Atlas Software Desktop Sample Maps and Order Form, Strategic Mapping, Inc., date unknown, 5 pages.
Baechler, Donald O., Letter to All Current Recipients of TRA Products, Nov. 10, 1989, 8 pages.
Baechler, Donald O., Memo to Recipients of the Local Exchange Routing Guide (LERG) Data Type, Nov. 1, 1989, Bellcore, 20 pages.
Beaty, Bryan. Letter to Mr. Dale Inlow dated Jul. 21, 1992, 1 page.
Berman, Roger K. et al. Perspectives on the AIN Architecture, IEEE Communications Magazine, Feb. 1992, pp. 27-32.
Blankenhorn, Dana. MCI improves 800 services—MCI Communications Corp.'s 800 Enhanced Call Router Service, Newsbytes News Network, Sep. 15, 1992, copyright 1992 Washingtonpost Newsweek Interactive, 2 pages.
Computer Marketing Corporation Brochure, The Complete Computer System for Domino's Pizza Stores, 8 pages.
Computer-Consoles; (CCI) CCI's LIFE-911 system features most advanced technology, Lexis printout, Copyright 1986 Business Wire, Inc., Oct. 22, 1986, 3 pages.

Delong Jr., Edgar S. Making 911 even better, Telephony, Dec. 14, 1987, pp. 60-63.
DeNigris, Ernest G. et al. Enhanced 911: emergency calling with a plus, Bell Laboratories Record, Mar. 1980, pp. 74-79.
Equifax Marketing Decision Systems, Brochure, Tiger Stalks the Streets on Infomark, Equifax Inc copyright Jan. 1991, 2 pages.
Equifax National Decision Systems, Brochure, Desktop Marketing Information System Infomark for Windows Solutions, 1991, 11 pages.
Equifax National Decision Systems, Brochure, Introducing Infomark for Windows, Equifax Inc. copyright Apr. 1991, 2 pages.
Gibbs, Charlie. Memo to Stephen Keyes dated Aug. 18, 1986 with letter from Bernard N. Riskin attached, 3 pages.
Gunderson, Gary W. Computer-Consoles; Can your community save lives when seconds count? Lexis printout, Copyright 1987 Business Wire, Inc., Feb. 11, 1987, 3 pages.
Haas, Alan. Pizza Wars, US Air, Apr. 1988, pp. 79-85, and fax cover sheet from Peter Wagner dated Feb. 27, 2003.
Harvey, Dea. E. et al. Call Center Solutions, AT&T Technical Journal, Sep./Oct. 1991, pp. 36-44.
Head, Charles S. Intelligent Network: A Distributed System, IEEE Communications Magazine, Dec. 1988, pp. 16-20, 63.
Hirsch, Phil. AT&T Service to Link Users Through Touch-Tone Phones, Lexis printout, Copyright 1983 Computerworld, Inc., 2 pages.
Honig, William L. et al. The Realities of Service Creation on Switching Systems Through Attached Processors, XIII International Switching Symposium, Stokholm—Sweden, May 27-Jun. 1, 1990, Session B9, Paper #4, Proceedings, vol. VI, pp. 51-54.
Hunter, Paul P. The Sources of Innovation in New Jersey Bell Switching Services, Thesis, Masachusetts Institute of Technology Library Archive, Jun. 27, 1991, pp. 1-105.
Hursey, Douglas M. 800 Service in Bellsouth, 1986 IEEE, pp. 1330-1335.
Industry Requirements and Standards, E911 Public Safety Answering Point: Interface Between a 1/1AESS™ Switch and Customer Premises Equipment Table of Contents, Jun. 2003, Issue 1, 6 pages.
Infomark Laser PC System Reference Manual, Aug. 1991, 703 pages.
Information Disclosure Statement filed in U.S. Appl. No. 08/598,382, May 28, 1998, 3 pages.
Joint Interim Hearing on the 911 Emergency Response System—An Overview of its Effectiveness, Nov. 21, 1990, Los Angeles, CA, 106 pages.
Kwan, Robert K. et al. Globalstar: Linking the World via Mobile Connections, IEEE International Symposium on Personal, Indoor and Mobile Radio Communications, King's College London (U.K.), Copyright 1991, 7 pages.
Letter and attachments from Brian Follett to Jon Plening, Jun. 26, 1991, 81 pages.
Letter from Bert Johnson to Mr. Dan Gonos, Mar. 16, 1990, 1 page.
Letter from Diane M. Hutchinson to Sue Monhait dated May 9, 1990 with attachment, 2 pages.
Letter from Gina K. Marks to Mr. Paul Kluempers dated Apr. 13, 1992, 4 pages.
Letter from Philip J. Gross of Phone Base Sytems, Incorporated to Mr. Ian Michel, Applied Telematics, Inc. dated Apr. 2, 1990 regarding settlement offer, 10 pages.
Letter of Intent from Paul Kluempers to Gina K. Marks dated Apr. 22, 1992, 3 pages.
Lineback, J. Robert. Zip-Code Data Base Does a Lot More than Sort Mail, Lexis printout NEWS: Data Processing; p. 19, Copyright 1986 McGraw-Hill, Inc., 1 page.
Marketline, Inc. brochure, undated, 11 pages.
McInerney, Lori. Catching Up to Voice Processing, Inbound/Outbound Magazine, Mar. 1991, pp. 46-54.
McIntyre, Harris B. What is this New V-H System?, New England Telephone and Telegraph Company, No. 33, Dec. 1959, 13 pages.
MediaTrak Advanced Marketing, Inc. Letter to Ms. Diane Thomas dated Jul. 30, 1992, 3 pages.
Melissa, Raymond. New! Zip Code Software Catalog, Fall 1990, No. 6, title pages, pp. 12-13.

Melissa, Raymond. Zip Code Software Catalog, Summer 1991, No. 8, 35 pages.
Mosbacher, Robert A. et al. Tiger/Line Census files, 1990 Technical Documentation, Washington D.C., 1991, 37 pages.
Mosbacher, Robert A. et al. Tiger/Line Census files, 1990 Technical Documentation, Washington D.C., 1991, 37 pages.
*Murex Securities Limited et al. v. Vicinity Corporation et al.*, Eastern District of Virginia, Alexandria Division, Civil Action No. 01-1895-A, Defendant Victory Corporation and Pizza Hut, Inc.'s Notice of Declaration of Brian Follett in Support of Defendants' Defenses and Counterclaims of Invalidity, May 23, 2002, 29 pages.
Murphy, J.W. et al. Intelligent Network Control of BOC 800 Serivce, The Service Management System, 1986 IEEE, pp. 1320-1324.
National Communications System, Office of Technology & Standards. Telecommunications: Glossary of Telecommunication Terms, Federal Standard 1037B, Jun. 3, 1991, 386 pages.
National Decision Systems, Infomark LaserPC System, Copyright 1986, 4 pages.
National Decision Systems, MicroVision-Custom, The Micro-Geographic Consumer Targeting System that Provides the Ultimate in Customer Segmentation, copyright Jan. 1990 National Decision Systems, 6 pages.
National Decision Systems. Brochure on Infomark Express, date unknown, 6 pages.
National Decision Systems. Brochure on MicroVision-50, The Micro-geographic Consumer Targeting System for All Target Marketing Applications, copyright Jan. 1990, 6 pages.
National Decision Systems. Your Single Source Guide for Demographic and Marketing Information brochure, copyright Apr. 1988, 31 pages.
Nelson, Sharon L. et al. Report on Feasibility of Statewide Enhanced 9-1-1, Submitted to the Washington State Legislature, Jan. 14, 1991, 197 pages.
Newsletter, Crutchfied, T., editor. The Pizza Store Weekly, Domino's Pizza, vol. 1, No. 15 Nov. 3, 1986, 1 page.
Newsletter, Crutchfied, T., editor. The Pizza Store Weekly, Domino's Pizza, vol. 1, No. 22, Dec. 22, 1986, 1 page.
Newsletter, Network World, The Newsweekly of User Networking Strategies, vol. 8, No. 32, Aug. 21, 1991, 4 pages.
Newsletter, Store Systems, vol. 1, Issue 1, Mar. 1989, 7 pages.
Patriot Communications LLC, Enhanced Routing Services information sheet, date unknown, 1 page.
PR Newswire regarding American Telephone and Telegraph Company, Apr. 26, 1982, Lexis printout, 2 pages.
PSAP Operations Guide for Wireless 9-1-1, intrado Informed Response, Jul. 2005, 30 pages.
Ramirez, Anthony. The Pizza Version of Dialing '911', The New York Times, Sep. 9, 1991, 3 pages.
Schmandt, Jurgen et al., editors. The New Urban Infrastructure, Cities and Telecommunications, ISBM 0-275-93591-4, Copyright 1990 by the University of Texas at Austin, Title page, Copyright Page, pp. 5-100.
Sheinbein, D. et al. Stored Program Controlled Network: 800 Service Using SPC Network Capability, The Bell System Technical Journal, Sep. 1982, pp. 1737-1744 and Asmuth, R.L. et al. Transaction Capabilities for Network Services, 1985 IEEE, p. 312.
TARR Search on STOREFINDER trademark, Oct. 29, 2007, 2 pages.
Texas Advisory Commission on Intergovernmental Relations. Implementing 9-1-1 Systems in Texas: Legal and Institutional Background, Jun. 1987, 62 pages.
Trademark Electronic Search System (TESS) trademark record for STOREFINDER, Oct. 27, 2007, 2 pages.
Traffic Routing Administration (TRA) North American Numbering Plan, Routing Data Base System (RDBS) Products, date unknown, 3 pages.
VoicePro, Inc. The "One-Number System", undated, 1 page.
Wallace, Bob. Domino's delivers using new call routing services, Network World, Inc., Aug. 21, 1991, 2 pages.
Workman, Alexandra M. et al. International Applications of AT&T's Intelligent Network Platforms, AT&T Technical Journal, Summer 1991, pp. 44-57.

* cited by examiner

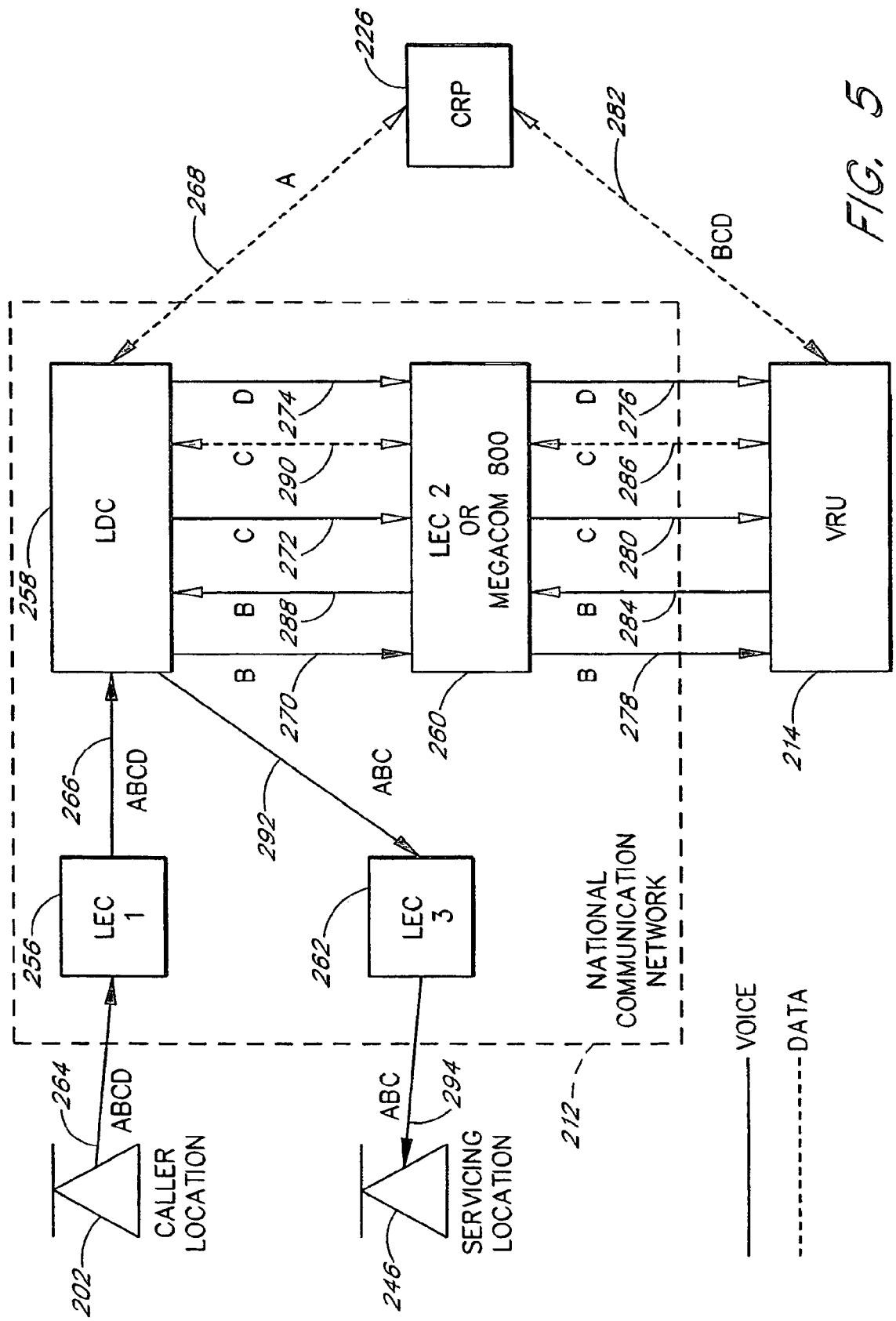

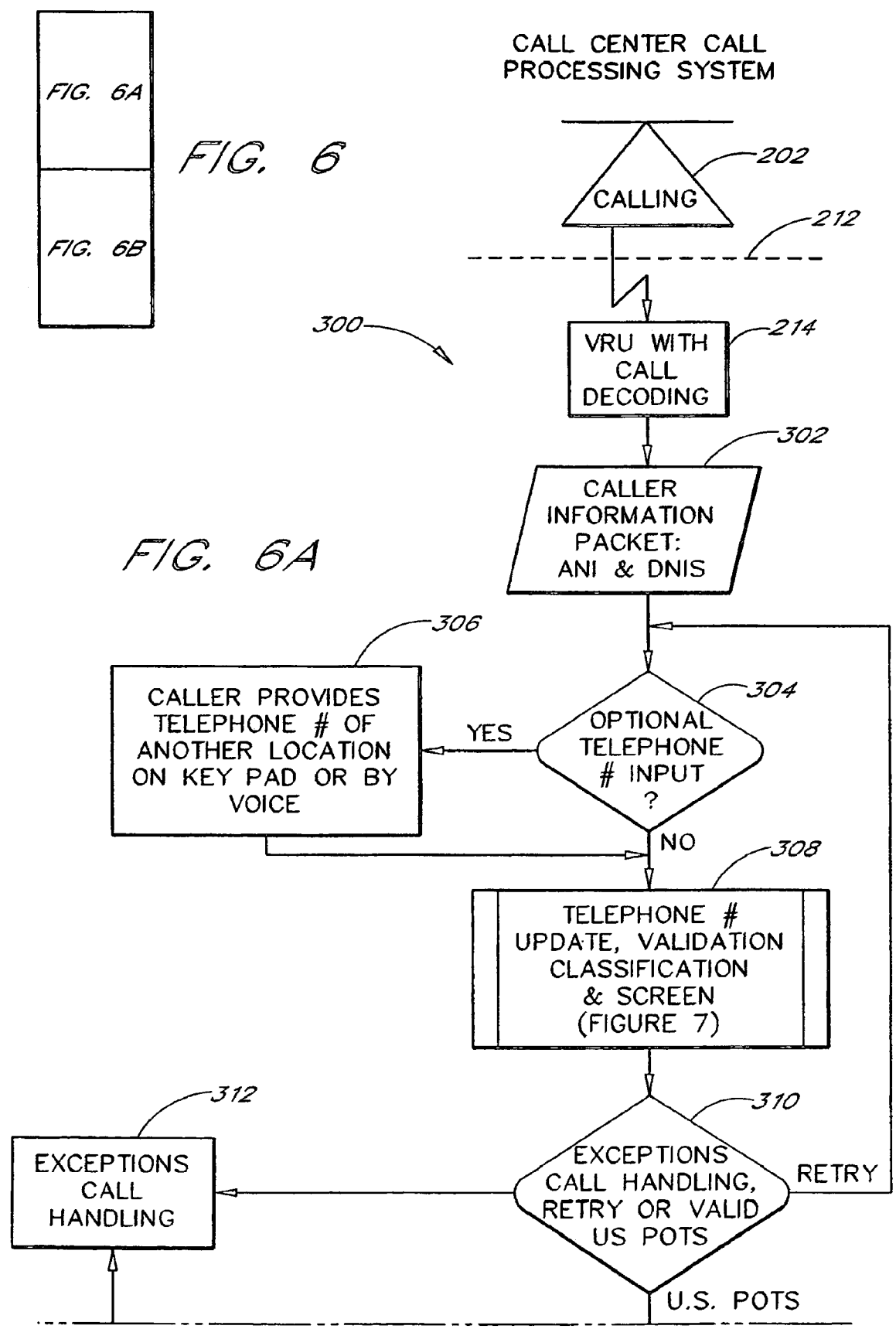

ONE NUMBER, INTELLIGENT CALL PROCESSING SYSTEM

RELATED APPLICATION

This application is a continuation of U.S. application Ser. No. 10/732,147, filed Dec. 9, 2003, now U.S. Pat. No. 7,167, 553 which is a continuation of U.S. application Ser. No. 10/082,669, filed Feb. 22, 2002, and issued as U.S. Pat. No. 6,661,884, which is a continuation of U.S. application Ser. No. 09/690,661, filed Oct. 17, 2000, and issued as U.S. Pat. No. 6,381,324, which is a continuation of U.S. application Ser. No. 09/477,181, filed Jan. 4, 2000, and issued as U.S. Pat. No. 6,185,290, which is a continuation of U.S. application Ser. No. 09/211,475, filed Dec. 14, 1998 and issued as U.S. Pat. No. 6,058,179, which is a continuation of U.S. application Ser. No. 08/748,192, filed Nov. 12, 1996 and issued as U.S. Pat. No. 5,901,214, and claims the benefit of U.S. provisional application No. 60/019,526, filed Jun. 6, 1996, each of which is hereby incorporated by reference.

BACKGROUND OF INVENTION

1. Field of Invention

The present invention relates to telecommunications call processing. More specifically, it relates to processing of a vanity telephone number dialed by a caller with a conventional telephone, so as to access a national virtual telephone number database to provide benefits, such as improved connection efficiency, selected services or products, to the caller, the servicing location(s) associated with the vanity number dialed and/or the vanity number advertiser.

2. Description of the Related Technology

Traditionally, entities with multiple employees, departments and/or locations, such as businesses and government agencies, have provided their customers with multiple telephone number points of contact, with usually at least one telephone number for each employee, department and location. This has placed a major burden on customers and prospective customers to find, remember, dial and be connected to the correct intra-entity telephone number for the services desired. It also has created cost and administrative burdens on these entities to publish and advertise multiple telephone numbers.

In the new world of electronic commerce, many such entities have started advertising "one number", vanity telephone numbers as their primary customer contact point. These vanity numbers are usually national 10 digit numbers starting with area codes such as "800," "888," or "900", local 7 digit numbers starting with an exchange such as "555" and "950" or special purpose three digit numbers like "311", "411" or "911". These numbers are usually easy to remember, such as 1-800-FLORIST. Unlike regular telephone calls with only two participants, vanity telephone number calls can have three participants, recipients, or beneficiaries:
1. The Vanity Number Advertiser
2. The Caller or Consumer
3. The Servicing Location(s)

Based on the increased volume of calls to these vanity numbers and customer demands for 24 hour support during seven days a week, reduced telephone busy signals and shorter hold times, vanity number advertisers have begun answering these calls with a new technology called Voice Response Units (VRU), also known as Interactive Voice Response (IVR).

Currently, there are over 50 manufacturers of VRUs. The commercialization of the VRU and changes in advertising practices has also spawned large numbers of new VRU applications from product manufacturers. Products may be advertised by an infomercial showing an "800" number to call so that a consumer may obtain a list of nearby dealers and/or a product brochure. The 800 number is answered by a VRU which requests the caller to record their name and address. This partially automates the call process, but requires large amounts of disk storage to store the caller provided recorded voice information and creates a large amount of post call work for the advertiser. For example, the advertiser must listen to, understand, transcribe the caller's name and address, certify the address by use of a United States Postal Service (USPS) coding accuracy support system (CASS), manually compile a list of nearby dealers and mail the information packet to the caller's address. These inefficiencies have created a need to further automate VRU applications. This is accomplished through what is now called intelligent call processing technology.

In this context, automated intelligent call processing (ICP) is defined as the capture of network provided data, such as automatic number identification (ANI) and dialed number identification service (DNIS), and caller-provided data, such as data entered by Dual Tone Multi-Frequency (DTMF) through a Touchtone telephone key pad or the caller speaking through the telephone to a VRU. ICP also involves the VRU accessing external databases that can decipher, validate, process and fulfill the caller's request by playing pre-recorded messages, creating call specific messages and speaking them to the caller, storing call captured information that can be accessed by or forwarded to the caller, servicing location or vanity advertiser, and/or automatically routing and connecting the caller to the servicing location or department. Semi-automated intelligent call processing is characterized by automating components of the call through intelligent call processing, but having some portion of the request still requiring live operator support during the call.

There are three primary components to an intelligent call processing system:
- the network: the system level hardware and software that provides the platform for intra- and inter-system and participant communications;
- the information retrieval, processing and storage: the databases and processing algorithms that provide the network application with the information required to fulfill the request; and
- the applications: the processes that process and fulfill the request(s) of the caller, the servicing location and/or the vanity advertiser by utilizing the network and the retrieved, processed and stored information.

The Network

The VRU is the device that can be used to replace the network operator and/or the answering party. Early primitive, non-integrated ancestors to the VRU are the caller ID box and the answering machine. Current state-of-the-art VRUs are programmable devices that not only capture and process network provided data but also accurately translate caller spoken numbers and words into textual or binary data, and convert digital text in the form of words and sentences into speech that is understandable by most callers. The VRU capabilities in these areas are continuing to rapidly improve. The last remaining obstacle to VRU automation is immediate access to more information. This required better network access to network and remote databases and a way to associate the digital data stored in these databases with network provided data, such as ANI and DNIS, and caller provided telephone input in the form of sound: voice or DTMF accurately translated into digital data.

The computer network portion of this problem has been addressed with faster 32 bit and 64 bit processors, vast amounts of cheap RAM and disk storage, new levels of Computer Telephone Integration (CTI) and advances in computer wide area networking that provides real time access to many different databases stored on different computer systems physically located in different parts of the country. This is demonstrated in part by a variety of consumer computer-interface applications supported by computer network services, such as CompuServe®, America Online®, Microsoft Network™ and the Internet.

There are nearly 200 million access points in the national telephone network, which is many times the current number of access points for all of the computer networks combined. The major limitation of the telecommunications voice network is that other than the limited amount of network provided data and voice, the only widely supported communications means is another form of sound, i.e., DTMF, which is a very primitive way of achieving one-way communication. Voice recognition has improved tremendously over the last few years, but is still a long way from being able to translate the words spoken by millions of people with different voices and accents into digital text words with 100% accuracy.

A few access points have videophones that support both sound and video in both send and receive modes. The technology has been around for many years to convert digital text data into video, and digital raster data in the form of maps and pictures into video, and transmit it over the national telecommunications network. There is also primitive technology available to scan and translate video images in the form of hand-written messages and typed characters, words and sentences into digital data, such as the ASCII character set. Today, none of the VRU manufacturers provide either of these capabilities with their current products. As videophones become more common in use, the existing technology to translate digital data into the form of a video image and transmit it to the caller will likely become a standard feature in all next generation VRUs.

A few access points also have computers with modems, speakers, microphones and telephone emulation software, such as Microsoft Phone. There is potential to have the computer translate on-screen typed text into DTMF tones using a more robust DTMF coding scheme and to have this translated back into digital text at the VRU. However, current VRUs do not have this capability.

Information Retrieval, Processing and Storage

Currently, VRUs have no caller-friendly capability to accurately translate caller voice or DTMF input into complex digital database access keys. Consequently, VRU database access has been limited to databases indexed by a simple numeric key. These include pre-recorded messages and internal client customer databases indexed by customer ID. The ID is usually in the form of a telephone number, account number, policy number, order number or other numeric data that is provided by the network, can be entered by DTMF, or accurately translated into digital data by a VRU using current voice recognition technology. This method works for applications with existing customers who know their customer ID. However, for new customers, new businesses or new applications that service different target markets, these internal databases are either too sparse in coverage or do not contain the required information.

On the other hand, there are many frequently updated national databases that have not been accessible by VRUs using network provided data or caller provided telephone input. These include:

The USPS address coding guide.

The US Census Bureau's TIGER (Topographical Integrated Geographic Encoded Record) and 1990 census data files.

Geographic and spatial files from Geographic Data Technology, Inc. (GDT) and ETAK®, such as ZIP+4 to latitude and longitude, ZIP+4 to census block, ZIP Code and census boundary, and enhanced TIGER files.

Household and individual databases from Polk, First Data Resources (FDR), Metromail and the big three credit bureaus: Equifax, Trans Union and TRW.

Property databases from TransAmerica, TRW Ready Data and ACXIOM DATAQUICK.

Updated census data files and geodemographic databases from Claritas, Equifax National Decision Systems, Urban Decision Systems (UDS), CACI and Strategic Mapping, Inc. (SMI).

Business and government location databases from American Business Information® (ABI), DUNS, ProCD and Database American.

Business financial databases from DUNS and TRW.

Hundreds of private company, state and local government and regional files of various types.

All the above databases have one or more of the following limitations that has previously restricted them from being used in VRU applications:

They do not contain a telephone number field.

They contain a telephone number field but a high percentage of records have missing telephone numbers, have out of date telephone numbers or have a very limited amount of data associated with the telephone number.

They do not share a common access key that the caller knows, is willing to provide and can easily communicate to a VRU.

The missing link in making all the above data available in real-time to VRU applications is creating a standardized, precise and universal database linkage key that can be assigned to all the United States telephone numbers and all of the above mentioned databases. This key needs to act as a direct and/or translator linkage mechanism between the telephone number and databases for spatial, geographic, USPS address, household, individual, business location, government location, business financial, property and client service locations with service areas of any defined geographic size and shape. Since the most common trait shared among the above mentioned databases is their geographic/spatial location, definition and/or relationship, the most logical solution would be a universal hierarchical geographic/spatial linkage key, "Spatial Key". Utilizing the Spatial Key to create a virtual telephone number database would make it practical to automate many VRU applications that provide the caller with information, connect the caller with a servicing location and/or capture or retrieve caller related information to assist the vanity advertiser and/or the servicing location in providing better during call and post-call service to the caller.

Applicant is not aware of any product or method that uses a single key to create a virtual telephone number database by linking to many different and seemingly unrelated databases for supporting multiple applications. Savage et al. (U.S. Pat. No. 4,954,958) associates the 10-digit telephone number with an address-indexed street network database to provide directions over a telecommunications network to a caller. Savage uses two 10 digit telephone numbers input by the caller to provide directions from point A corresponding to the location of the first telephone number to point B corresponding to the location of the second telephone number.

As a telephone number to address translation mechanism, the Savage system uses the American Business List (ABL) file which is compiled from the national yellow pages. The ABL file contains approximately 10 million unique business telephone numbers and was originally created for use as a direct marketing database and a national business directory assistance database. The Savage system indexes each 10-digit telephone number into the ABL File to retrieve a business name and a raw address for each end point. In the telecommunications and direct marketing industries, this well-known process of starting with a phone number and looking up a name and address from a directory database is called a reverse directory search. The Savage system uses the raw addresses retrieved by this process as a linkage mechanism to what is referred to as a geodata digitized mapping database from MapInfo®. The source of the MapInfo database most likely is the Census Bureau Geographic Base File-Dual Independent Measurement Encoded (GBF-DIME), which is the predecessor to the TIGER files.

There are many technical issues associated with using a raw, non-standardized and free-formatted address which is composed of a street number, street pre-direction, street name, street type, street post-direction, city name and state as a linkage means between two databases compiled from different sources. These issues include: field size, address formatting and parsing, upper case and lower case, abbreviations, alternate names, alternate spellings (First vs. 1st), missing components and the source of city name. For example, Highway 101, PC HWY, PCH, Pacific Coast Hwy, First Street and 1st St. are all valid alternate street names and types for 1st St. in Encinitas, Calif. This large number of address permutations requires very sophisticated address parsing, standardizing, sorting, matching and scoring algorithms to correctly match raw addresses from two independent databases.

The Savage system does not address the above issues in matching the two raw ABL retrieved addresses to their corresponding two raw addresses on the preferred MapInfo digitized mapping database. The Savage description of the address matching embodiment is: "the central processor will retrieve from the geodata digitized mapping database the routing data correlated to the geographic location addresses". What is needed is a simple, accurate and definable way (such as a Spatial Key) to precisely hierarchically code the address associated with a telephone number and use it as a hierarchical match key to retrieve matching data from other databases coded with all or part of the same hierarchical match key.

In addition, the Savage system does not provide any automated means to determine a servicing location nearby the caller. The caller must know and input the telephone number of the desired service location to get directions. This also eliminates the possibility of providing directions to service locations, such as drop boxes and automatic teller machines (ATMs) that do not have telephones.

Riskin (U.S. Pat. No. 4,757,267) uses the first six digits of the caller's telephone number to select a nearby serving location by performing an on-the-fly calculation to determine the nearness relationship. However, none of the databases mentioned above are accessible by Riskin's process because the first six digits of the telephone number do not provide enough precision to identify the housing or business unit location of the caller.

There are also two previous systems that use a client-specific Caller Telephone Number To a Service Location Telephone Number table as a means of connecting a caller to a servicing location. Cotter (U.S. Pat. No. 4,797,818) describes a manually intensive process for building and maintaining this table. Wegrzynowicz (U.S. Pat. No. 5,136,636) only references the table as a system component that is built and maintained by the client, but does not describe how the client performs this function.

Neither Savage, Riskin, Cotter, nor Wegrzynowicz use a linkage process similar to the Spatial Key. Further, none of the prior systems mention using a single linkage mechanism as a means to link to multiple databases to support multiple applications.

Developing a Spatial Key

In developing a universal Spatial Key the following must be considered:

1. The stability and updateability of the key over time.
2. The ability of the key to be a unique housing, business and/or postal delivery unit identifier.
3. The geographic hierarchy and precision of the key.
4. The number and quality of updated commercial and public translation tables to and from the key.
5. The availability of tools for third parties to place the key on their files.
6. The ability to precisely associate the key to service locations with service areas of any geographic defined size and shape.
7. The ability of regulated telecommunications entities to code their files with the key and to pass the key outside the regulated portion of the network.

Based on the above considerations, there are four primary candidates for the key:

Most recent census block code
Latitude and Longitude
Telephone Number
USPS ZIP Code The other candidates, such as a voting precinct, are eliminated from discussion because of a lack of precision.

Most Recent Census Block Code

The Census block code is a hierarchical 15-digit Federal Information Processing Standard (FIPS) number that is updated once every 10 years in conjunction with the United States decennial census. It has the following seven level hierarchy:

2 digit state code
3 digit county code
4 digit tract code
2 digit tract suffix
1 digit block group code
2 digit block code
1 character block part code The critical limitation of using census block as the Spatial Key is it is not precise enough to act as a unique housing or business unit identifier.

Latitude and Longitude

Latitude and longitude are used in a spherical coordinate system to identify a point on the earth. Its stability in the United States is a function of the North American Datum (NAD) which was originally established by the United States Geological Survey (USGS) in 1927 and was updated in 1983. To use the latitude and longitude as a hierarchical key, the base 10 or binary digits of the latitude and longitude pair must be interleaved to form a single number. The result of this interleaving is generally referred to as a quadtree. Alternatively, the latitude and longitude pair may be combined and/or translated to form another identifier. When latitude and longitude are stored in millionths of degrees, the interleaving creates a nine level base 10 and a sixteen level binary hierarchical system with a mathematical precision of approximately plus or minus 4 inches.

This level of precision is supported by the US Department of Defense's implementation of Global Positioning Satellites (GPS) technology. However, the two primary commercial means by which latitudes and longitudes are assigned to a location, i.e., the TIGER files (NAD27) and commercial level GPS (NAD83), do not support this level of precision. For locations in California, the latitude and longitude coordinates vary by as much as 300 feet between NAD27 and NAD83. There is a mathematical relationship between NAD27 and NAD83, such that latitudes and longitudes can be converted back and forth.

In addition to the above precision issues, latitude and longitude would not make a good choice for a unique housing or business identifier because multi-story buildings require a third coordinate, i.e., elevation. Another limitation with latitude and longitude as a Spatial Key is it requires very specialized Geographic Information System (GIS) databases and knowledge to Spatial Key code. However, commercial level latitude and longitude has no equal when input into a GIS system using data from a single NAD that is indexed by quadtree in showing a relative location on a map with precision in the 30 to 100 foot range.

Telephone Number

The 10 digit telephone number appears to comprise a three level hierarchical system.

3 digit Numbering Plan Area (NPA) or area code
3 digit NXX, exchange or prefix
4 digit line number or suffix Currently, NPAs do not spatially overlap and, with two minor exceptions, do not cross state boundaries. However, there are current plans to create spatially overlapping NPAs in the future. This will require callers in these NPAs to always dial 10 digits. The next non-spatially overlapping level is not the NXX, but the central office (CO) or wire center (WC). Each CO supports one to a few NXXs. Usually over time, the line numbers associated with a NXX become randomly distributed across the locations of the households and businesses serviced by the CO. There are also NXXs, such as 555, 950 and those assigned to cellular phones and pagers, that have no specific geographic boundaries within the NPA. There are also non-spatial NPAs such as 800, 888 and 900. These above items could cause difficulties in an intelligent call processing system if the telephone number was used as the Spatial Key.

There are several additional deficiencies in using the telephone number as the Spatial Key. These include, for example, the situation of using the telephone number as a unique housing or business unit ID. However, there would be multiple IDs for housing units and businesses with multiple telephone numbers. This would lead to excessive complexity in the system due to the multiple IDs. The main negatives associated with using the telephone number as the Spatial Key are the difficulty of accurately coding other databases with a telephone number and the regulatory issues related to transporting telephone numbers obtained from regulated sources outside the regulated telecommunications network.

USPS ZIP Code

The ZIP Code at the 11 digit level is called the Delivery Point Code (DPC) or ZIP+6 and uniquely identifies an individual building, such as 123 N Main St. The DPC is the most precise geographic code presently supported by the USPS and can be used as a unique housing or business unit identifier for single unit structures. However, it cannot uniquely identify a housing or business unit in multiple unit buildings or firms.

The DPC is a geographic hierarchical numbering system of five levels defined as follows:

3 digit ZIP Code is called a Sectional Center.
5 digit ZIP Code is called a Post Office Service Area with a preferred USPS name called the last line name. This is the name shown on the last line of a mailing address. There are 3 special types of ZIP Codes. Two of these, "Fleet Post Office (FPO)/Armed Forces Post Office (APO)" and "PO Box only", do not have precise spatial definitions, but can be linked to unique household equivalent mailing addresses.
7 digit ZIP Code identifies a geographic sector within a Post Office Service Area.
9 digit ZIP Code is called a ZIP+4 and is usually the geographic area of one side of a street within a single one hundred address range block. It is a unique household level identifier for most USPS' PO Box and RR addresses which usually do not have precise spatial definitions.
11 digit ZIP Code is called the Delivery Point Code or ZIP+6 and uniquely identifies a street number address, such as 123 N Main St. The street address is the most common USPS address and is a unique housing or business unit identifier for all single unit buildings with unique street addresses.

Applications

Historically, many high-demand telephone call processing applications have not been commercialized because of one or more technical or economic issues including: automated caller interface technology, integrating telephone and computer networks, and telephone number database validation, coverage, depth and linkages.

In addition, when the above issues are addressed, all known previous efforts in the technology have focused on a custom solution to a specific application, and not on an integrated system solution that meets multiple application needs and the needs of the caller, servicing location and/or vanity number advertiser.

Automated Applications

The following is a partial list of automated application examples that have not either been addressed by previous art or addressed with a highly customized individual solution. It would be desired for all these applications to be automated using a common architecture in which the caller dials a vanity number and the system captures the caller's 10 digit ANI and DNIS. The architecture would only require the caller to respond to application dependent system voice prompts and/or only input a telephone number, if a telephone number different from the ANI is required by the application.

Connecting a caller to a servicing location: The prior technology does not support service locations having service areas of any size and shape, nor situations where geographic precision is required. A solution is desired that provides these abilities in an integrated common architecture.

USPS address retrieval: This is presently addressed by having the caller record their name and address, which is later listened to by a person and transcribed. The transcribed address is then processed through CASS certified software for use in an existing customer database of addresses indexed by telephone number. What is desired is a way to use a caller provided telephone number to directly retrieve the CASS certified USPS address associated with the caller provided telephone number and, in applications requiring 100% accuracy, providing the caller a means to verify the retrieved address. In addition, in a post call process, the retrieved, verified and stored address and additional linked data is desired to be used by the vanity advertiser to mail to the caller, for example, a requested store coupon, menu, catalog or informational packet.

The VRU speaks the service location(s) name, address and/or micro directions (to the caller): Service location information is needed by the caller to mail, pickup and/or drop off something to a selected servicing location. The greatest need for micro-area directions to service location(s) is with service locations very small in size, such as Federal Express, UPS and USPS drop boxes, or ATMs located in large physical entities, such as shopping centers or multi-story buildings. A solution is desired that provides these abilities in an integrated common architecture.

The VRU speaks driveable street directions from the caller's location to the selected service location (to the caller). In addition, in a call parallel application, after transferring the call to the servicing location, the application retrieves the service location's FAX number from a Service Location Table and faxes to the service location the caller's telephone number, address and a map and/or directions from the service location to the caller location to assist the servicing location with delivery to caller. The Savage reference describes a application that requires the caller to input two telephone numbers, and the only benefactor to the Savage device is the caller. What is desired is a system that does not require the input of any telephone numbers, or at worst, only one telephone number is provided by the caller. In addition, services would be provided to the caller, servicing location and/or the vanity advertiser.

Eliminating servicing locations based on days and hours of operation and/or services offered: A solution is desired that provides these abilities in an integrated common architecture.

Caller profiling based on Census or geodemographic data: A system is desired, based on a caller's geodemographic code and product consumption rates, to only present product options to the caller that the caller is most likely to buy, or to route the call to an appropriate sales specialist based on the caller's profile.

Applications that require the caller's name and/or individual data such as product registration and insurance, loan or credit applications: What is desired is a way of linking a Spatial Key to a household database containing data, such as name of head of household, street address, number of children in the household and the names of other individuals living in or associated with the household. The system would speak these individual names and the caller would identify himself or herself. Then the system would link to individual data, such as date of birth, credit rating, and so forth, and provide it to the caller, servicing location, and/or vanity advertiser.

Business Location Data Retrieval: What is desired is a way of linking the caller's Spatial Key to a business database containing data, such as name of Business, SIC, Number of employees and DUNS number, which would link directly into the DUNS database for credit information.

Real Property Database Retrieval: What is desired is a way for a contractor, for example, before bidding on a job, to dial a vanity number that interfaces with an automated property database, enter the telephone number of the supposed residential property owner and verify the ownership, address, mortgage holder, and any outstanding liens on the property.

Semi Automated Applications

There are telephone call processing applications where operator decisions and/or assistance are required that can also benefit from a virtual telephone number database. The following are desired exemplary applications:

Address Lookup and verification by an operator taking a telephone order: In current telephone order systems, an operator key enters a customer's address and verifies the spelling with the caller. What is desired is a way for the caller's telephone number to be passed to the computer system to automatically retrieve the CASS certified address associated with the caller's telephone number and display it on the operator's visual display. The operator would then ask the caller for the address to which they want the order shipped. If the addresses match, the operator would not have to key enter it and verify the spelling with the caller. If the addresses are different, there is a high potential that the caller is trying to make a fraudulent order and the operator would ask additional questions required to make this determination.

Real Time Address to Spatial Key Coding and Spatial Key to Client Table with Off-Line Master Table update: What is desired is a way of continually updating a Master Table (Phone Number to Spatial Key table) that supports multiple clients and applications in the situation when a caller is trying to be connected to a servicing location and has provided a valid telephone number that is not in the Master Table.

"911" application: In a real time Public Health and Safety application, the caller places an emergency call to the emergency telephone number "911." The "911" application costs the U.S. taxpayer several billion dollars each year, and is currently overloaded with non-emergency calls. What is needed is a more economical alternative system for non-emergency "911" calls that can alleviate the load from the current overworked system.

A system and method that uses a single Spatial Key to create a virtual telephone number database by linking a caller's or caller provided telephone number to many different and seemingly unrelated databases for supporting multiple applications would be an advance in the industry. What is needed is an automated means to determine a servicing location nearby the caller, such that the caller does not need to know and input the telephone number of the desired service location to get directions or other desired information. This would facilitate providing directions to service locations, such as drop boxes and automatic teller machines (ATMs) that do not have telephones. Such a system would utilize all ten digits of the telephone number to provide enough precision to identify the housing or business unit location of the caller telephone number. What is desired is the integration of VRU technology with a CTI network and a virtual telephone number database to provides a way to support a host of applications that were not previously possible. Information benefits derived by the caller, the servicing location and the vanity advertiser would be made possible by retrieving information from a virtual telephone number database created through Spatial Key linkage technology. Thus, a single linkage mechanism as a way to link to multiple databases to support multiple applications is needed. A solution is desired that provides these abilities in an integrated common architecture.

SUMMARY OF INVENTION

The call processing applications examples illustrated above and additional similar applications are satisfied by the present invention that includes a telephone call processing system and method in a CTI network. The present invention also includes a process for building and maintaining a Master Telephone Number to Spatial Key Table for use in a CTI network. A significant factor in this invention is the selection of a Spatial Key type. Several candidates including the Most Recent Census Block Code, Latitude and Longitude, Telephone Number, and USPS ZIP Code may be considered. Each Spatial Key type candidate has strengths and weaknesses. The extended ZIP code has been selected as the preferred embodiment for use in this invention as described below.

Selecting a Spatial Key-Extended Zip Code

The Delivery Point Code (DPC) or ZIP+6 is the most precise geographic code presently supported by the USPS and can be used as a unique housing or business unit identifier for single unit structures. However, it cannot uniquely identify a housing or business unit in multiple unit buildings or firms. To solve this problem, it is necessary to further subdivide the DPC using the USPS secondary address, such as apartment 2B, to create a unique housing or business unit identifier. The USPS secondary address is stored as an eight character field called the secondary address field in the USPS Address Management System (AMS) II ZIP+4 address coding guide. Appending the secondary address to the end of the DPC results in an extended 19 digit USPS ZIP Code, thereby creating a unique housing unit or business unit identifier.

The extended 19 digit ZIP Code is a six level hierarchical geographic numbering system that uniquely identifies every housing, business and postal delivery unit serviced by the USPS. It is a geographical hierarchical numbering system, because each of the six levels defines a smaller geographic area totally enclosed within the next higher level. Definitions of the first five levels are provided in the Background section. A description of the sixth level is as follows:

> 19 digit ZIP Code is required to create a unique housing or business unit identifier for multiple unit buildings or equivalents, such as trailer parks or firms receiving large volumes of mail.

The benefits to using the 19 digit ZIP Code as the Spatial Key are:
1. The USPS provides monthly updates to all postal files.
2. The ZIP Code has 6 hierarchical levels.
3. There are very economically priced commercial tools, such as Group 1 and Mailer's Software, that address standardize and assign 11 digit ZIP Codes to files containing raw addresses.
4. Adding the remaining 8 digit code is a fairly basic process for records that require a secondary address to create a unique housing or business unit identifier.
5. There are frequently updated ZIP+4 to latitude and longitude and ZIP+4 to census block translation tables available from the USPS, GDT, Business Location Research (BLR), ETAC and others.
6. There are no technical barriers to creating a DPC to latitude and longitude file if one was required. This would provide the most precise, theatrically possible latitude and longitude assignment of street addresses.
7. There are no restrictions on passing an extended USPS 19 digit ZIP Code outside the regulated telecommunications network because it is not considered customer provided network information.
8. There is a major public safety initiative to change as many RR Box number addresses to street addresses as possible, thus increasing the coverage of the Spatial Keys that can be linked to a precise latitude and longitude.

Although the extended 19 digit ZIP Code is not a perfect universal Spatial Key, it is far superior to the other alternatives for most applications. There are obviously some specific applications where one of the other Spatial Key alternatives could be used. If at some point in the future, the USPS decides to revise the hierarchical numbering system for the ZIP Code, the new ZIP system would most likely then be the preferred choice for a Spatial Key.

Applications

The integration of VRU technology with a CTI network and a virtual telephone number database provides a means to support a host of applications that were not previously possible. The partial list of automated and semi-automated examples below is intended to show the overall scope of the benefits derived by the caller, the servicing location and the vanity advertiser made possible by retrieving information from a virtual telephone number database created through Spatial Key linkage.

Automated Applications

The following is a list of exemplary automated applications that utilize the virtual telephone number database created by the Spatial Key linkage technology.

1. Connecting a caller to a servicing location: This application connects the caller directly to a servicing location retrieved from a Spatial Key indexed Client Table based on the caller provided telephone number being physically located inside the retrieved servicing location's exclusive service area geographically defined as any size or shape. High geographic precision of the location is supported. In cases where the caller provided telephone number is located inside multiple non-exclusive service areas, this application provides the caller a VRU menu of retrieved servicing locations names and then directly connects the caller to the closest servicing location or the one selected by the caller. These abilities and features are provided in a integrated common architecture.

2. USPS address retrieval: This application is based on utilizing the caller or caller provided telephone number to retrieve the caller's CASS certified USPS address. The caller's Spatial Key is linked to the Spatial Key coded and indexed USPS address coding guide and the address is retrieved. The VRU speaks the address back to the caller for confirmation in applications requiring 100% accuracy before linking to any other databases. In addition, in a post call process, the retrieved, verified and stored address and additional linked data can be used by the vanity advertiser to mail to the caller, for example, a requested store coupon, menu, catalog or informational packet.

3. The VRU speaks the service location(s) name, address and/or micro directions (to the caller): Based on a caller provided telephone number, the caller's Spatial Key is used to retrieve location ID(s) of the service location(s) nearest the caller from a Client Table that is associated with the caller's DNIS. The retrieved ID(s) are indexed into the corresponding Service Location table to retrieve the above mentioned information. This can be used by the caller to mail, pickup and/or drop off something to the selected servicing location. Providing the caller with pre-stored micro area directions to the service location (s) is usually used with service locations very small in size, such as Federal Express, UPS and USPS drop boxes, or ATMs located in large physical entities, such as shopping centers or multi-story buildings. These abilities and features are provided in a integrated common architecture.

4. The VRU speaks driveable street directions from the caller's location to the selected service location (to the caller): The caller's Spatial Key is linked to a latitude and longitude which is then fed into a GIS server accessing a latitude and longitude coded and indexed street network database. The database provides a set of directions that are spoken by the VRU. The caller does not need to enter either the source (under normal circumstances) or destination location telephone numbers. In a call parallel application: after transferring the call to the servicing location, the application retrieves the service location's FAX number from a Service Location Table and faxes to the service location the caller's telephone number, address and a map and/or directions from the service location to the caller location to assist the servicing location with delivery to caller. In this case, the GIS server returns the direction data in the form of a map and/or directions and passes this image to the FAX server.

5. Eliminating servicing locations based on days and hours of operation and/or services offered: In the case of multiple servicing locations, the final servicing location list is determined by comparing the days and hours of operation of each service location retrieved from the Service Location table with the day and time of the call. Another method involves having the caller select a pickup or delivery option, (for pizza, for example) and eliminating servicing locations from the list that are not currently open or do not offer the desired service. These abilities and features are provided in a integrated common architecture.

6. Caller profiling based on Census or geodemographic data: The caller provided telephone number is linked to a census block or block group database. The Census Block database contains demographic data, such as race, age, median household size and so forth, or a single numeric geodemographic code that is a composite of the census information which links into a geodemographic code by a product consumption table. Based on the caller's geodemographic code and its product consumption rates, the VRU only presents product options to the caller that the caller is most likely to buy. There are also geodemographic systems that use the ZIP+4 as the base geography instead of the census block.

7. Applications that require the caller's name and/or individual data such as product registration and insurance, loan or credit applications: The caller provided telephone number is linked to a household database containing data, such as name of head of household, street address, number of children in the household and the names of other individuals living in or associated with the household. The VRU can speak these individual names and the caller can identify himself or herself. After the step of identification by name, individual IDs associated with the selected name and stored in the database, such as social security number, state drivers license number, credit card number(s) and bank account number (s), can then be used as a linkage to link to individual ID-indexed databases containing individual data, such as date of birth, credit rating, and so forth. This information can then be provided to the caller, servicing location or vanity advertiser.

8. Business Location Data Retrieval: The caller provided telephone number is linked to a business database containing data, such as name of Business, SIC, Number of employees and DUNS number, which links directly into the DUNS database for credit information. The applications here are very similar to the applications for a household database.

9. Real Property Database Retrieval: Most real property databases are maintained by local government agencies and the data stored in these databases is considered public information. This data is compiled from the public agencies by companies, such as ACXIOM DATAQUICK, and made available to paying clients. Before bidding on a job, for example, a contractor could dial a vanity number that interfaces with an automated property database, enter the telephone number of the supposed residential property owner and verify the ownership, address, mortgage holder and if there are any outstanding liens on the property.

Semi Automated Applications

There are telephone call processing applications where operator decisions and/or assistance are required that can also benefit from a virtual telephone number database. The following are examples:

1. Address Lookup and verification by an operator taking a telephone order: The caller's ANI is passed to the computer system via Integrated Services Digital Network (ISDN) to which the operator's CRT is connected or the operator asks the caller for the telephone number and key enters it. The host computer passes the caller's telephone number over the computer network to the computer storing the Master Table of telephone numbers with corresponding Spatial Keys and the Spatial Key coded USPS National Address database and requests the address associated with the caller's telephone number. This CASS certified address is returned and displayed on the operator's CRT. The operator then asks the caller for the address to which they want the order shipped. If the addresses match, the operator does not have to key enter it and verify the spelling with the caller. This saves both time and money and reduces mistakes. If the addresses are different, there is a high potential that the caller is trying to make a fraudulent order and the operator would ask additional questions required to make this determination.

2. Real Time Address to Spatial Key Coding and Spatial Key to Client Table with Off-Line Master Table update: A caller is trying to be connected to a servicing location and has provided a valid telephone number that is not in the Master Table. The call is transferred to an exceptions handling operator and the telephone number and DNIS are passed via ISDN to the operator's host computer and displayed on the operator's CRT. The operator asks for the caller's address and key enters it. The operator then presses a function key that calls a program that USPS standardizes the address and assigns a Spatial Key. The operator validates the standardized address with the caller. If it validates, the operator then presses another function key that passes the Spatial Key and the DNIS to a program that brings up a list of servicing location(s) with their telephone numbers on the CRT screen. The operator then asks the caller which one they prefer and transfers the call by highlighting the selected service location and pressing another function key. The captured telephone number and Spatial Key are stored on disk or other mass storage and are retrieved later by another process that updates the Master Table which supports multiple clients and applications.

3. "911" application: In a real time Public Health and Safety applications, the caller places an emergency call to the emergency telephone number "911." The caller's telephone number is passed by Caller ID to the answering hardware which passes the information via ISDN to a Geographic Information System (GIS) computer with large CRT graphic terminals in front of dispatching operators. The system looks up the caller's Spatial Key in a Master Table and then looks up the caller's latitude and longitude in a Spatial Key to Latitude and Longitude table and the caller's address from the Spatial Key coded and indexed USPS address coding guide. The caller's location is then displayed in the map window on the answering dispatcher's CRT along with the street network and the current location of all emergency vehicles by type and status. The caller's address is displayed in the address window. Based on the type of emergency and the current location and status of the emergency vehicles, the dispatcher determines which vehicles(s) to dispatch and when they should be dispatched.

The call processing system includes means for receiving network provided call information or means for prompting and receiving optional caller provided input to capture a valid first location telephone number. The call processing system further includes a process for indexing the valid first location telephone number into at least one Master Telephone Number to Spatial Key database to retrieve information associated with the first location's telephone number and a means to provide the received and retrieved information associated with the first location's telephone number to provide one or more improvements to the service of at least one call recipient.

The improvements in service are provided to one or more of the following recipients: a caller, a servicing location and/or a vanity number advertiser. These improvements in service or benefits are provided either during the call, parallel to the call, and/or post call. The service benefits include the following: determining the selected servicing location telephone number and providing it to the network to automatically connect the caller to the selected servicing location; determining that the caller requires operator assistance and providing the network with the information required to connect the caller to a vanity advertiser operator; and/or providing one of a plurality of informational items.

The improvements in service illustrated in the application examples all relate to a consumer or business dialing a business or government vanity number. However, at some future point in time, the CTI network will evolve to where the called party can also be a consumer. At this future point in time, the called consumer can have access to all the information related to the calling telephone that the servicing locations and vanity advertisers have in the above examples, such as having the name, address, caller type (consumer, business, pay phone or government, etc.) associated with the calling telephone displayed on his or her future-generation caller ID box before he or she answers the telephone.

The preferred process uses the full 10 digits of the North American Dialing Plan 10 digit telephone number as the telephone number. Obviously, if the system were implemented within a single NPA with no overlapping NPAs, a 7 digit number could easily be substituted by one skilled in the art. Also, if at some point in the future, the North American dialing plan were revised or replaced with another plan, the process would still function the same way with a different number of digits.

The call processing system includes a process for validating the received telephone number. This process includes at least one of the following: verifying the telephone number is ten digits in length, only contains the numbers 0 through 9, and digits one and four are the numbers 2 through 9 inclusive; comparing the received NPANXX against an Area Code Split File and updating the received NPANXX; indexing the received NPANXX against a Local Exchange Routing Guide (LERG) file and determining the validity of the received NPANXX-XXXX; and comparing the received NPANXX against a V&H coordinate file to determine the type of NPANXX and the location of the NPANXX.

The Master Telephone Number to Spatial Key database is a Virtual Telephone Number database created via Spatial Key linkage. It is created by combining a Master Telephone Number to Spatial Key database with a Spatial Key indexed database. The invention also includes a set of processes to maintain the Master Telephone Number to Spatial Key database: a process for data providers to provide Master Table Verification Records; a process to Build Master Table Update Records from Data Provider Supplied Verification Records; a Master Table Update preprocess; and a Master Table Update process.

The Spatial Key indexed database includes one of the following: Spatial database, Geographic database, USPS Address database, Household database, Individual database linked to a Household database, Business Locations database, Business Financial database linked to a Business Locations database, Government Locations database, Property database, Client Table, or Service Locations Table linked to a Client Table.

The call processing system is designed in a modular manner to support many different clients or advertisers with many different applications. The set of system modules required to satisfy a specific client application is generally only a subset of the total system capabilities. These individual primary modules are summarized below. They include providing a means for:

1. Spatial Key database coding and maintenance.
2. Providing caller communication with a CTI network.
3. Capturing and validating the caller provided telephone number and the vanity number dialed.
4. Linking the captured telephone number to a Spatial Key via a Master Telephone Number to Spatial Key table.
5. Linking the Spatial Key to Spatial Key coded and/or indexed spatial, geographic, USPS address, household, individual, property, business location, government location record databases to retrieve data associated with the caller.
6. Linking the Caller's Spatial Key to service location ID(s) or telephone number(s) stored in a pre-built and Spatial Key coded and indexed Client Table associated with the vanity number dialed (DNIS).
7. Linking the servicing location ID(s) or telephone number (s) retrieved from the Client Table to other service location specific data stored in a Service Locations table associated with the vanity number dialed and indexed by ID or telephone number.
8. Connecting the caller to an exceptions handling operator or system.
9. Spatially relating, in the form of a map or directions, the caller provided telephone number location with the selected servicing location.
10. Connecting or transferring the caller to a servicing location.
11. Storing selected call information to be accessed later by the caller, the serving location, and/or the vanity advertiser.
12. Providing call, call parallel and/or post call information to the caller relating to the servicing location and/or the spatial relationship between the servicing location and the location of the caller provided telephone number.
13. Providing the caller with a post call communications.
14. Providing call, call parallel and/or post call information to the vanity number advertiser and the servicing location(s) regarding the ANI, DNIS, caller provided telephone number and corresponding Spatial Key, and data retrieved or processed from databases using the Spatial Key as a linkage means.

15. Providing the vanity number advertiser and servicing locations post call communications.

In one embodiment of the present invention there is a method of telephone call processing using a voice processing platform that is connected over a data link to a separate routing processing platform, the method comprising receiving, at a routing processing platform, a telephone number of a caller captured during a telephone call; determining, at the routing processing platform, a precise geographic identifier based on the caller telephone number; transmitting the geographic identifier over the data link to the voice processing platform; selecting at least one potential routing destination from a database based on the geographic identifier; and communicating information related to the at least one potential routing destination over a telecommunication network to the caller or else connecting the caller to one of the at least one potential routing destinations.

In another embodiment of the present invention there is a method of telephone call processing using a voice processing platform that is connected over a data link to a separate routing processing platform, the method comprising receiving, at a routing processing platform, a telephone number of a caller captured during a telephone call; determining, at the routing processing platform, a precise geographic identifier based on the caller telephone number; selecting at least one potential routing destination from a database based on the geographic identifier; transmitting information related to the at least one potential routing destination over the data link to the voice processing platform; and communicating information related to the at least one potential routing destination over the telecommunication network to the caller or else connecting the caller to one of the at least one potential routing destinations.

In yet another embodiment of the present invention there is a method of displaying information related to a telephone number, the method comprising capturing a telephone number of a first party over a network data link during a network communication session, determining a precise geographic identifier based on the captured telephone number, retrieving spatial information from a spatial database based on the precise geographic identifier, and communicating the retrieved spatial information over the network data link to the first party for display on a display device.

These features of the present invention will become more fully apparent from the following description and appended claims taken in conjunction with the accompanying drawings.

BRIEF DESCRIPTION OF DRAWINGS

FIG. 5 is a block diagram of the telecommunications network 212 of FIG. 2 illustrating different call routing alternatives;

DETAILED DESCRIPTION OF PREFERRED EMBODIMENTS

The following detailed description of the preferred embodiments presents a description of certain specific embodiments of the present invention. However, the present invention can be embodied in a multitude of different ways as defined and covered by the claims. In this description, reference is made to the drawings wherein like parts are designated with like numerals throughout.

Figure 1:
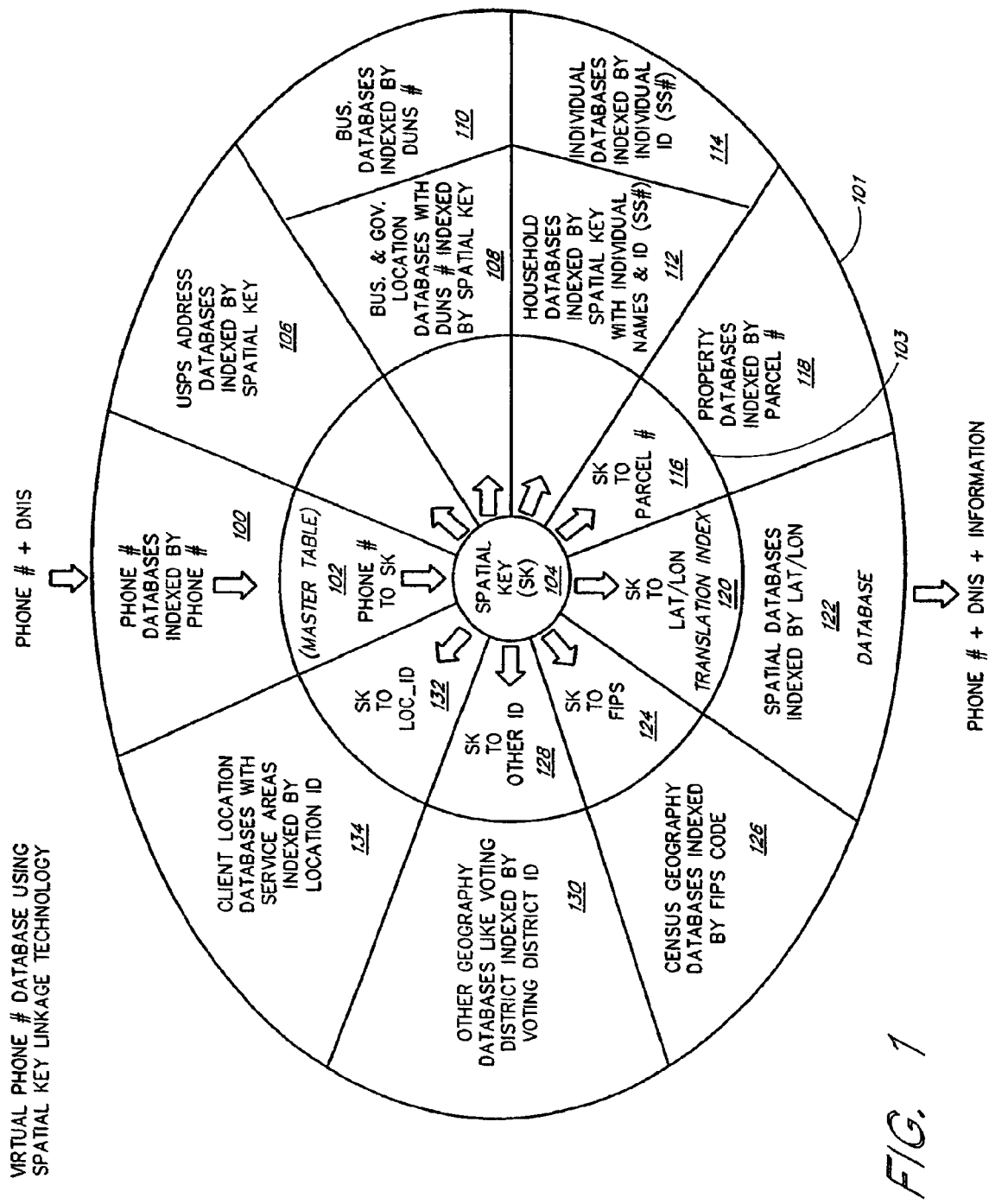
FIG. 1 is a high-level conceptual diagram illustrating multiple databases linked together via a Spatial Key to create a Virtual Telephone Number database.

For convenience, the discussion of the preferred embodiments will be organized into the following principal sections:

I. Virtual Telephone Number Database Description
II. CTI Network Description and Functionality
III. Call Center Call Processing System IV. CASS Certified Address Build
V. Master Table Build and Maintenance Description
I. Virtual Telephone Number Database Description FIG. 1 illustrates how a telephone number can be enhanced with almost an unlimited amount of attribute data. Traditionally, for most clients and their telecommunications call processing applications, telephone number databases have either not been available, contained only bare telephone numbers with standard telecommunications network call detail report data, such as time and length of call, or contained only a few previous caller or customer records with limited amounts of manually captured and recorded telephone number attribute data.

FIG. 1 shows many different types of databases in an outer database ring 101 with their corresponding Spatial Key Linkage Translation indices shown in a middle ring 103. Three of the database types (106, 108 and 110, and 112 and 114) do not have a corresponding Translation index because they are indexed by a Spatial Key making the Translation index unnecessary. For descriptive purposes, a Spatial Key indexed database is defined to be any database that is accessed directly via the Spatial Key or indirectly through a Spatial Key Translation index.

Referring to FIG. 1, a functional flow using Spatial Key linkage technology will be described. A caller's or caller provided telephone number and a DNIS are passed to a process for updating, validating, classifying, and screening that utilizes a set of Telephone Number Databases Indexed by Telephone Number 100. This process is further described in conjunction with FIG. 7 hereinbelow. The resultant processed telephone number is used to access a Phone Number to Spatial Key or Master Table 102 to retrieve a Spatial Key 104. The Spatial Key 104 is then used to directly access data in the databases (e.g., 106, 108 and 110, and 112 and 114) that do not require a translation index. Otherwise, the Spatial Key is used by a translation index to retrieve a secondary index (e.g., voting district ID from index 128) for accessing databases (e.g., 118, 122, 126, 130, 134) requiring a translation index. The resultant database information, the caller's telephone number and the DNIS are then used to connect the caller to a servicing location and/or provide service location related information.

The Telephone Number to Spatial Key Translation index 102 (Master Table) could be combined with the Spatial Key indexed databases by an offline merge, append and/or link process to create telephone number indexed databases containing all of the above illustrated information. These combined master telephone number indexed database(s) would obviously be more maintenance intensive because of the magnitude of the offline maintenance required to synchronize telephone number changes, client service location changes and maintaining the spatial relationship between the telephone number and each client's service locations, but such combined databases would provide slightly faster data access times.

FIG. 1 illustrates a one-way linkage starting with a telephone number. Referring to FIG. 1, one skilled in the art could see the Spatial Key linkage technology could be used for applications that do not start with a telephone number. In another embodiment, for example, by starting with a client location instead of a telephone number, one could generate a list of all telephone numbers of potential customers serviced by the selected location. In yet another embodiment, by starting with a name and address, one could determine the telephone number(s) for that address and the other individuals living at that address. This is a directory assistance type of application.

The specifics for each database type (of FIG. 1) in terms of data components, sources, Spatial Key coding and maintenance issues will be discussed in detail in the following sections.

Telephone Number Databases Indexed by Telephone Number (100, FIG. 1)

There are three types of databases that fall within this category: Telephone number changes, verification and classification databases; client specific customer databases; and negative or inverse lists. These databases must all be updated monthly and synchronized to a given date in the month. The 15th of the month is the preferred date, but any day could be selected.

Regarding telephone number changes, verification and classification, the official source is Bellcore. They publish a variety of publicly available files, with the most comprehensive being the Local Exchange Routing Guide (LERG) files and their derivatives. Bellcore releases files on a monthly basis. The date that NPANXXs change, are added or are deleted is provided with the files. The files must be updated monthly to coordinate the changes that will occur in the following month.

The Telephone Number Databases Indexed by Telephone Number generally indicated at 100 (FIG. 1) comprise several files, lists, or databases. The preferred databases 100 include a NPANXX Split file, a LERG6 file, a V&H Coordinate file, one or more Customer databases, and a Negative database. These databases will be described in conjunction with FIG. 7, along with a process 308 (FIG. 7) of adding intelligence to the input telephone number by retrieving information from these telephone number indexed databases during the call. This process can be considered a detailed expansion of block 100 (FIG. 1). Other databases may be utilized in other embodiments.

Telephone Number to Spatial Key (Master Table) (102, FIG. 1)

The completeness, currency and accuracy of the Master Table is the key to the efficiency and functionality of all applications. In order to build and maintain the most complete, current and accurate Master Table possible, the table must be created from multiple sources. In addition, since the Master Table is designed to be used by both regulated and non-regulated entities in the regulated telephone network, none of the Master Table data can be customer provided network information.

There are four separate processes to build and maintain the Master Table. These process are as follows:
1. Process for Data Provider to Provide Master Table Verification Records (FIG. 11A)
2. Process to Build Master Table Update Records from Data Provider Supplied Verification Records (FIG. 11B)
3. Master Table Update Preprocess (FIG. 11C)
4. Master Table Update Process (FIG. 11D)

These Master Table build and maintenance processes are further described hereinbelow.

Spatial Key (104, FIG. 1)

The preferred Spatial Key is the 19 digit code used to link databases together.

USPS Address Databases Indexed by Spatial Key (106, FIG. 1)

There are two USPS databases required to build a USPS CASS certified address from a Spatial Key: a City State file and a ZIP+4 Address Coding Guide. There is one City State detail record for each 5 digit ZIP code and one or more ZIP+4 Addresses Coding Guide records for each unique ZIP+4. The ZIP+4 Address Coding Guide contains multiple records in a situation where there is a multiple set of secondary address ranges associated with a single ZIP+4. The use of these two USPS databases to build a USPS CASS certified address from a Spatial Key will be described in conjunction with FIG. 10 hereinbelow.

Business and Government Location Databases Indexed by Spatial Key Containing DUNS Number (108, FIG. 1)

A preferred Business and Government Locations File 108 is a DUNS file. The ten million plus record file contains a business or government name and both a physical and mailing address, if they are not both the same. Each address is run through DPC coding software, as described in process 402 of FIG. 11A, and an 11 digit ZIP Code is assigned. If the address contains a secondary address, such as a Suite #, then it is reformatted into an eight digit field according to the rules described in process 432 of FIG. 11B. If there is no secondary address, the last eight digits are set to all blank characters. The 11 digit segment and the eight digit segment are concatenated together to form the 19 digit Spatial Key, and a file index is created on this key.

It is now a basic process to look up a Spatial Key in the file and retrieve the location record data associated with the Spatial Key, including the location's DUNS number and its parent's DUNS number if the location is owned by a higher level corporate entity.

Business Database Indexed by DUNS Number (110, FIG. 1)

The DUNS' numbers retrieved above (database 108) can then be used to access a DUNS Corporate database 110 to obtain names of corporate officers and credit history information. This is very valuable in many types of business to business transactions.

Household Databases Indexed by Spatial Key Containing Individual Names and IDs (Social Security Number) (112, FIG. 1)

A preferred Household database 112 is ACXIOM's OMNIBASE database. This 100 million plus record database is Spatial Key coded and indexed as described above. For each household record it contains many household characteristics, such as name of head of household, date of birth of head of household, estimated household income, and so forth. It also links to 265 million individuals known to be associated with one or more households. For each individual, the database contains their name, date of birth, social security number, driver's license number and other similar data.

It is a straightforward process to look up a Spatial Key in the OMNIBASE database and retrieve the associated household and individual data. Another application that is conducive to hierarchical Spatial Key retrieval from the database is a nearest neighbor application.

Individual Databases Indexed by Individual ID (Social Security Number) (114, FIG. 1)

There are three major individual databases 114 that are indexed by social security number: TRW, Equifax and TransUnion (TU). The preferred database is the TU database. Once an individual's social security number has been retrieved from above (database 112), it is a basic process to use the social security number as a means of retrieving credit and public record data associated with the social security number from the TU database.

Polk and some states provide access into their driver license databases based on knowing a driver's license number. Again, once this is retrieved from database 112 above, it is a basic process to access this data. This data contains driving history, and in some cases, linkage to vehicle registration data. An automobile make and model associated with the household and individuals can be retrieved from the vehicle registration data.

Spatial Key to Parcel Number (116, FIG. 1)

A Spatial Key to Parcel Number Translation index 116 is created by ACXIOM by extracting property address, owner address and parcel number from the DATAQUICK database. The parcel number is usually the FIPS Code of a local government entity responsible for managing title and/or property taxes to real property plus the locally assigned parcel number. The addresses are Spatial Key coded as previously described and the Parcel Number Translation database is created with the following fields and indexed by Spatial Key:

Spatial Key
Parcel Number (government entity code+local parcel number)
Spatial Key Type Code (O=Owner or P=Parcel)

It is a straightforward process to index a Spatial Key into this Translation database and retrieve all parcel numbers associated with the Spatial Key.

Property Database Indexed by Parcel Number (118, FIG. 1)

The ACXIOM DATAQUICK database is indexed by parcel number based on parcel number(s) retrieved above from index 116. Information, such as owner, liens, mortgage amount, mortgage lender, purchase date is available for the individual parcel or all the parcels associated with the owner's tax address.

Spatial Key to Latitude and Longitude (120, FIG. 1)

A preferred Spatial Key to Latitude and Longitude database 120 is the GDT ZIP+4 to Latitude and Longitude file. This database is currently updated quarterly. Latitude and longitude are provided in NAD27 in millionths of a degree. Each record also contains the USPS ZIP+4 type and the precision with which that latitude and longitude were assigned: ZIP+4 centroid, ZIP+2 centroid or ZIP centroid. There are approximately 28 million street, firm and high-rise ZIP+4s that have been latitude and longitude coded to their ZIP+4 centroid by matching against enhanced TIGER files called DYNAMAP®, available from Geographic Data Technology, Inc. (GDT). This file is indexed by ZIP+4 and it is a straightforward process to lookup a ZIP+4 on the file and retrieve the latitude and longitude associated with the ZIP+4.

In the not too distant future, a ZIP+6 to Latitude and Longitude file will most likely become available. At that point in time, with all other issues being equal, it would become the preferred translation file and could be incorporated into the system without any modifications other than changing the size of the key from 9 digits to 11 digits.

Spatial Databases Indexed by Latitude and Longitude Quadtree (122, FIG. 1)

There are many types of Spatial databases 122 available from many different sources. In general, they are classified into 0-D, 1-D and 2-D databases and networks. The terms 0-D, 1-D and 2-D correspond to the number of dimensions: a zero dimensional database contains points such as the latitude and longitude point where two or more street segments intersect; a one dimensional database is a database of line segments, e.g., two latitude and longitude points connected by a straight line, such as the street segment connecting one intersection to the next intersection; and a two dimensional database is a database of areas defined by polygons or circles, such as a census block defined by a three or more point latitude and longitude polygon boundary. A general definition of a GIS or spatial network is a system to link related 0-D, 1-D and 2-D databases together. For example, the GIS network provides the means to know what other street links connect to a starting street link, what other links or points the link crosses, and what areas the link borders or crosses. A spatial database is not like other databases and has three components: the spatial data, the spatial network and a spatial data network interface or application program interface (API).

Consequently, there are many different proprietary spatial database network designs with various strengths and weaknesses. Unfortunately, spatial data cannot always be moved from one network design to another without some distortion, and there is no "best" spatial database and network for all applications.

Fortunately, from an API perspective, almost all spatial database systems will accept one or more 0-D, 1-D, and/or 2-D latitude and longitude defined inputs and return a result that can be easily handled by the calling application. For example, in the area of driveable street directions and maps, the preferred spatial database system is from ETAC which specializes in automobile navigation systems. In most major markets, ETAC has enhanced the TIGER files by classifying streets by type, identifying one way streets and streets with no right or left turn restrictions. ETAC's street information, network design and API were created primarily to provide driving directions in the form of text or various resolution street maps stored as bitmaps. This makes ETAC a clear supplier for GIS applications related to providing driveable directions and street maps.

On the other hand, in terms of general spatial database processing platforms supported and spatial database manipulation, Environmental Systems Research Institute, Inc. (ESRI®) in Redlands, Calif. has no equal to its ARCINFO product. Many spatial database providers such as GDT provide their spatial data in ARCINFO format, as well as formats to support SMI and MapInfo.

There are many specialized spatial database suppliers. For example, Vista Environmental provides 0-D and 2-D environmental data for underground storage tank locations, hazardous waste spill locations, hazardous material storage locations and hazardous material dump site areas. There are other spatial database providers that have spatial databases of shopping centers, financial institutions with deposits, restaurants by type, ATMs, drop boxes, fire hydrants, flood planes, earthquake fault lines, power lines and so forth.

Information from all these databases is now accessible by simply passing a latitude and longitude definition, an information request and a returned information format request to the GIS API.

Spatial Key to FIPS Code (124, FIG. 1)

A preferred Spatial Key to FIPS Code (census block) database 124 is a GDT ZIP+4 to 1990 Census Block file. This file is currently updated quarterly. The ZIP+4 can change monthly, while the census blocks change only with each decennial census.

This file is indexed by ZIP+4 and it is a straightforward process to look up a ZIP+4 on the file and retrieve the census block associated with the ZIP+4. In a very small percentage of cases, there can be two or more census blocks associated with a ZIP+4.

Census Geography Databases Indexed by FIPS Code (126, FIG. 1)

In terms of Census Geography databases 126, there are four different types: most recent census data, updates and projections, geodemographic systems and other data reported by census geography.

The preferred source for the most recent (e.g., 1990) census small geographic area data is the U.S. Census Bureau. They publish two sets of small area data files called the Summary Tape Files (STF). These files are divided into two groups: 100% count data, published as STF1 data and sample data, published as STF3 data. STF1 data is available for each of the 6.3 million census blocks and higher level geographies. Each geography record contains several hundred demographic variables, such as population counts by race and age and household counts by property value. The STF3 files are published for the 223 thousand census block groups and higher level geographies. Each geography record contains an additional several hundred demographic variables, such as average household income and counts of head of households by age and by income.

In terms of updates and projections, there are two major suppliers with equal reputations: Claritas and Equifax National Decision Systems. These suppliers provide current year estimates and five years projections for population, households, population by age, households by income, head of household age by income and other data for block group geography and above.

Again, both Claritas and Equifax National Decision Systems provide geodemographic systems. A geodemographic system is a classification system where each geographic area is classified into a single code based on the demographic and other characteristics associated with the geographic unit. There are usually between 40 and 100 unique sequential numeric codes in a geodemographic system. These systems were initially available for only census geography, but are now available for both census geography and postal geography. The value of the system is that there are individual company customer databases and syndicated panel databases containing as many as 50,000 panel members from suppliers such as Simmons, National Panel Data (NPD) and Mediamark Research Institute (MRI). Based on the customer or panel member address, they are assigned a geodemographic code. These customers or panel members have purchased products or filled out questionnaires on products and services. These panel databases are tabulated by geodemographic code and by product creating geodemographic consumption propensity tables of several thousand products and/or services with purchasing rates by geodemographic code. This data is readily accessible by looking up a FIPS code in a census geography database and retrieving the geodemographic code. Then by looking up the geodemographic code in the geodemographic consumption propensity table, the consumption propensity for the desired product or service can be retrieved.

There are special databases that are provided by government agencies such as the Federal Deposit Insurance Company (FDIC). The FDIC requires all FDIC controlled lending institutions to report all applications for home mortgage loans by age, race, loan amount, loan status and the census tract of applicant property. The FDIC publishes this data in an electronic form on a quarterly basis. This data is tabulated by census tract and provided by companies such as Claritas and Equifax.

All the above-mentioned data is readily accessible by looking up a FIPS code in a Census Geography database and retrieving the desired dependent data.

Spatial Key to Other ID (128, FIG. 1)

In addition to census geography codes and latitude and longitudes, the TIGER files also containing voting precinct codes and school district codes for each street link. The same process used by GDT and others to create a ZIP+4 to Census Block file can also be used to create a ZIP+4 to Voting Precinct file and a ZIP+4 to School District file, for example. These files have not previously been created because of lack of demand. However, there will most likely be a ZIP+4 to Voting Precinct file available from GDT prior to a general election. By indexing this file by ZIP+4, it is a straight forward process to look up a ZIP+4 on the file and retrieve the voting precinct associated with the ZIP+4.

Other Geography Database such as Voting District Indexed by Voting District ID (130, FIG. 1)

There are statistical summary files from governmental agencies that provide the number of registered voters by party and by voting precinct. For example, as a general election gets closer, both parties and news agencies will seek public opinion on various issues and candidates. Using a 800 or 900 number, callers placing votes can be tabulated in real time and the caller's precinct dependent data can be looked up and statistically modeled to provide national level estimates and voting statistics by party.

Spatial Key to Location ID (DNIS Dependent Client Table) (132, FIG. 1)

This translation table is called a Client Table 132 and the procedure for building it is described in detail in Applicant's patent entitled "Automatic Routing System for Telephonic Services", U.S. Pat. No. 5,506,897, which is hereby incorporated by reference. In summary, a Client Table record is created for each ZIP+4 that spatially lies inside a service location's service area defined as a geographic area of any size and shape. This process is repeated for each service area and the resultant file is sorted and indexed by ZIP+4 creating the Client Table. The Client Table can be indexed by ZIP+4 to retrieve a service location ID. There is one Client Table per Client that is identified by the DNIS.

Client Locations Databases with Services Areas of Any Size or Shape Indexed by Location ID (134, FIG. 1)

These are basic "one record per service location" databases 134 indexed by Location ID. They can contain almost any type of service location data, such as, but not limited to, the following: name, address, latitude/longitude, service area type and latitude/longitude definition, telephone number, FAX number, E-Mail address, days and hours open, micro area directions, store promotions and events, and store product inventories or menus and prices. There is one Client Locations database 134 per client that is identified by DNIS.

II. CTI Network Description and Functionality

CTI Network Major Components

Figure 2:
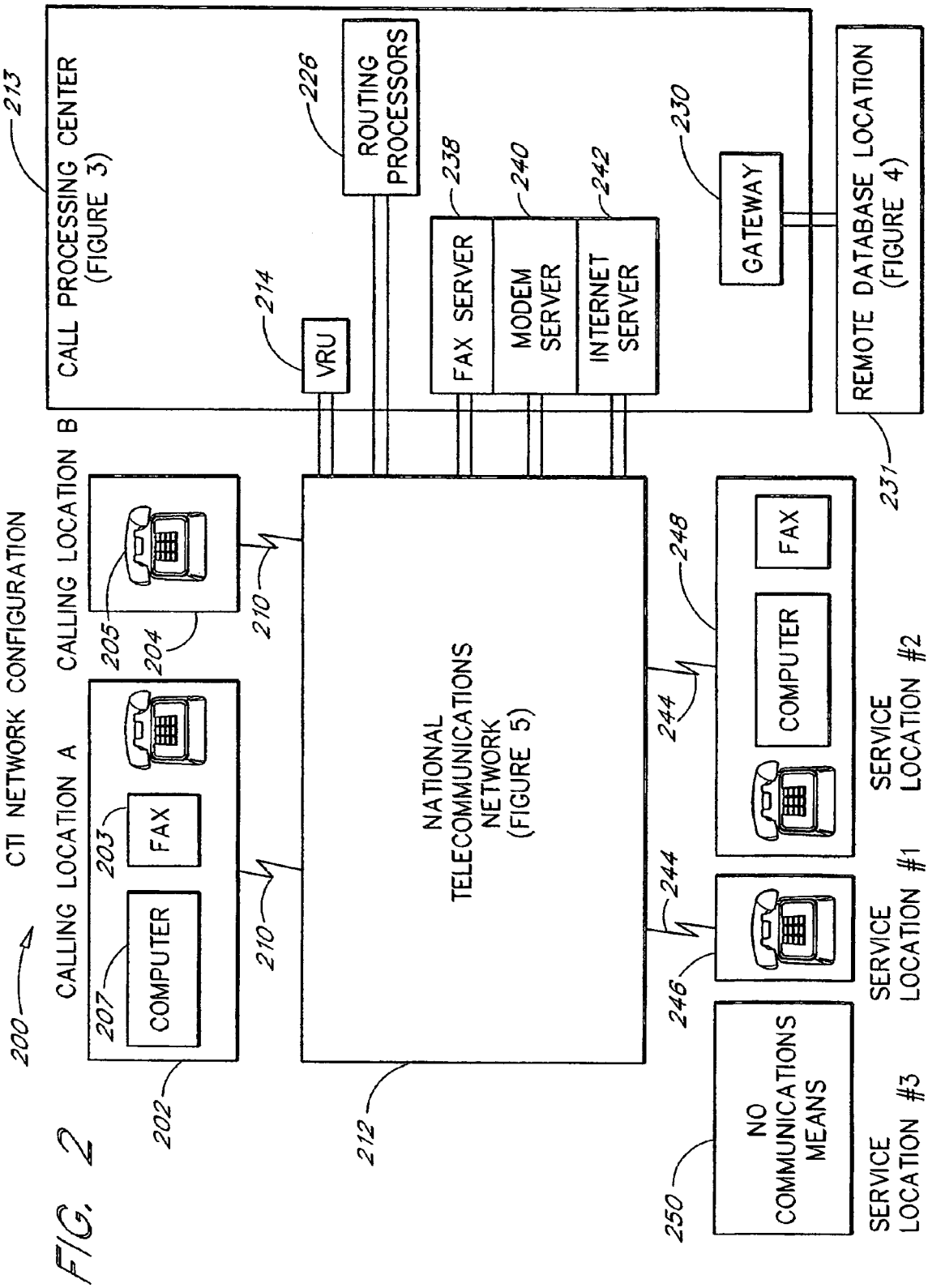
FIG. 2 is a network diagram illustrating a preferred network design for utilizing the databases of FIG. 1.

Referring to FIG. 2, a CTI network 200 is composed of five Major components:
1. Caller locations, such as 202, 204;
2. Servicing locations, such as 246, 248, 250;
3. National Telecommunications Network 212;
4. Call Processing Center 213; and
5. Remote Database Processing Center 231.

The CTI network 200 is used to provide service and information to the caller at a calling location (e.g., 202 or 204), servicing location (e.g., 246 or 248) and/or vanity number advertiser (not shown). The vanity number advertiser can be considered to be any entity that has advertised, published and/or owns the rights to the dialed number. The calling locations are connected to the National Telecommunications Network 212 by one or more lines 210 (to each calling location), which may be a single public switched telecommunications network (PSTN) line, multiple lines, an ISDN line (that can carry voice and data), a cellular or personal communications service (PCS) link, a microwave connection, a satellite link, and so forth. The network 212 is linked to the call processing center 213 by a plurality of bidirectional channels. These channels include connections to a VRU 214, one or more routing processors 226, a fax server 238, a modem server 240 and an Internet server 242. The network 212 is further connected to a plurality of service locations by one or more lines 244 (to each service location). These lines 244 are of similar types enumerated above in conjunction with the calling lines 210.

The call processing center 213 includes a plurality of databases as will be described below. One or more of these databases may be located at a remote database location 231. A gateway 230 at the center 213 enables connection via a bidirectional channel to the remote database center 231.

A telephone call that initiates at a calling location may be routed through the network 212 by use of the call processing center 213 and/or information about a caller, servicing location or advertiser may be provided to the caller, servicing location, or advertiser through the network 212 by use of the center 213. The call processing center 213 provides the intelligence of where the call is to be routed or the information to be provided to the caller, servicing location and/or vanity advertiser. The network 212 receives this data and acts on it as directed by the center 213. The center 213 may optionally access databases at a remote location, such as at remote database center 231. The network 212, the center 213 and the remote location 231 will be further described hereinbelow.

Caller Locations

All caller locations, e.g., 202, 204, must have a telephone such as telephone 205. The telephone can either be a Touchtone, a rotary telephone, or an emulated telephone. With a Touchtone telephone, the caller is able to provide input via the telephone key pad using Dual Tone Multi-Frequency (DTMF) or by voice. With the rotary telephone, input is limited to voice. There are numerous Touchtone and rotary telephone manufacturers. The Touchtone phone manufacturers manufacture many different makes and models of telephones with Touchtone capability, such as single line telephones, multiple line telephones, Videophones, cordless telephones and cellular telephones. There are also computers that can emulate a telephone such as a Personal Digital Assistant (PDA) or a regular desktop or portable computer with a microphone, speakers and telephone emulation software, such as Microsoft Phone connected to a telephone network via a telephone line with a modem or a cellular modem.

The caller location can also have a FAX 203. This is only used in Call Parallel (multiple telephone lines required at caller location) or Post Call processes. There are many Fax manufacturers and personal computers with a FAX modem and FAX emulation software that can emulate a fax.

The caller location can also have a computer 207 with a modem and/or ISDN card. The computer 207 is used in Call Parallel (multiple telephone lines at caller location required for modem) or Post Call processes. In another embodiment, the Call Parallel process can be performed on a single phone line by utilizing a digital simultaneous voice data (DSVD) modem, such as a Sportster Vi 28.8 Kbps fax modem from U.S. Robotics Inc., or by use of an ISDN line.

Servicing Locations

There are three types of servicing locations:
1. Servicing locations with no communications means 250: These locations include drop boxes and ATMs. This type of location only supports customer pickup or drop off.
2. Servicing Locations with a telephone 246: A telephone is required to answer customer calls and may be of any of the many types of telephones described above.
3. Servicing Locations with a telephone and other communication means 248: A telephone is used to answer customer calls and a FAX and/or computer can be used in Call Parallel and Post Call processes. The FAX and computer specifications are the same as those described in the caller location section above. In some cases, a vanity advertiser location can be a special purpose service location. If the service location computer is a CTI computer and includes an ISDN card or a modem, a multitasking operating system, such as Microsoft Windows NT, telephone emulation software, such as Microsoft Phone, and is logged into the call processing center Internet server 242, the servicing location has the same database access capabilities as the call center operator described below.

National Telecommunications Network 212 (FIG. 2)

The National Telecommunications Network 212 provides the switch and transmission infrastructure to connect and transmit voice, network information and data between the caller location, e.g., 202 or 204, the servicing location, e.g., 246 or 248, and the CTI network 200.

There are two classes of vanity number type calls: Class 1 telephone calls are calls wherein the final terminating location is a servicing location determined by intelligence outside the telecommunications network. There are three separate architectures for class 1 calls. Class 2 telephone calls are calls where the final terminating location is the network terminating point of the vanity number. Class 2 calls utilize one architecture, wherein the call terminates at the VRU 214. The network 212, the classes and the architectures will be further described in conjunction with FIG. 5.

Call Processing Center 213 (FIG. 2)

The call processing center 213 which is, in essence, a service bureau for the vanity advertiser, is the central hub of the entire operation in supporting the caller, the vanity advertiser and the servicing locations. The preferred call processing center 213 is AT&T American Transtech (ATI) located in Jacksonville Fla. The center 213 interconnects with the national telecommunications network 212 and an optional remote database location 231 by the channels shown in FIG. 2. The call processing center 213 will be further described in conjunction with FIG. 3 hereinbelow.

Remote Database Processing Center 231 (FIG. 2)

One or more of the databases shown in FIG. 1 and utilized by the call processing center 213 may be physically located at a location remote from the center 213. This may occur, for example, for reasons of convenience, ease of maintenance, security, legal issues, regulatory issues and so forth. From a purely technical perspective, all of the databases shown in FIG. 1 could be located at the call processing center 213. A mainframe computer 232 at the remote processing center 231 is connected to a call processing center dual LAN 216 by the gateway 230. The remote database center 231 will be further described in conjunction with FIG. 4 hereinbelow.

Figure 3:
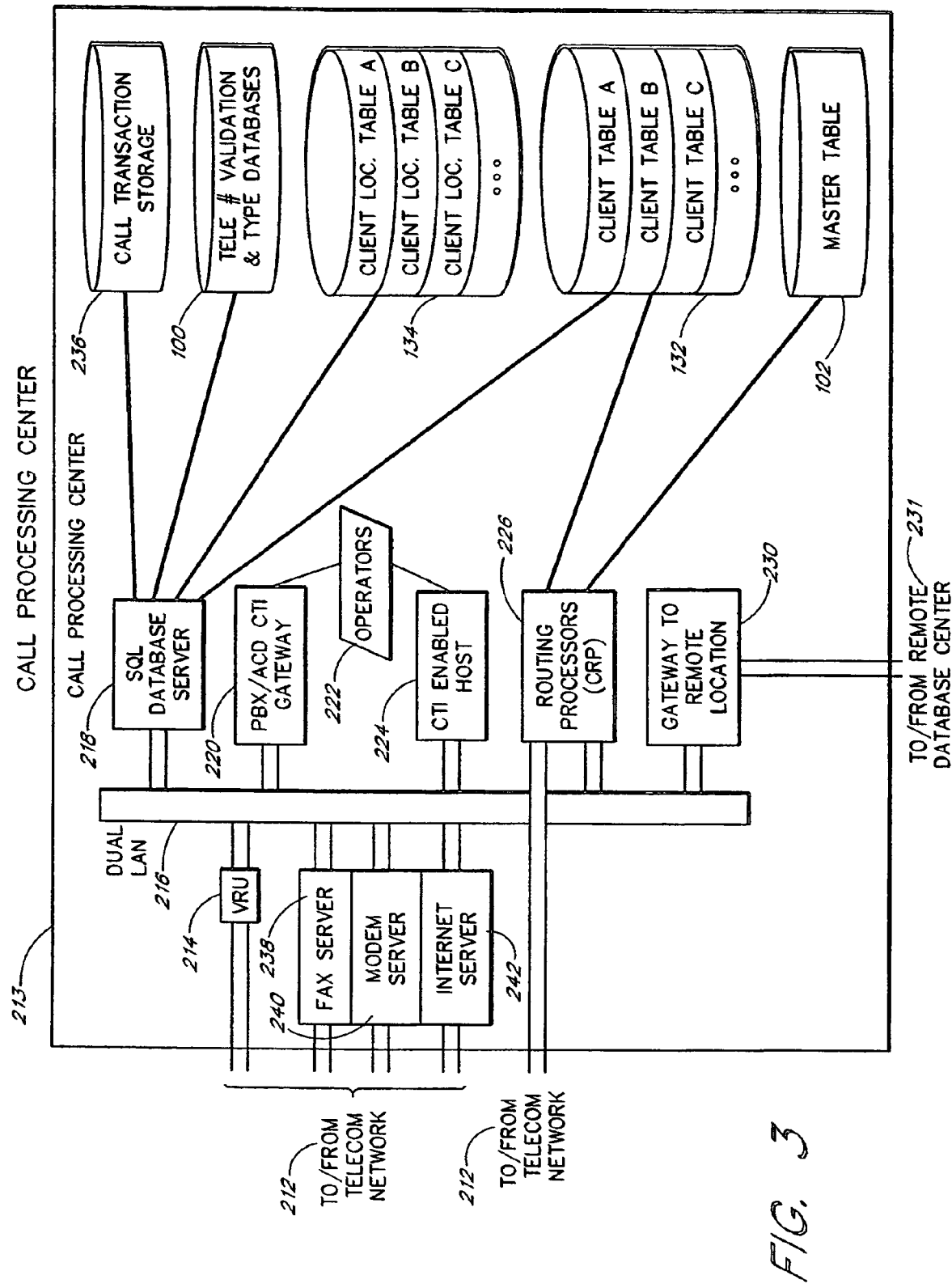
FIG. 3 is a block diagram of the call processing center 213 of FIG. 2.

Call Processing Center 213 (FIG. 3)

Referring to FIG. 3, the Call Processing Center 213 will now be further described. The call processing center 213 replaces the network operator or the initial answering party as it responds to input from the network 212 and the caller location, e.g., 202 or 204 (FIG. 2), retrieves information from various accessible databases, and uses this information to route the call to a service location, e.g., 246 or 248, or exceptions handling operator 222. In addition or alternatively, the call processing center 213 provides the caller at location 202 or 204, the servicing location 246 or 248, or the vanity advertiser (not shown) with application dependent information during the call, parallel to the call or post call by a variety of communications means.

The call processing center 213 includes the dual LAN 216 to which the VRU 214, the FAX server 238, the modem server 240, the Internet server 242, a SQL database server 218, a PBX/ACD CTI gateway 220, a CTI enabled host 224, one or more routing processor(s) 226, and the gateway to the remote database processing center 230 all bidirectionally interconnect. The dual LAN 216 comprises a primary LAN and a secondary LAN as a backup to provide fault-tolerant service. The LAN 216 utilizes the Transmission Control Protocol/Internet Protocol (TCP/IP) protocol. The PBX/ACD CTI gateway 220 and the CTI enabled host 224 each further connect to one or more human operators 222 as will be described hereinbelow. The SQL database server 218 further interconnects to the Telephone Number Validation and Type databases 100, the Client Location databases 134, the Client Tables 132 and a Call Transaction storage 236. The routing processor(s) 226 are further connected to the Master Table 102 and to the Client Tables 132. The databases and tables shown in FIG. 3 are preferably disk-resident, but with increased memory capacity for the database server or the routing processor, one or more of these databases could be converted by one skilled in the art to computer memory resident tables.

The VRU 214, such as the preferred AT&T Intuity Conversant Information Response System, is the primary interface between the national telecommunications network 212 and the rest of the call center 213 with its CTI (Computer Telephone Integration) network. The VRU 214 interconnects the national telecommunications network 212 with the dual LAN 216. The VRU 214 controls aspects of the call processing and routing processes. The VRU 214, as part of the CTI network 200, has the ability to control call processing and routing by:

accepting the voice signal, ANI and DNIS from the telephone network;

speaking recorded voice messages to the caller;

translating caller key pad input DTMF into computer data codes;

translating caller voice commands, such as "1,2,3, A,B,C, Yes and No", to computer data codes;

translating computer text into synthesized speech and speaking it to the caller;

communicating with other call center telephone and computer network systems and operators via communication protocols, such as ISDN, TCP/IP, Systems Network Architecture (SNA) Logical Unit (LU) 6.2, over a dual-wired Local Area Network (LAN);

communicating by a SNA LU 6.2 gateway over dual-pair leased data lines to a remote database center located at ACXIOM in Conway, Ark.;

sending the required information back to the telecommunications network to connect the caller with a servicing location; and writing out a call transaction record.

In addition to the VRU 214, the following is a list of other components of the call center 213 with a description of their functionality:

SQL Database Server 218

The Structured Query Language (SQL) Database server 218 connects to the call processing center LAN 216 and databases 100, 132, 134 and 236, as previously mentioned. The primary function of the SQL Database server 218 is to store and retrieve all call transaction data as well as storing, maintaining, and retrieving data from more dynamic databases. Data retrieved by the SQL server 218 is utilized by the VRU 214, for example, to provide information to one or more of the call processing recipients. The transaction data is maintained in the Call Transaction storage 236, and is specific to the current call. The transaction data is used for any post-call processing that may occur, for billing, and for historical or record-keeping purposes. The other databases accessed by the SQL server 218 include databases 100 used during an Update, Validation and Classification process described in conjunction with FIG. 7, and databases 132 and 134 for providing information to a call recipient. The preferred SQL Database server is available from Oracle Corporation running on a UNIX machine, such as an AT&T model 3600.

The transaction data is indexed by multiple indices including, but not limited to:
- DNIS by caller provided telephone number
- DNIS by Date and Time
- DNIS by Service Location Telephone Number and by Date and by Time
- DNIS by Service Location Telephone Number and by Caller Telephone Number
- Caller provided telephone number by Date and Time The transaction data includes, but is not limited to, the following:
- text (driveable directions, servicing location name and address)
- binary data (date, time, caller provided telephone number, ANI, DNIS, servicing location telephone number, operator or VRU handled call)
- graphics (maps showing the caller location, the servicing location and the street network)
- recorded voice (caller recorded name and address)

The dynamic databases include:
- Bellcore NPANXX Split file 344 (FIG. 7)
- Bellcore LERG6 file 350 (FIG. 7)
- Bellcore V&H Coordinate file 356 (FIG. 7)
- DNIS dependent Customer files indexed by telephone number 362 (FIG. 7)
- Exceptions file indexed by telephone number 368 (FIG. 7)
- DNIS dependent Client Tables 132 (FIG. 3)
- DNIS dependent Client Locations Tables 134 (FIG. 3)
- CTI PBX/ACD 220 and Host 224

The Private Branch Exchange/Automatic Call Distributor (PBX/ACD) 220 and the Host 224 both connect to the dual LAN 216, and further, to the set of human operators 222. The current preferred subsystem is the one currently utilized by AT&T American Transtech which includes an AT&T PBX/ACD 220, an IBM Host 224 and AT&T CTI software. The primary function of these components is to provide the operators 222 with a means to communicate with the caller by voice and simultaneously communicate with the CTI network 200 via a video monitor, CRT, or other visual display device. The operators 222 are utilized during exceptions call handling, as will be described hereinbelow. The operators 222 are also utilized for semi-automated applications, such as the applications previously described above.

The subsystem provides the following operator functionality:
- communicate via voice with the caller.
- transfer the call to a servicing location using Transfer Connect.
- enter a caller provided address and other application specific information on a CRT or other visual display connected to the Host 224.
- Spatial Key code the entered address using Group 1 software and ATI software that properly formats the last 8 digits of the Spatial Key.
- determine the servicing locations by accessing the DNIS defined Client Table 132 and Client Locations Table 134 based on the caller's Spatial Key.
- display information retrieved from the selected Servicing Location Table record on the CRT.
- display information on the CRT retrieved from remote databases based on knowing the caller's Spatial Key or telephone number.
- write out a call transaction record.

Customer Routing Processors (CRP) 226

The Customer Routing processor 226 directly connects with the national telecommunications network 212 and with the dual LAN 216. The CRP 226 further connects to the Client Tables 132 and the Master Table 102. Based on the DNIS received from the network 212, one of the plurality of Client Tables 132 is selected for use in processing by the CRP 226. The preferred CRP 226 is a function of how it is connected to the CTI network 200. If it is connected directly to an AT&T Long Distance Carrier (LDC) switch 504 (FIG. 5), the preferred CRP 226 is a Sun "Sparc 10" running under UNIX. If it is connected to the ATI LAN 216, the preferred CRP 226 is an AT&T 3600 running UNIX. A single CRP 226 can contain multiple processors and each processor can support multiple clients.

The CRP 226 provides the information needed to either route and complete the telephone call or to facilitate a service location information request. The primary function of the CRP 226 is to accept a telephone number from the network 212 and return a Spatial Key by looking up the telephone number in the Master Table 102 and retrieving the Spatial Key. Alternatively, the routing processor 226 accepts both telephone number and a DNIS and return a list of Servicing location IDs with the distance from the caller provided telephone number location to the servicing location. The CRP 226 first looks up the telephone number in the Master Table 102 and retrieves the Spatial Key, and then looks up the retrieved Spatial Key in the DNIS dependent Client Table 132 and retrieves the Servicing location(s) information associated with the Spatial Key. The retrieved information is placed on the LAN 216 for access by the SQL server 218 to use in retrieving information from the Client Location tables 134.

Internet Server 242

The Internet Server 242 interconnects the national telecommunications network 212 and the dual LAN 216. The preferred Internet server 242 is an AT&T 3600 computer running UNIX and ATI software. The Internet server 242 facilitates retrieval of call transaction data by one or more of the caller, the servicing location or the vanity advertiser. The primary function of the Internet Server 242 is to provide post call or call parallel access to call transaction data or data retrievable from call transaction data by the caller, the servicing location or the vanity advertiser. The use of the Internet server 242 in servicing each of the information recipients will now be described.

For the caller, the server software provides the ability for the caller to download or receive electronic mail information related to the selected servicing location, such as, but not limited to, the name, address, a map or directions from the caller's location to the servicing location, hours open and a menu. Once connected to the ATI Internet site over the line 210 (FIG. 2), the caller is asked to enter his or her telephone number and a vanity number to obtain the information requested during the call.

For the vanity advertiser connected to the Internet server 242, the server software provides the vanity advertiser the ability to download or receive by electronic mail, information related to a caller, such as, but not limited to, name, address, demographic data, and so forth, by entering the DNIS and the caller's telephone number. The above information may also be downloaded in a batch mode by entering the DNIS and a date/time range for selected servicing locations or all servicing locations.

For the servicing location, the server software provides the same download functionality over the line 244 (FIG. 2) as for the vanity advertiser. However, the service location can preferably only download, by file transfer, or receive, by electronic mail, call related data for its own location. The servicing location's electronic mail address is retrieved from the Client Service Locations file 134. In addition, for a service location with a CTI computer (such as location 248, FIG. 2), the Internet server 242 provides the access means for the servicing location to access caller telephone number and Spatial Key dependent data during the call.

FAX Server 238

The FAX Server 238 interconnects the national telecommunications network 212 and the dual LAN 216. The preferred FAX server 238 is an AT&T 3600 computer running UNIX with ATI FAX software. The FAX server 238 facilitates providing a way to provide printed information, such as a map or directions, to a call recipient. The primary function of the FAX server 238 is to send post call or call parallel Faxes to:
- the caller, wherein the FAX contains service location information or directions to the servicing location.
- the servicing location, wherein the FAX contains information about the caller or directions to the caller location.

The caller's FAX number is provided by the caller during the call to the VRU or the operator, and a FAX to the caller is sent over the line 210 (FIG. 2). Alternatively, the servicing location's FAX number is obtained from the Client Locations table 134 and a FAX to the servicing location is sent over the line 244. The information that is faxed is a function of the DNIS, the client application and the FAX recipient.

Modem Server 240

The Modem Server 240 interconnects the national telecommunications network 212 and the dual LAN 216. The preferred Modem server 240 is an AT&T 3600 computer running UNIX and ATI software. The Modem server 240 is similar to the Internet server 242 in terms of media, and similar to both the Internet Server and FAX Server 238 in terms of functionality. The Modem server 240 provides another way for obtaining call parallel or post call information through the call processing center 213. Because of the time required to connect with the call center 213, slow data transmission rates and the cost of connect time, the Modem server 240 is not currently practical for some applications. This could obviously change in the future.

Figure 4:
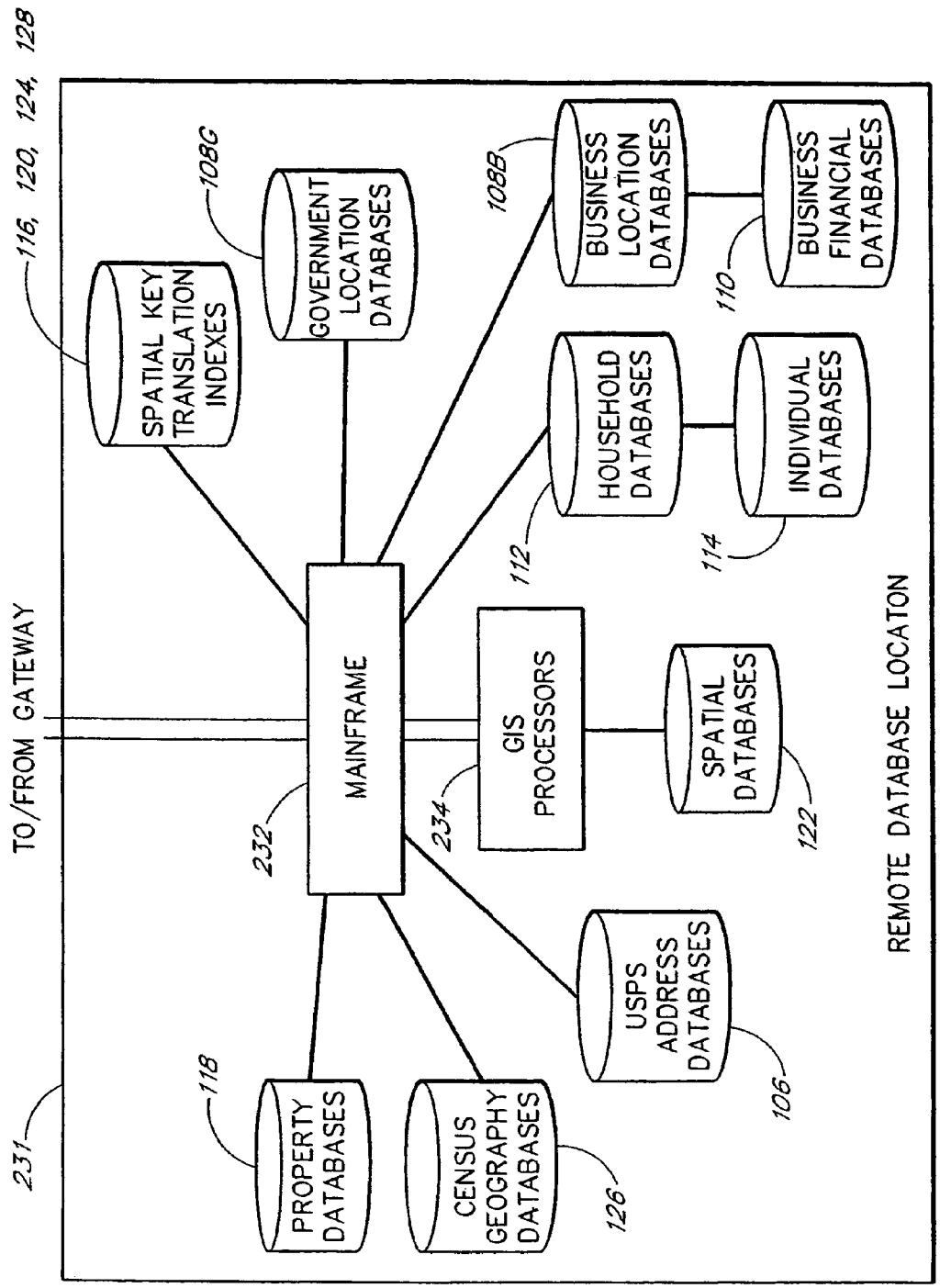
FIG. 4 is a block diagram of the remote database location 231 of FIG. 2.

Remote Database Processing Center 231 (FIG. 4)

Referring to FIG. 4, the Remote Database Processing Center 231 will now be described. The Mainframe computer 232 at the remote processing center 231 is preferably connected to the call processing center LAN 216 over a set of dual-pair leased data lines by the SNA LU 6.2 gateway 230. The preferred remote database processing center 231 is operated by ACXIOM Corporation in Conway, Ark. ACXIOM acts as a data processing service bureau primarily using IBM mainframe computers 232 and Reduced Instruction Set Computing (RISC) UNIX processors 234 for several different Fortune 500 companies. ACXIOM currently provides real-time access or is in the process of establishing real-time access to all the remote databases shown in FIG. 4 and defined in detail in FIG. 1. They currently support high-speed lease-line computer access to several client databases. They are also the preferred processor to build and maintain the Master Table 102 that is housed in its production form at AT&T American Transtech. Some of the remote databases shown in FIG. 4 could be stored at the Call Processing Center 213 or other locations remote to ACXIOM. The databases shown in FIG. 4 are preferably disk resident databases, but with increased memory capacity for the mainframe computer 232 or the migration to large memory 64 bit RISC computers like the DEC Alpha, one or more of these databases could be converted by one skilled in the art to computer memory resident tables.

National Telecommunications Network 212 (FIG. 5)

Referring to FIG. 5, the National Telecommunications Network 212 will be further described. As previously mentioned, there are two classes of vanity number calls. Class 1 telephone calls are calls where the final terminating location is a servicing location determined by intelligence outside the telecommunications network. Referring to FIG. 5, there are three separate architectures within Class 1 calls:

- Architecture A uses a Customer Routing Processor (CRP) connected via a data link to the Long Distance Carrier (LDC) switch outside a Local Exchange Carrier (LEC). During call setup at the LDC, the ANI and DNIS are passed to a CRP that determines and returns the terminating POTS number. The call is then connected to the servicing location associated with the determined POTS number. This architecture is utilized in the prior art.
- Architecture B is representative of a classical two call system. The first call is terminated at a VRU and the VRU determines the POTS number of the final destination and generates a second call from the VRU to the determined POTS number. It then patches the first and second call together so that the caller is connected to the servicing location. This architecture is also utilized in the prior art.
- Architecture C, the preferred architecture for most present applications utilizes an advanced AT&T network feature called Transfer Connect or Post Answer Redirect. In this architecture, the call is first connected to the VRU through the LDC switch where the VRU determines the POTS number of the servicing location. The VRU sends this information to the LDC switch and the LDC switch drops the call link from the LDC switch to the VRU and connects the caller to the servicing location associated with the POTS number. There are three different implementations of Transfer Connect:
  - Blind Transfer: The call is transferred without knowing if the servicing location will answer or if servicing location's line is busy. This is the least costly implementation and the one illustrated in FIG. 5.
  - Consult and Transfer: The call is connected between the VRU or operator and the servicing location before the VRU or operator drops out of the loop. This is the preferred implementation if the operator needs to consult with the servicing location before transferring the caller to the servicing location.
  - Conference and Transfer: This is a three party conference call that includes the caller, the VRU or the operator and the servicing location. This is the preferred implementation to announce the call to the servicing location when the telephone is answered and before the caller is connected, or if an exceptions handling operator needs to be involved in a 3-way conversation.
- Class 2 telephone calls are calls where the final terminating location is the network terminating point of the vanity number. This is called architecture D, wherein the call terminates at the VRU. This is the preferred embodiment for applications that do not require connecting the caller to a servicing location.

In all four architectures, as illustrated in FIG. 5, the typical call starts with a caller at a caller location, such as location 202, dialing a vanity number. In FIG. 5, all inter-process connectivity lines are labeled with one or more of the letters A,B,C,D indicating the architecture for which the connectivity applies. Note that the connectivity illustrated in FIG. 5 applies to voice calls. The use of the national telecommunications network 212 for computer (e.g., for Internet use) or fax connections is well known in the technology and will therefore not be described herein.

In architectures ABCD, the switch at a LEC1 256 accepts the call over a line 264 from the caller location 202 and assigns an ANI (Automatic Number Identification) number that is independent of the telephone used. According to AT&T, over 98% of all switches currently assign and pass a 10 digit ANI number.

Next the call, ANI number, and DNIS (Dialed Number Identification Service) number are passed over a line 266 by LEC1 256 to a switch for a Long Distance Carrier (LDC) 258, such as AT&T, MCI or Sprint. The preferred carrier is AT&T.

In architecture A, the LDC 258 passes the ANI and DNIS over line a 268 to a CRP 226 located at a remote location and the CRP returns a servicing location telephone number.

In architectures BCD, the call is connected over lines B 270, C 272 or D 274 to a terminating switch 260. The terminating network switch 260 can be located at the LEC that services the call processing center housing the VRU 214 or the call processing center can be connected directly to the long distance network with an AT&T "MEGACOM 800" or AT&T "MULTIQuest 900" service. The preferred implementation in this CTI network 200 (FIG. 2) is the direct connection to the AT&T long distance network using an AT&T 4 ESS switch with "MEGACOM 800" service located at AT&T American Transtech in Jacksonville, Fla.

In architectures BCD, the call is connected over lines B 278, C 280 or D 276 to the VRU 214, which can be connected to exceptions handling operators 222 as shown in FIG. 3 at the call processing center 213.

In architectures BCD, the VRU 214 passes an ANI or caller provided telephone number and DNIS to the CRP 226 on a line 282. The routing processor 226 sends a servicing location information packet containing the servicing location telephone number to the VRU 214 on line 282. At this point architecture D is complete from a telecommunications network connectivity perspective.

In architecture B, the VRU 214 opens a second port and dials the servicing location telephone number on a line 284 through the switch 260.

In architecture C, the VRU 214 notifies the switch 260 via an information packet on a data line 286 that it wants to transfer the call on the incoming line 280 to the servicing location number contained in the information packet. Connection 280 is then dropped between the VRU 214 and the switch 260.

In architecture B, the switch 260 connects the second call on a line 288 to the LDC switch 258 and passes along the service location telephone number.

In architecture C, the switch 260 notifies the LDC 258 that it wants to transfer the call to the POTS number contained in the information packet by sending an information packet on a line 290. Connection line 272 is then dropped between the switch 260 and the LDC switch 258.

In architectures ABC, the LDC 258 connects the call to a LEC3 262 on a line 292. In most cases LEC3 and LEC1 are the same LEC. LEC3 then connects the call over a line 294 to a servicing location, such as location 246 or 248.

In FIG. 5, the VRU 214 is shown outside the National Telecommunications Network 212 and is located at the call processing center 213 (FIG. 3). Currently, the LDC portion of the network does support limited VRU capability with high capacity but restricted functionality VRUs called network prompters. In the future, with expansion of communications capabilities between the LDC 258 and the CRP 226 and the upgrading of the network VRU capabilities, the network VRU could assume all the responsibilities of the VRU 214 currently located at the call processing center 213. This evolutionary process can also proceed one step further once the LEC can provide national long distance service and the network evolves into an Intelligent Network (IN) and then into an Advanced Intelligent Network (AIN). At this point, the LDC 258 could be eliminated and the VRU 214 and many of the responsibilities, if not all, of the call center 213 (and the remote database center 231 FIG. 4)) could be located at the LEC. The LEC could access the required virtual telephone number database, housed on a Service Control Point (SCP) computer (not shown), over the (AIN) signaling system #7 (SS7) network (not shown). Conceptually nothing will have changed other than changes in telecommunications laws and regulations which have created a more open system that makes more efficient network designs possible.

III. Call Center Call Process 300

Figure 6B:
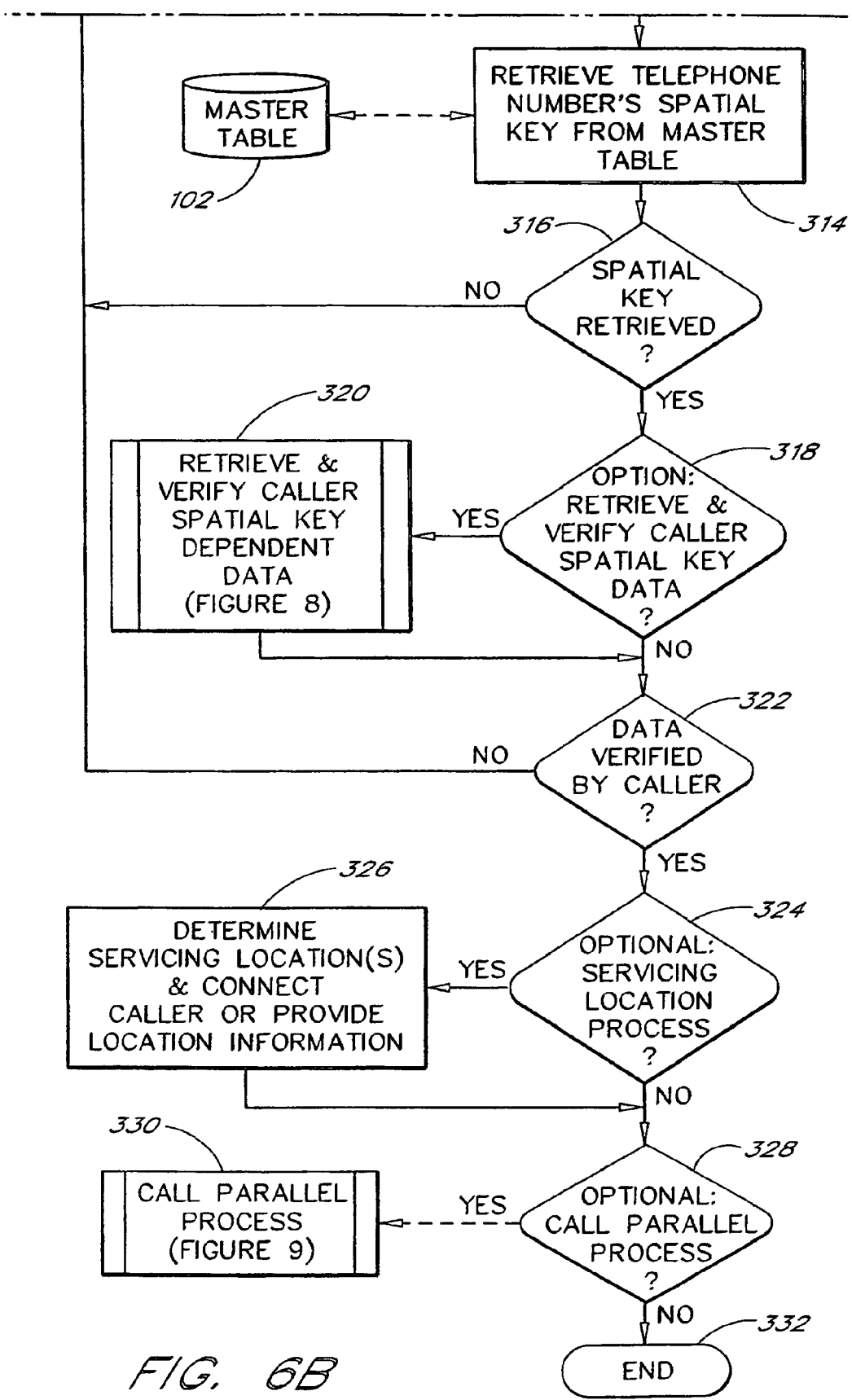
FIG. 6 is a system level flow diagram of a presently preferred Call Center Call process using the databases shown in FIG. 1 and the network shown in FIG. 2.

Referring primarily to FIG. 6 and also to FIG. 2, a process 300 shows an overview of the preferred Call Center Call process. However, other hybrids and variations of the system process could be employed by one skilled in the art to provide the same functionality. Process 300 and other processes described herein are executed by one or more of the processors on the CTI network 200.

Process 300 (FIG. 6) begins with a caller, such as a caller at caller location 202, dialing a vanity number. The call is processed by the national telecommunications network 212 (FIG. 2) and is answered by the VRU 214 at the call center 213. The VRU 214 decodes the information packet passed by the network 212 and determines the ANI and DNIS as shown in state 302.

Moving to a decision state 304, process 300 provides a way for the caller to enter a first location telephone number other than the ANI of the telephone from which they are calling. This is used in applications such as sending flowers to, for example, the caller's mother for Mother's Day, where the caller wants to place an order with a florist that delivers to the location of their mother's telephone. Another exemplary application is when the caller wants information mailed to his/her home, but the call is from a work location. If this option is not selected at state 304, then the first location telephone number is set to the ANI. If the optional telephone number input is selected at decision state 304, function 306 is activated and the caller provides the new telephone number by key pad entry on a Touchtone telephone or other device providing DTMF data, or by speaking the number slowly to the VRU 214.

After the first location telephone number is set to the ANI, or after the optional telephone number input at function 306, process 300 advances to a Update, Validation, Classification and Screen process 308. Process 308 updates, validates and classifies the first location telephone number passed through decision state 304 or from function 306. Process 308 will be described in detail hereinbelow in conjunction with FIG. 7.

The information obtained in process 308 is examined at a decision state 310. If the first location telephone number is invalid, the process 300 moves back to the top of decision state 304 to allow the caller to provide another telephone number. If the first location telephone number is a non-United States POTS number, such as a cellular number or a Canadian number, the call is sent to exception call handling at state 312. If the first location telephone number is a valid US POTS number, the process 300 proceeds to a function 314. The handling of invalid and non-US POTS numbers can vary by application.

At function 314, the valid US POTS first location telephone number is looked up in Master Table 102. If it is found, the matching Master Table record's Spatial Key is retrieved. If no Master Table record was found and retrieved, the call is routed to exception call handling at state 312 by a decision state 316. Otherwise, the call proceeds to a decision state 318.

If the application requires Spatial Key retrieved data related to the first location telephone number, decision state 318 calls a Retrieve and Verify process 320. Process 320 retrieves and verifies caller Spatial Key dependent data and is described in detail in conjunction with FIG. 8.

At the completion of process 320 or if decision state 318 evaluated to be false, process 300 proceeds to a decision state 322. If process 320 was called and the return flag's value is "exceptions", the call is routed to exception call handling at state 312. If the return flag value is "verified", or if decision state 318 evaluates false, the call continues on to an optional service locations decision state 324.

At decision state 324, if the application requires connecting the caller to a servicing location or providing the caller information regarding a servicing location(s), process 300 calls a Connect or Provide Information process 326. A detailed description of providing caller servicing location(s) information and connecting the caller to a servicing location is illustrated and explained in detail in Applicant's previous patent application entitled "Automatic Information and Routing System for Telephonic Services", U.S. Ser. No. 08/598,392, which is hereby incorporated by reference.

At the completion of process 326 or if decision state 324 evaluated to be false, process 300 proceeds to a decision state 328. At decision state 328, process 300 either spawns a Parallel Call process 330 and ends at state 332, or ends at state 332 without spawning parallel process 330. Both determining whether to spawn a parallel process and which parallel process to spawn are a function of the application and caller provided information. For example, a particular application may spawn a parallel process to FAX a map to a caller's FAX machine based on the caller's request while the call is in progress. Process 330 is described in conjunction with FIG. 9 below.

Figure 7:
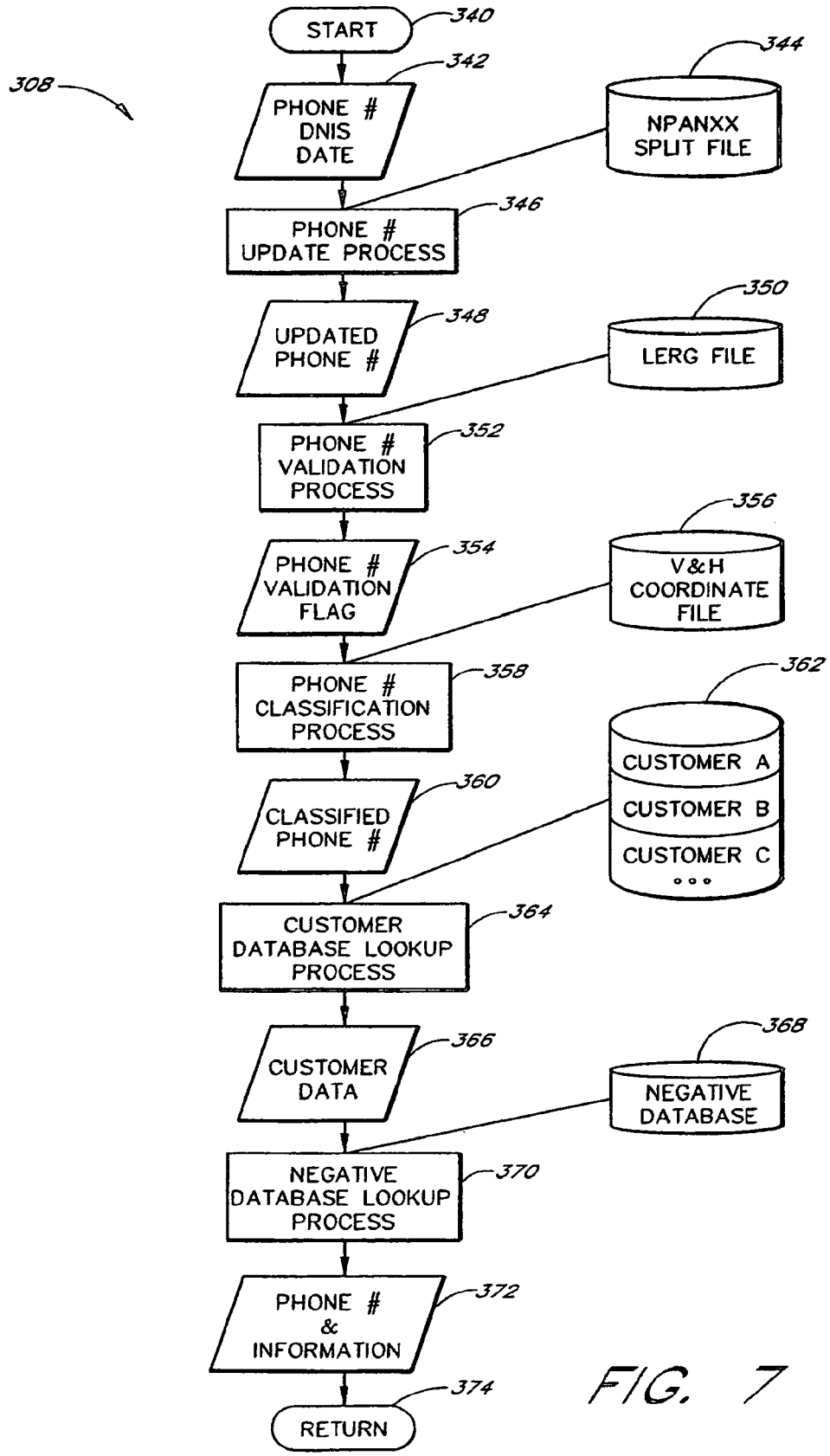
FIG. 7 is a flow diagram illustrating the process of validating and adding intelligence to an input telephone number by retrieving information from the telephone number indexed databases indicated at function 308 in FIG. 6.

Referring now to FIG. 7, the process 308 (defined in FIG. 6) of adding intelligence to the input telephone number by retrieving information from telephone number indexed databases during the call will be described. Before process 308 is executed, the caller provided telephone number goes through the following preliminary checks or edits. Checks are made to determine if the telephone number is 10 digits in length, each of the 10 digits is a number from 0 to 9, and the "Ns", i.e., the first and fourth digits, in the NPA-NXX-XXXX are 2 or greater. Of course, if the public telephone network is changed to use telephone numbers extended to a length greater than 10 digits, the checks and other system aspects will be modified to account for the new length.

To determine area code exchange changes, the preferred embodiment uses a NPANXX Split file 344. This file provides the new NPANXX and its corresponding old NPANXX and the time period, called the permissive dialing period, in which both are active.

For determining the validity of a given telephone number, a LERG6 file 350 is preferred. LERG6 refers to one of the several LERG files. This file contains a record for each valid NPANXX, its current status, and for each block of line numbers, the switch to which this block of line numbers is assigned. If the input telephone number's NPANXX is not in this file, or the NPANXX is in the file but the line number is not currently assigned to a switch, the telephone number is an invalid telephone number at that point in time.

The preferred file for classifying a telephone number is a V&H Coordinate file 356. For each valid NPANXX, this file contains the type of service provided, e.g., POTS, cellular, pager, and so forth; a dialable flag; V&H coordinates which can be converted to latitude and longitude; and country, state and city in which the NPANXX is located.

Client specific Customer databases 362 have been around for years and are DNIS dependent. These databases are used for special handling of preferred customers, problem customers or used to lookup a customer's last order in a pizza delivery application, for example. These databases are created and maintained to meet the specific needs of each client.

A negative list or inverse list can be a global list or DNIS dependent. If it is DNIS dependent, it is usually combined with the Customer database described above. A negative list 368 is a list of phone numbers of customers and/or potential customers that have historically bounced checks, not paid their bills or have presented some other type of problem. Equifax maintains such a database of telephone numbers for a consortium of long distance carriers. Each carrier provides their list of problem customers and Equifax merges these into a master list that is used by the consortium members to identify potential customers that have been canceled by one carrier trying to sign up with another carrier.

FIG. 7 illustrates the preferred embodiment as five separate lookup, retrieval and validation functions in a single serial block. One skilled in the art could change the order, combine some of the databases together, or create five separate blocks for the same functionality. The databases in FIG. 7 are shown as disk resident databases, but since these databases are small in size, one or more of these databases could be converted by one skilled in the art to computer memory resident tables.

All the databases in FIG. 7 are preferably updated for NPANXX splits. The updates are incorporated in the Split file 344, the LERG6 file 350 and the V&H Coordinate file 356 by Bellcore, and each record in these files is date coded as to when it goes into effect. The Customer databases 362 and the Negative database 368 are updated by a process similar to that shown by states 802 through 816 of FIG. 18A for updating the Master Table for NPANXX splits.

The process 308 begins at a start block 340. The edited telephone number and DNIS shown in state 342 are inherited by process 308 and used by function 346 in conjunction with the system date to look up the edited telephone number's NPANXX record in the NPANXX Split file 344. If the record is found and it passes an effective date test, function 346 combines the new NPANXX and the line number to create an updated telephone number 348. If the record is not found or the record is found but the effective date has not occurred, function 346 moves the edited telephone number to the updated telephone number state 348.

Proceeding to a validation function 352, process 308 accepts the updated telephone number from state 348 and looks up the updated telephone number's NPANXX in the LERG6 file 350. If the record is found and the updated telephone number's line number falls within a range of currently supported line numbers, then the valid phone number flag in state 354 is set to "yes". If the record is not found or the record is found but the updated telephone number's line number does not fall within a range of currently supported line numbers, the valid phone number flag is set to "no". If the flag in state 354 is set to "no", all following fields are set to blank characters by function 352 so they can be written out at state 372 by function 370.

If the validity flag in state 354 is "yes", then function 358 accepts input from state 354 and retrieves the V&H coordinate record corresponding to the updated telephone number's NPANXX from the V&H Coordinate file 356. The NPANXX is then classified by function 358, and the result along with previously determined information is written to state 360.

Continuing to a lookup function 364, process 308 accepts input from state 360. If the validity flag is "yes" and the DNIS corresponds to an on-line Customer database 362, then the updated telephone number is looked up in the corresponding DNIS Customer database. If the record is found, then the customer data is retrieved. Function 364 then writes the customer data and previously retrieved data to "customer data" at state 366. If the record is not found, the "customer data" is set to blank characters.

Advancing to a lookup function 370, process 308 accepts input from state 366. If the validity flag is "yes" and the Negative database 368 is present, function 370 then looks up the updated telephone number in the Negative database 368. If the updated telephone number is found, then the corresponding data is retrieved. If the updated telephone number is not found, the Negative database data is set to blank characters. Function 370 then writes out all retrieved and determined information at state 372. Process 308 completes and the information is returned at state 374.

Figure 8:
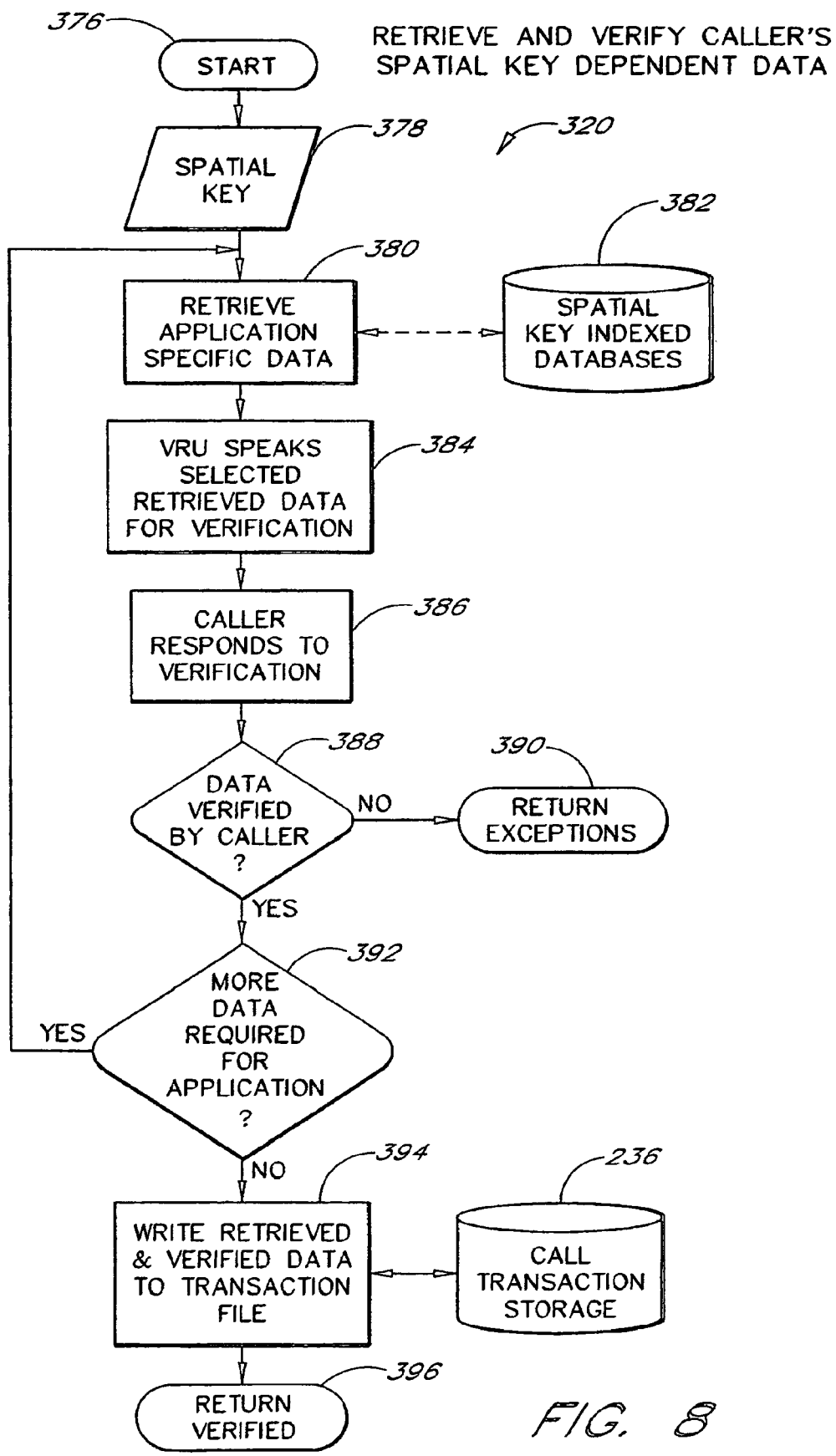
FIG. 8 is a flow diagram illustrating the Spatial Key retrieval and verification of caller dependent Spatial Key Data process indicated at 320 in FIG. 6.

Referring to FIG. 8, process 320 first identified in FIG. 6 will now be described. Process 320 begins at a start state 376 and has access to the first location's Spatial Key at state 378. State 380 uses the Spatial Key from state 378 to retrieve application specific Spatial Key dependent data from a set of Spatial Key Indexed databases 382. These are the Spatial Key Indexed Databases 106-134 shown in FIG. 1 and previously described in detail.

Moving to state 384, process 320 uses the VRU 214 (FIG. 2) to speak application dependent retrieved data to the caller for verification or additional input. Continuing to state 386, process 320 provides the caller a way to verify the retrieved data spoken by the VRU at state 384 or to provide additional application specific input as requested by the VRU 214 at state 384.

Proceeding to a decision state 388, process 320 determines if the caller has responded properly to the VRU 214 and/or validated the retrieved Spatial Key dependent data. If the caller has not responded properly or has verified the retrieved data as being erroneous, an exception handling return code flag is set to "exception" and process 320 exits at state 390. However, if it determined at decision state 388 that the caller has responded properly, the call proceeds to a decision state 392.

At decision state 392, process 320 determines if the application requires additional caller input or data verification. If additional caller input or verification is required, decision state 392 routes the call back to state 380. If additional caller input or verification is not required, the call proceeds to state 394.

Process 320 uses state 394 to write out the application and caller specific data to the Call Transaction Storage 236 (FIG. 3) and set the return flag to "verified." Process 320 then exits at state 396 and returns to state 322 in process 300 (FIG. 6).

Figure 9:
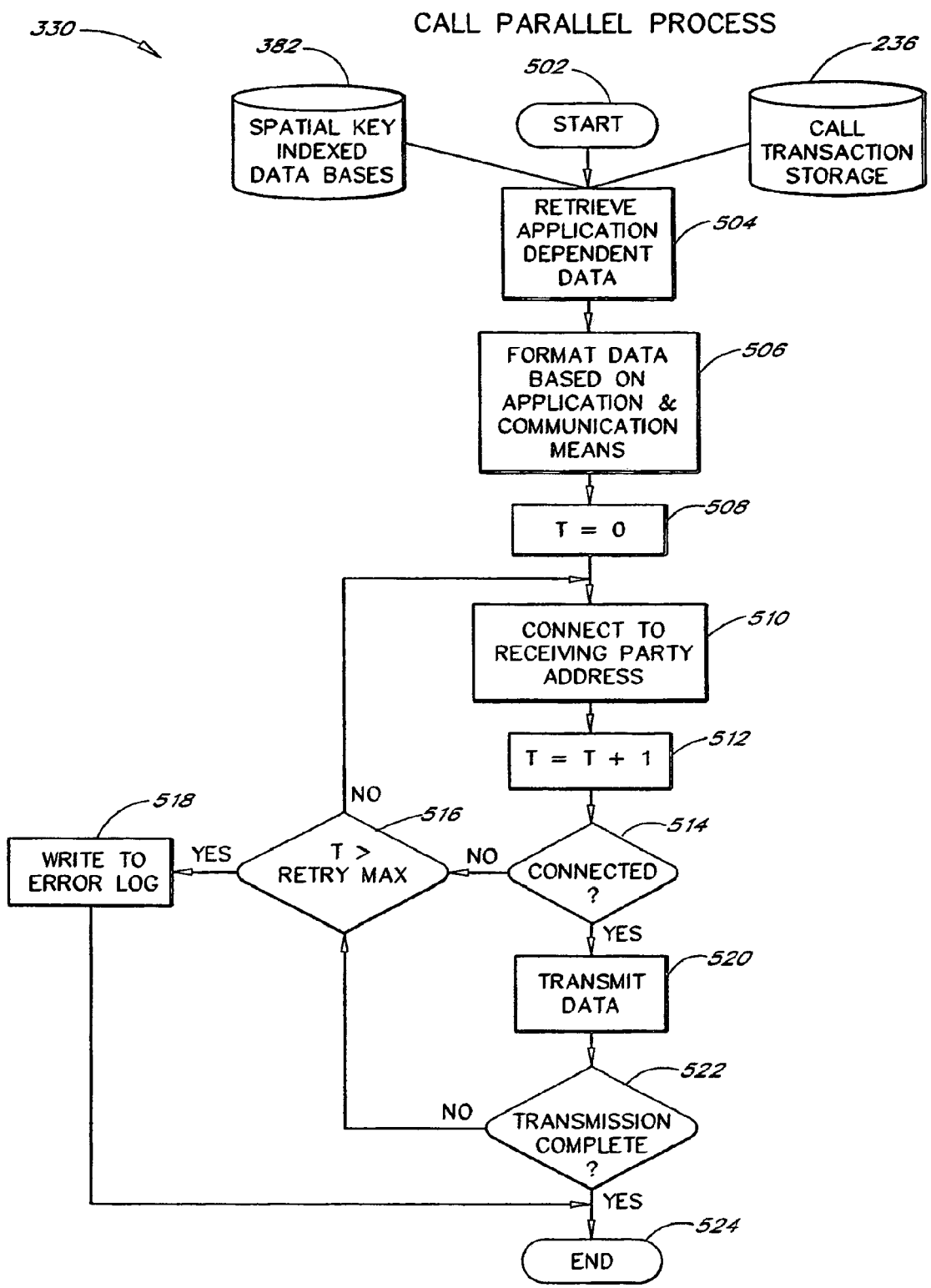
FIG. 9 is a flow diagram of a process for communicating with a caller or servicing location using the Parallel Call process as indicated at 330 in FIG. 6.

Referring to FIG. 9, the operation of the Call Parallel process 330 (defined in FIG. 6) will now be described. FIG. 9 shows a preferred generic implementation of the Call Parallel process 330. The primary function of the Call Parallel process is to provide call, caller, servicing location data and spatial relationship data between the location associated with the caller provided telephone number and the servicing location to the caller and/or serving location by a medium other than voice. A non-inclusive list of examples includes: faxed maps, directions, addresses, hours open, menus, computer files or computer software. Since the Call Parallel process 330 is broad in scope, using this information, one skilled in the art could develop a specific parallel application that is technically different, but accomplishes the above goal of providing call dependent information that is independent of the actual call connectivity by a means other than voice to the caller or servicing location.

Process 330 begins at a start state 502 and proceeds to state 504 where it retrieves call transaction data from the Call Transaction Storage 236 and application specific data from the Spatial Key Indexed Databases 382. Advancing to state 506, process 330 formats the data retrieved at state 504. The format of the data is a function of the application and the communication means. Once the data is formatted, the next step is to physically connect to the receiving party address. Since there is always the possibility of not being able to physically connect to the recipient address, a way of retrying needs to be incorporated into the system. Process 330 begins this retry process at state 508 by initializing the connect attempts count to zero by setting a variable T equal to zero.

Moving to state 510, process 330 tries to establish a connection with the receiving party. The recipient address is a function of the communications means. A partial list of examples includes a FAX telephone number, a modem telephone number, an E-Mail address or an Internet address. Proceeding to state 512, process 330 increments the connect attempts count, $T=T+1$.

Continuing at a decision state 514, process 330 determines if a connection has been made with the recipient address. If the connection has not been established, process 330 proceeds to a decision state 516. At decision state 516, process 330 determines if the retry maximum count has been has been reached by testing if the value of T is greater than the application-dependent parameter RETRY_MAX. If T is not greater than RETRY_MAX, process 330 loops back to state 510. However, if T is greater than RETRY_MAX, as determined at decision state 516, process 330 proceeds to state 518. At state 518, process 330 writes a transaction to an error log and then proceeds to an end state 524. The system examines the error log on a periodic basis, researches communication problems and takes appropriate action to correct the problem.

If process 300 determines at decision state 514 that a connection has been established at state 510, the process proceeds to state 520 and begins transmitting the information. Upon completion of the transmission at state 520, process 330 proceeds to a decision state 522 and determines if all the data was transmitted. If the transmission was complete, process 330 terminates at state 524. If the transmission was not complete, as determined at decision state 522, process 330 proceeds to decision state 516. At decision state 516, process 330 determines if the retry maximum count has been reached by testing if the value of T is greater than the application-dependent parameter RETRY_MAX. If the value of T is not greater than RETRY_MAX, process 330 loops back to state 510. However, if T is greater than RETRY_MAX, as determined at decision state 516, process 330 proceeds to state 518, writes a transaction to the error log and then proceeds to end process state 524.

IV. CASS Certified Address Build

Figure 10:
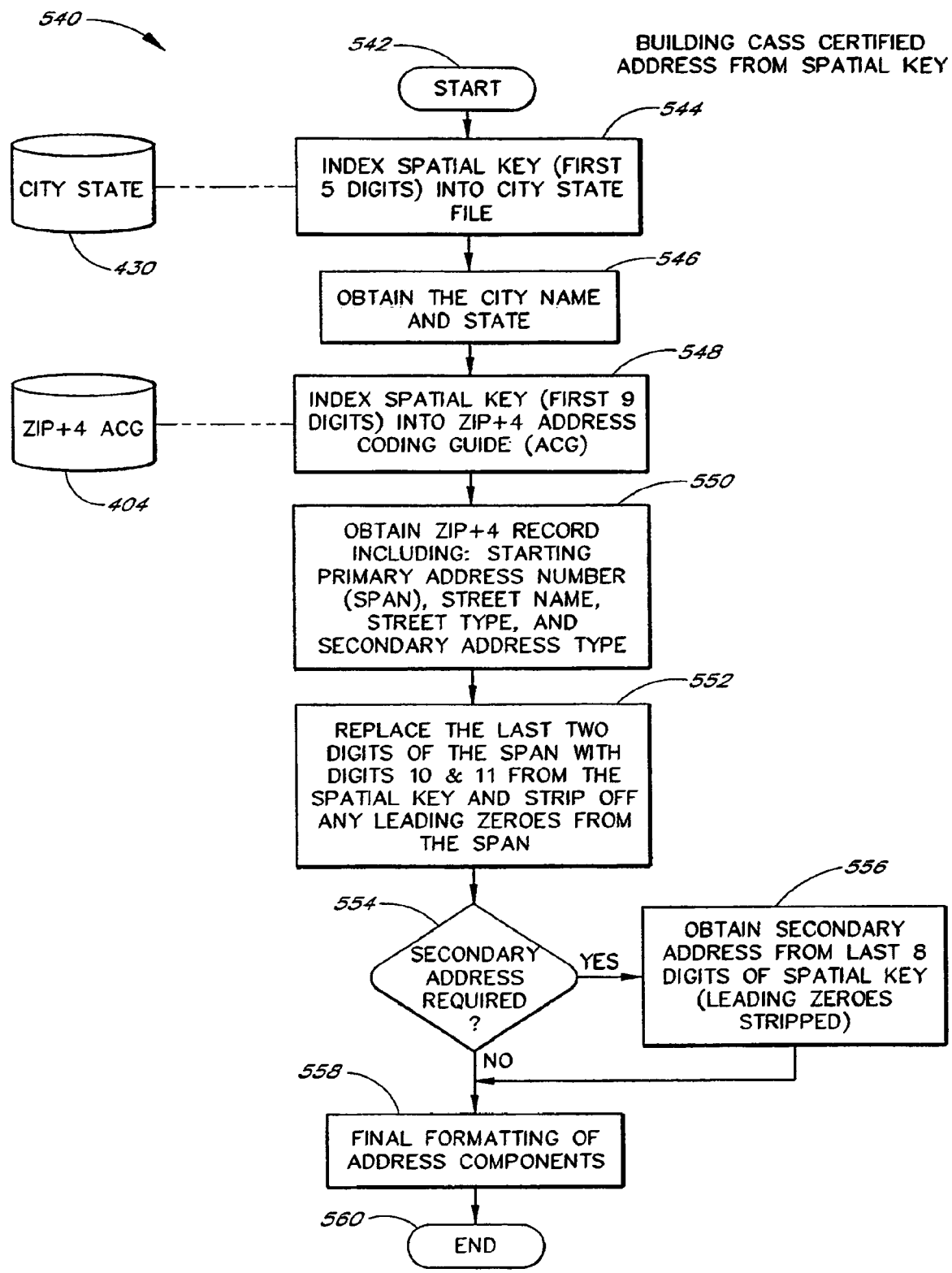
FIG. 10 is a flow diagram of a process for generating a CASS certified address from a Spatial Key for use in the databases indicated at 106 in FIG. 1.

Some call processing applications may require use of a CASS certified address, e.g., address lookup and verification by an operator taking a telephone order. Referring now to FIG. 10, the use of two USPS databases by a process 540 for building a CASS certified address from a Spatial Key will be explained.

The process 540 to build a CASS certified address begins at a start state 542 and moves to a state 544. At state 544, process 540 indexes the first five digits of the Spatial Key into a USPS City State File 430 and retrieves the preferred last line name (City Name) and State at state 546. Moving to state 548, process 540 indexes the first nine digits (ZIP+4) of the Spatial Key into the ZIP+4 Address Coding Guide (ACG) 404, and the ZIP+4 record is retrieved at state 550. This record contains all the components required to build an address: street pre-direction, street name, street type, street post-direction and secondary address type. The pre-direction and post-direction refer to a compass direction, such as Northwest. The general rule for creating the street number at state 552 is to replace the last two digit of a starting primary address number (SPAN) from the ZIP+4 record with digits 10 and 11 from the Spatial Key and strip off any leading zeros from the starting primary address number.

Proceeding to a decision state 554, a determination is made as to whether a secondary address number is required by the USPS ZIP+4 type retrieved from the ZIP+4 ACG 404. If the ZIP+4 type is "F" for Firm or "H" for High-rise, a secondary address is generally required. If so required, process 540 moves to state 556 and obtains the secondary address from the last eight digits of the Spatial Key with any leading zeros stripped off. At the completion of processing the secondary address at state 556 or if the secondary address was not required, as determined at decision state 554, final formatting of the address components is performed at state 558. The final formatting is a function of the client application and the type of ZIP+4. Process 540 completes at end state 560.

V. Master Table Build and Maintenance Description

The Master Table 102 (FIGS. 1, 3, 6) is designed to be used by both regulated and non-regulated entities in the regulated telephone network, and therefore, none of the Master Table data can be customer provided network information. There are four separate processes to build and maintain the Master Table that will be described in conjunction with FIGS. 11A, 11B, 11C and 11D. These processes show that customer provided network information is not used in the Master Table.

Figure 11A:
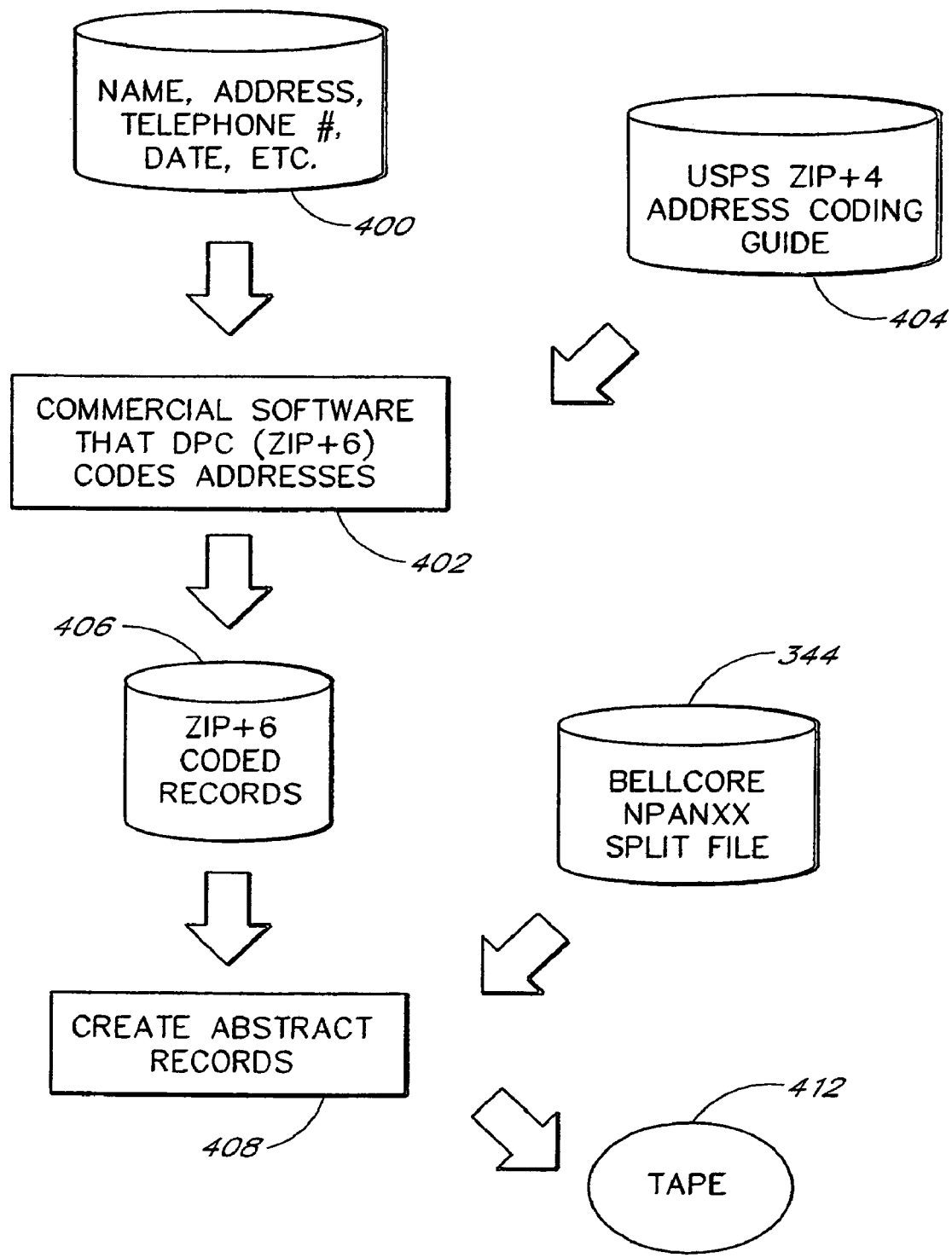
FIG. 11A is a block diagram of a process for a data provider to provide Master Table verification records.

The goal of the processes described in FIG. 11A is to provide either a regulated or non-regulated data provider a way of taking data about customers and processing it through commercial software and reformatting the result using a reformatting program. This creates a file containing abstract verification records that can be shipped to an authorized, regulated processing center, such as ACXIOM Corporation in Conway, Ark. The purpose of the validation files is to verify the current linkage between a telephone number and a USPS address. The data providers are provided with the NPANXX Split file to make sure that all their telephone numbers are current. There are two types of verification records: "connects" and "disconnects". Many data providers can only provide "connect" records. The verification record contains the following data fields:

| | |
|---|---|
| Telephone Number | 10 Characters |
| Spatial Key | 19 Characters |
| Connect or Disconnect Date | 8 Characters (YYYYMMDD) |
| Data Provider Code | 2 Characters |
| ZIP+4 Coding Status | 2 Characters |
| Transaction Type | 1 Character (C = Connect D = Disconnect) |
| Entity Name | 40 Characters (Business and Government records only) |

The data provider code identifies the source of the customer data. One character of the ZIP+4 coding status identifies the type of address, e.g., post office box, rural route, high-rise building, general delivery and so forth. The other character of the ZIP+4 coding status identifies how the ZIP+4 code was matched and is potentially used to identify or rectify an incorrect record at a later time. The entity name is required for business and government records. For consumer records, the entity name can be a building name or set to blank characters. In cases where the customer moves and keeps their current telephone number, it is preferred that both a connect and disconnect record are generated.

Referring now to FIG. 11A, a Coding process 402 uses commercial address standardization and DPC coding software, such as AccuMail® or CODE-1®, available from Group 1 Software, Inc. This software takes input from a database 400 provided by a data provider or client and uses the commercial software's version of the USPS ZIP+4 address coding guide 404 to address standardize and DPC or ZIP+6 code the customer record's address. It then appends the DPC and the ZIP+4 coding status to the customer record and writes the result to a ZIP+6 coded file 406.

A Create Abstract Records process 408 reads the ZIP+6 coded records from file 406 and reformats the record to the record layout shown above. It also reads the NPANXX Split file 344 into memory and if necessary, based on the date, changes the NPANXX. It then writes the resultant reformatted record to a Data Provider Verification file Tape (or other storage media) 412 to be shipped to the processing facility.

Figure 11B:
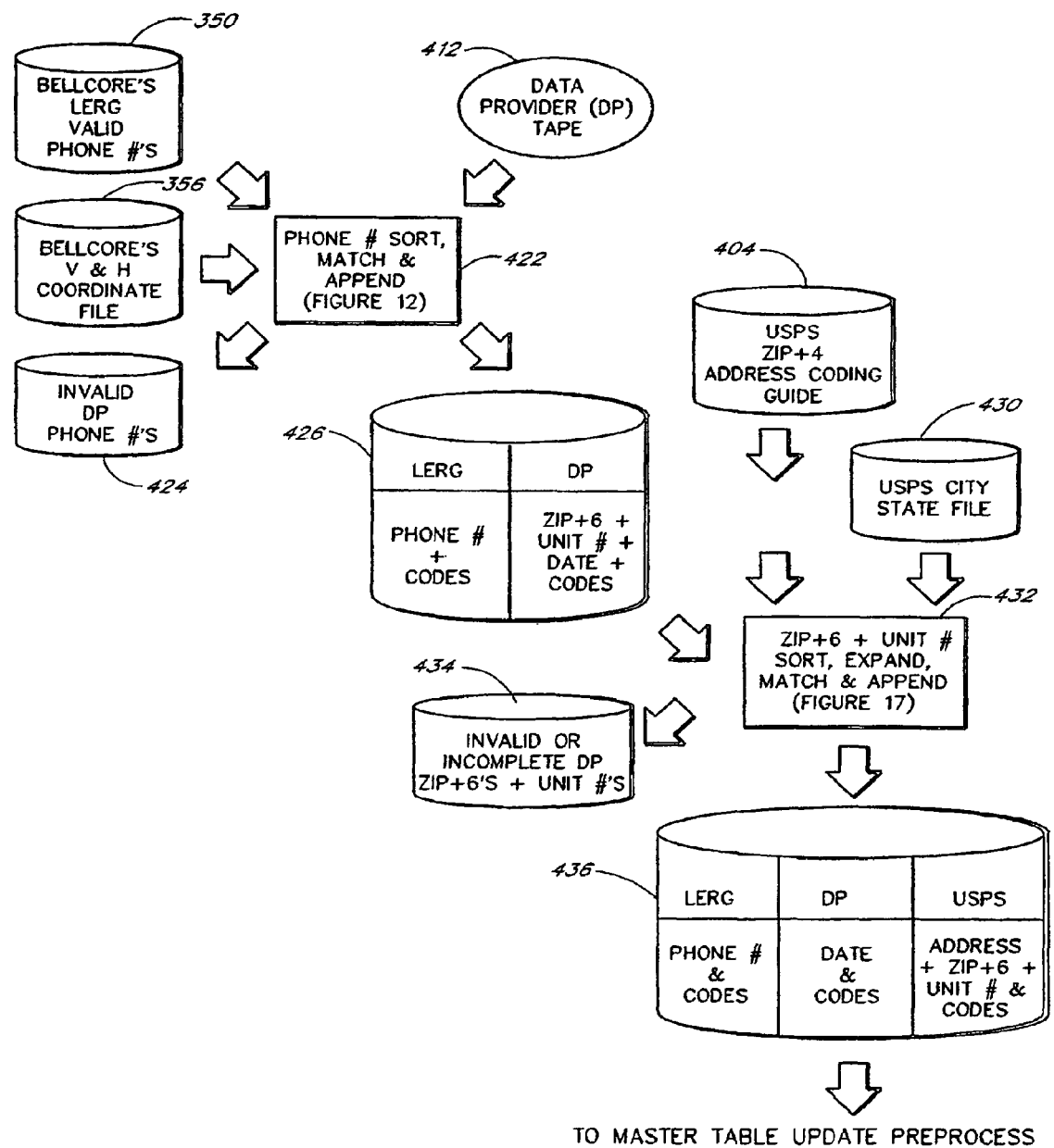
FIG. 11B is a block diagram of a process for building Master Table update records from data provider supplied verification records.

FIG. 11B illustrates the processing at a certified, regulated data processing facility, such as ACXIOM, that uses a Data Provider Verification file to link telephone numbers from the LERG file with Addresses and DPC codes from the USPS address coding guide. The resultant file contains telephone numbers from LERG, a telephone number type code from the V&H file, address and DPC codes from the USPS and processing codes and dates provided by the data providers.

Referring now to FIG. 11B, a Sort, Match and Append process 422 starts by reading a record from the LERG file 350 and generating a list of phone numbers that are potentially connected to a terminating location from a LEC switch for all blocks of line numbers that are connected to a LEC switch(s) within the current LERG NPANXX. It then reads a record from the Data Provider Verification file 412 that has been sorted by telephone number. If the records match (thereby only valid telephone numbers are taken from the LERG file), the type of telephone code (e.g., POTS, cellular, pager, marine, and so forth) is retrieved from the V&H file 356 and a new record is generated containing the LERG telephone number, the V&H type of telephone code and all data provider data (including the Spatial Key) except the telephone number. The resultant new record is written to an Intermediate file 426. If a telephone number is on the Data Provider Verification file 412, but not on the LERG file 350, it is written to the Invalid Telephone Number file 424. Telephone numbers on the LERG file 350 that are not on the Data Provider Verification file 412 are skipped. This process is continued until all records on both files have been read and compared. The process 422 is further described in conjunction with FIG. 12 hereinbelow.

Proceeding to a Sort, Expand, Match and Append process 432 (FIG. 11B), process 432 is very similar to process 422 in function, but uses a slightly different technique. Process 432 utilizes the Intermediate file 426 generated by process 422 (FIG. 12), and the USPS City State file 430 and ZIP+4 file 404 to generate an address and a new Spatial Key, both of which are written to a Data Provider Verified Linkage Update (DPVLU) database 436. Process 432 is further described in conjunction with FIGS. 17A and 17B hereinbelow.

Figure 11C:
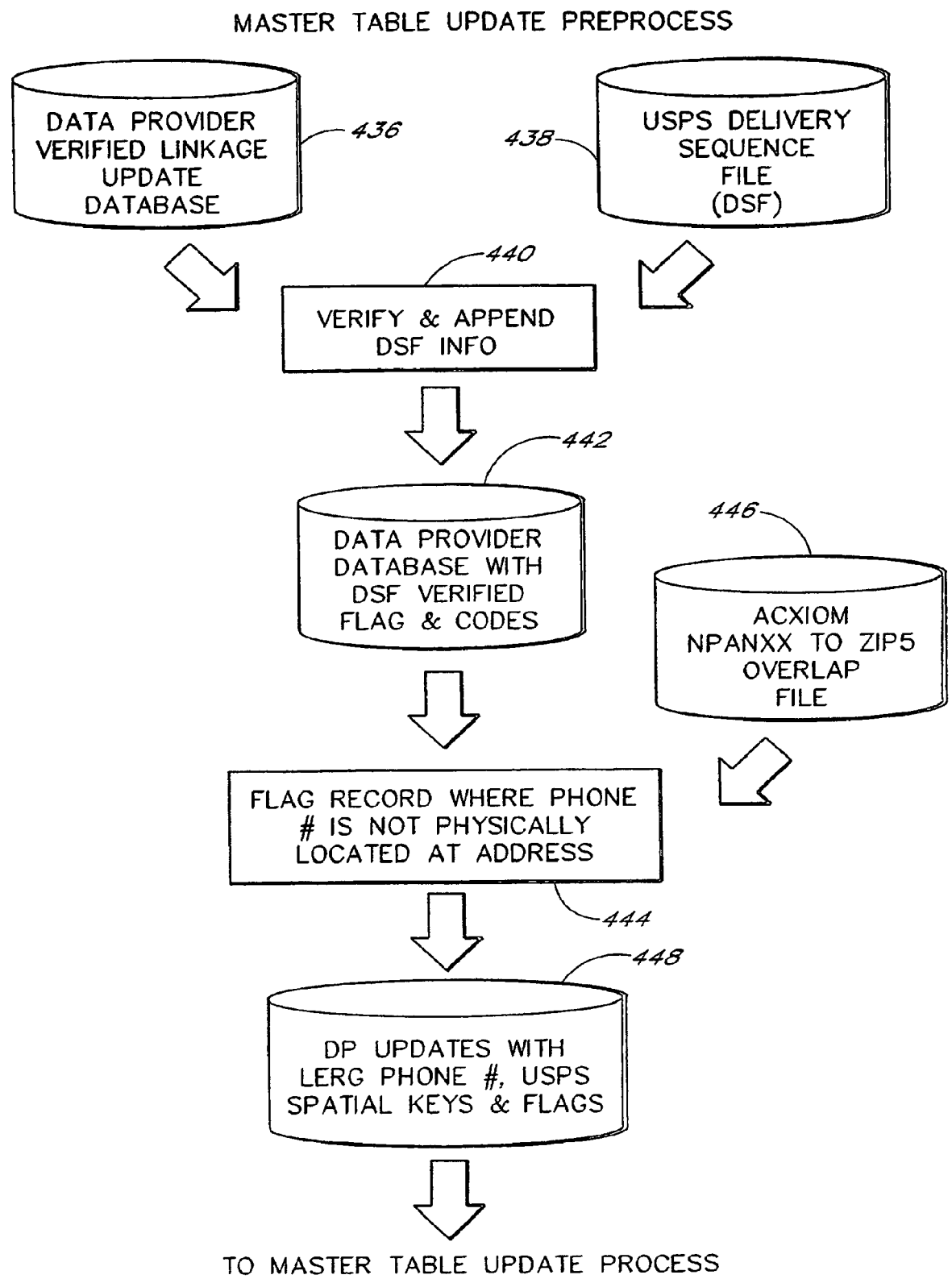
FIG. 11C is a block diagram of a Master Table Update preprocess.
Figure 11D:
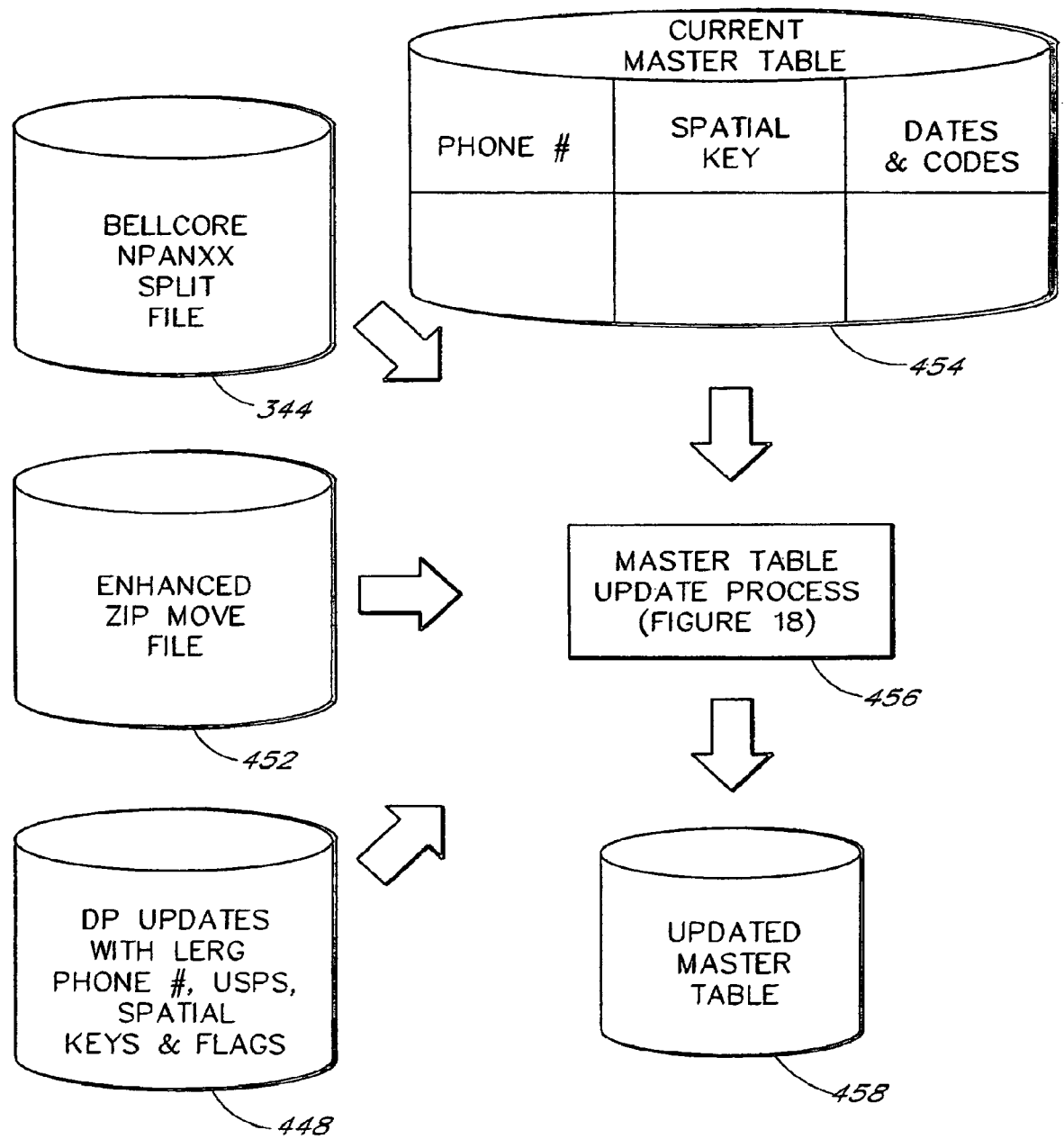
FIG. 11D is a block diagram of a Master Table Update process.

Referring now to FIG. 11C, two processes 440 and 444, which comprise the Master Table Update preprocess, will be described. The Data Provider Verified Linkage Update database 436 that is generated by process 432 (FIG. 11B) is used as one of the inputs to a Verify and Append DSF Information process 440. The process 440 validates the addresses constructed in process 432 (FIG. 11B) against a USPS Delivery Sequence File (DSF) 438. The DSF file 438 is only licensed by the USPS to selected processing centers, such as ACXIOM, and the file can only be used to verify existing addresses. It differs from the ZIP+4 address coding guide 404 (FIGS. 11A and 11B) in that the coding guide provides only an address range for each ZIP+4, such as 101 to 199 Main St. In the DSF 438, there is one record for each USPS deliverable address, such as 125, 151, or 175 Main St. In this example, the other potential odd numbered addresses within the ZIP+4 address coding guide address range do not exist. Matching against the DSF file also provides the ability to append a delivery type code.

A Determine Overlap process 444 provides the ability to determine if the location corresponding to a telephone number and the associated USPS address cannot be physically located at the same physical location. If the USPS address is a P.O. Box, Rural Route (RR) or General Delivery, it is obvious that the telephone number does not terminate at the address because the address is not a physical address. However, since the database is multi-sourced, some of the street, high-rise and firm addresses provided are billing addresses, not physical addresses. In routing and delivery applications, such as pizza delivery, it is critical to identify telephone numbers with Spatial Keys associated with a "foreign" physical location, such as a billing address. ACXIOM has created a file using a variety of databases that identifies which NPANXXs and 5 digit ZIP codes spatially overlap. If the update record's NPANXX-ZZZZZ (where the ZZZZZ represents a 5 digit ZIP code) is indexed in this file and there is no record found, then the NPANXX and the ZZZZZ do not spatially overlap. If NPANXX-ZZZZZ is found on the ACXIOM file, then the telephone number and ZIP Code are spatially proximate within a 2.5 mile error range. However, it is still not 100 percent certain that the telephone number and USPS address are located together. To solve this problem, applications that require 100% reliability must be designed to give the caller the ability to verify the address associated with the telephone number. An application having this ability was previously described above.

Referring now to FIG. 11C, the operation of the processes 440 and 444 will be described. The Verify and Append DSF Information process 440 reads and matches records from the Data Provider Verified Linkage Update database 436 and the USPS DSF file 438. If the data provider record matches the DSF file, then a DSF match flag is set to "yes" and the address delivery type code field is set to the value retrieved from the DSF file. If the data provider record does not match the DSF file, the DSF match flag is set to "no" and the delivery type code field is set to blank characters. All records from the Data Provider database 436 are reformatted and written to a DSF Verified database 442. At this point in the process, the entity or building, address, city and state fields are no longer required.

Proceeding to the Determine Overlap process 444, the process 444 starts by reading the DSF Verified database 442 and looking up the resultant record's NPANXX-ZZZZZ on the ACXIOM NPANXX To ZIP5 Overlap file 446. If the record is found, then an Overlap Flag is set to "yes", or else if the record is not found, the Overlap Flag is set to "no". All records are then written to a Data Provider Updates with LERG Phone Number and USPS Spatial Keys database 448 which comprises an update feed into a Master Table Update process 456.

FIG. 11D illustrates the Master Table Update process 456. There are three independent update steps or subprocesses required to keep the Master Table updated. The first step is the updating of telephone numbers based on changes in numbers administered by Bellcore. The second step is due to changes in Spatial Keys based on ZIP Code changes by the USPS. The third step concerns changes due to the connecting and disconnecting of telephone numbers with addresses based on consumers and businesses moving and adding or dropping existing telephone numbers or lines. The Master Table Update process 456 will be further described in conjunction with FIGS. 18A, 18B and 18C hereinbelow.

As was described above, the records in the Master Table 102/454 do not contain customer provided network information. The origin of the customer telephone number, address, and Spatial Key is not from the data provider file 400 or data provider tape 412. Only the data provider file connected/disconnected status and dates (first connect, disconnect, last verified) are utilized in the Master Table. The other Master Table information is from Bellcore, USPS, ACXIOM or generated by the Master Table build process.

Figure 12:
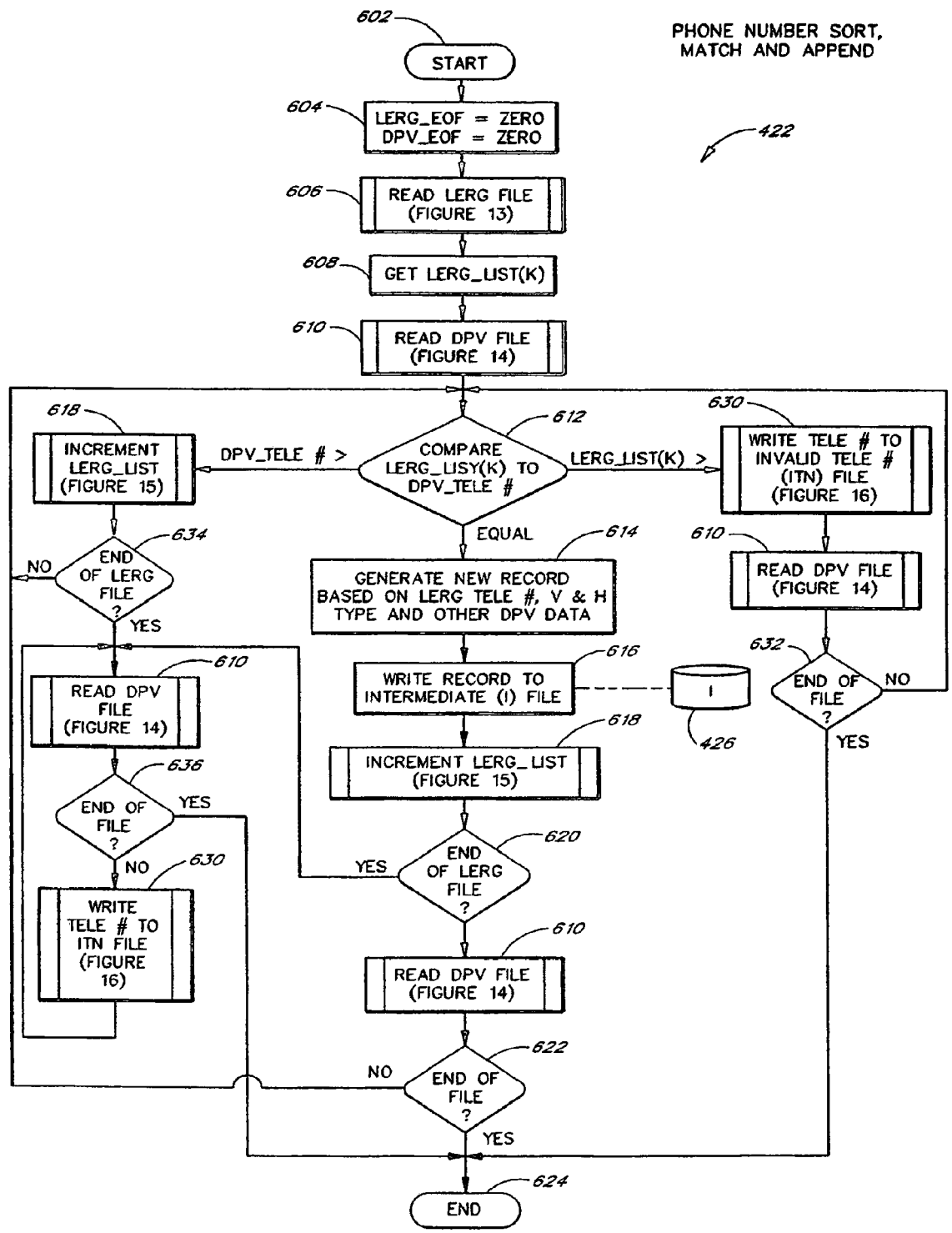
FIG. 12 is a flow diagram illustrating the Phone Number Sort, Match and Append process as indicated at 422 in FIG. 11B.

Referring to FIG. 12, the Sort, Match and Append process 422, previously defined in FIG. 11B, will now be further described. Process 422 utilizes the Bellcore LERG file 350 of valid telephone numbers, the Bellcore V&H Coordinate file 356, and a sorted version (by telephone number) of the Data Provider Verification file 412 created by process 408 (FIG. 11A) as inputs. Process 422 generates new records and writes them to the Intermediate file 426 or writes invalid telephone numbers from the Data Provider Verification file 412 to the Invalid Telephone Number file 424.

Beginning at a start state 602, process 422 moves to state 604 wherein a variable lerg_eof is set to zero and a variable dpv_eof is set to zero. These variables will be used to check for end of file conditions below. Proceeding to a Read LERG File function 606, process 422 reads the LERG file and returns either with a list of phone numbers along with a number of records in the list and a V&H file telephone type, or with the variable lerg_eof set to one if the end of the LERG file has been reached. Function 606 will be further described in conjunction with FIG. 13 hereinbelow.

Proceeding to state 608, process 422 accesses the list returned from function 606 (LERG_LIST) at the first 10 digit telephone number entry on the list, wherein an index K=1. Advancing to a Read Data Provider Verification (DPV) File function 610, process 422 reads a record in the sorted DPV file 412 and returns either with the DPV record, or with the variable dpv_eof set to one if the end of the DPV file has been reached.

Continuing at a decision state 612, process 422 compares the LERG 10 digit telephone number at LERG_LIST(K) to the 10 digit telephone number (DPV_TELE#) returned from function 610. If the telephone numbers are equal, process 422 moves to state 614 to generate a new record based on the telephone number from the LERG file 350, the telephone type from the V&H file 356 and all DPV file data other than the telephone number. Moving to state 616, the new record is written to the Intermediate file 426. Continuing at a Increment LERG_LIST function 618, process 422 increments the index variable K and either accesses the next entry in the current LERG_LIST or reads the next entry in the LERG file 350 to generate a new LERG_LIST indexed at K=1. Function 618 will be further described in conjunction with FIG. 15 hereinbelow. Returning from the function 618 at a decision state 620, process 422 determines if the variable lerg_eof was set to one during function 618. If the end of LERG file condition is true, process 422 proceeds to the Read DPV File function 610 to read the next record in the DPV file 412.

If the end of the LERG file has not been reached, as determined at decision state 620, process 422 also continues to function 610 to read the next record in the DPV file 412. At the completion of function 610, process 422 determines if the end of the DPV file has been reached at a decision state 622. If so, because there are no further records to evaluate in the DPV file 412, process 422 finishes at an end state 624. However, if the end of the DPV file has not been reached, as determined at decision state 622, process 422 moves back to decision state 612 to compare the new current LERG_LIST entry to the new current DPV record.

If process 422 determines that the LERG_LIST entry at index K is greater than the DPV_TELE# at decision state 612, execution continues at a function 630 for writing the DPV file telephone number to the Invalid Telephone Number (ITN) file 424. Function 630 will be further described in conjunction with FIG. 16 hereinbelow. At the completion of function 630, process 422 moves to the Read DPV File function 610 to read the next record in the DPV file 412. Proceeding to a decision state 632, process 422 determines if the end of the DPV file 412 has reached. If so, process 422 is finished and moves to end state 624. If the end of the DPV file 412 has not been reached, process 422 moves back to decision state 612 to compare the current LERG_LIST entry to the new current DPV record.

If process 422 determines, at decision state 612, that the DPV_TELE# is greater than the LERG_LIST entry at index K, execution continues at the Increment LERG_LIST function 618. Function 618 will be further described in conjunction with FIG. 15 below. At the completion of function 618, process 422 moves to a decision state 634, to determine if the end of the LERG file 350 was reached. If the end of the LERG file has not been reached, process 422 moves back to decision state 612 to compare the new current LERG_LIST entry to the current DPV record. However, if the end of LERG file condition is true, as determined at decision state 634, process 422 proceeds to the Read DPV File function 610 to read the next record in the DPV file 412. Proceeding to a decision state 636, process 422 determines if the end of the DPV file 412 has been reached. If so, because there are no further records to evaluate in the DPV file 412, process 422 finishes at the end state 624. However, if the end of the DPV file 412 has not been reached, process 422 continues at the function 630 to write the telephone number from the DPV file record to the ITN file 424. At the completion of function 630, process 422 moves back to the Read DPV File function 610, as illustrated in FIG. 12. This loop of function 610, decision state 636 and function 630 continues until the end of the DPV file 412 is reached and process 422 finishes at the end state 624.

Figure 13:
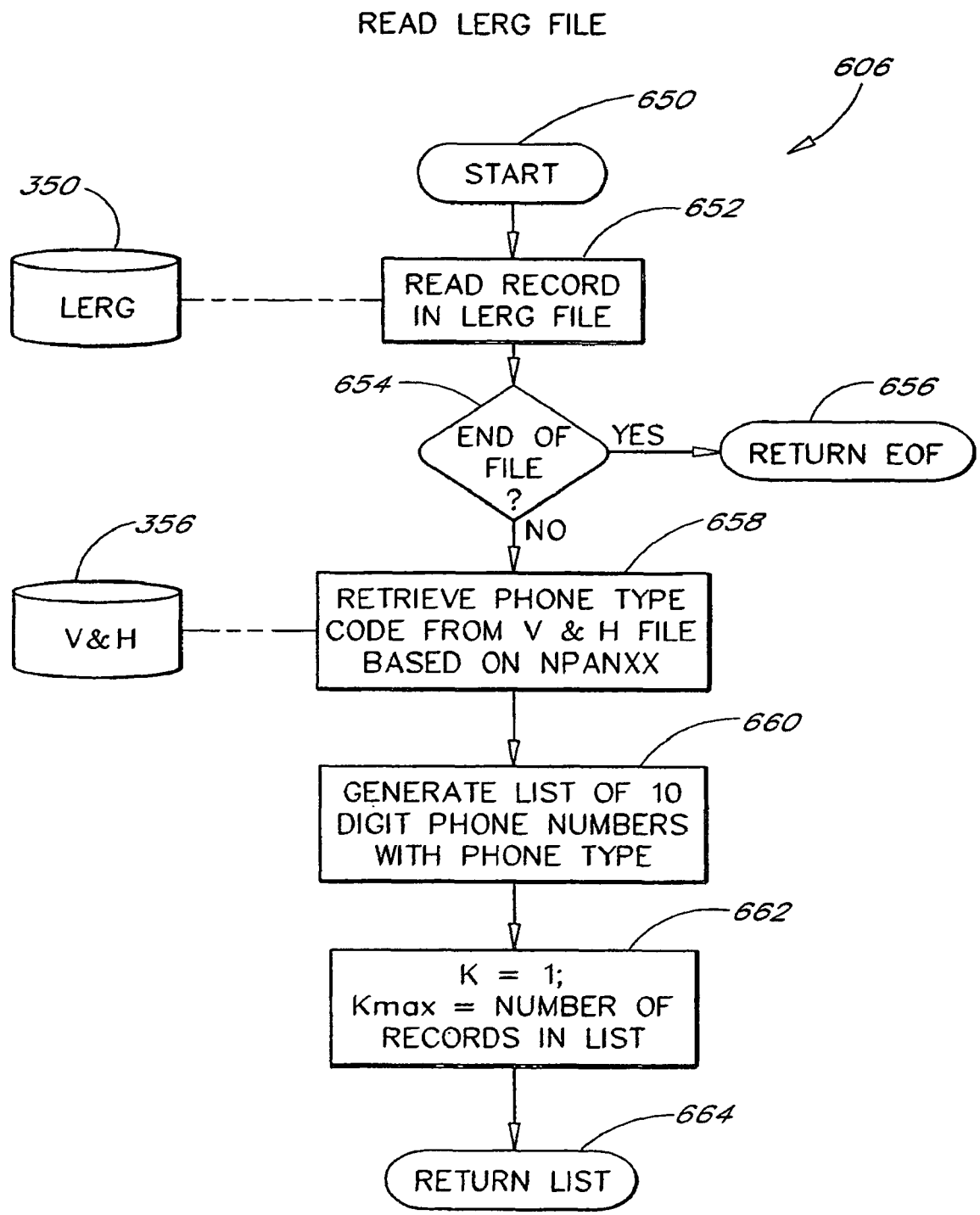
FIG. 13 is a flow diagram of the process for reading a LERG file as indicated at function 606 in FIG. 12.

Referring now to FIG. 13, the Read LERG File function 606, defined in process 422 (FIG. 12), will be described. Function 606 reads the LERG file 350 and returns either with a list of phone numbers, or with an indication that the end of the LERG file has been reached.

The Read LERG File Function 606 begins at a start state 650 and moves to state 652 to read a record in the LERG file 350. Associated with the NPANXX of the LERG record is a set of line numbers. Proceeding to a decision state 654, function 606 determines if the end of the LERG file 350 has been reached. If so, the variable lerg_eof is set to one and function 606 returns at state 656 to process 422 (FIG. 12). If the end of the LERG file 350 has not been reached, as determined at decision state 654, function 606 advances to state 658. At state 658, the NPANXX of the LERG file record is used to check the V&H file 356 and retrieve a type of telephone code, e.g., cellular telephone type. The type of telephone presently is identified by the NPANXX of the 10 digit telephone number.

Proceeding to state 660, function 606 generates a list (LERG_LIST) of 10 digit telephone numbers having the NPANXX of the LERG record read in state 652. This results in a list of up to 10,000 telephone numbers with the potential of being connected from the LEC switch(s) to a terminating location like a household or business. The telephone type determined in state 658 is assigned to each telephone number in the list. Moving to state 662, the LERG_LIST index variable "K" is set to an initial value of one to point to the first telephone number in the list. A variable Kmax is set to the number of telephone numbers in the LERG_LIST. At the completion of state 662, function 606 returns with the list of phone numbers along with the V&H file telephone type, K, and Kmax to process 422 (FIG. 12) at a return state 664.

Figure 14:
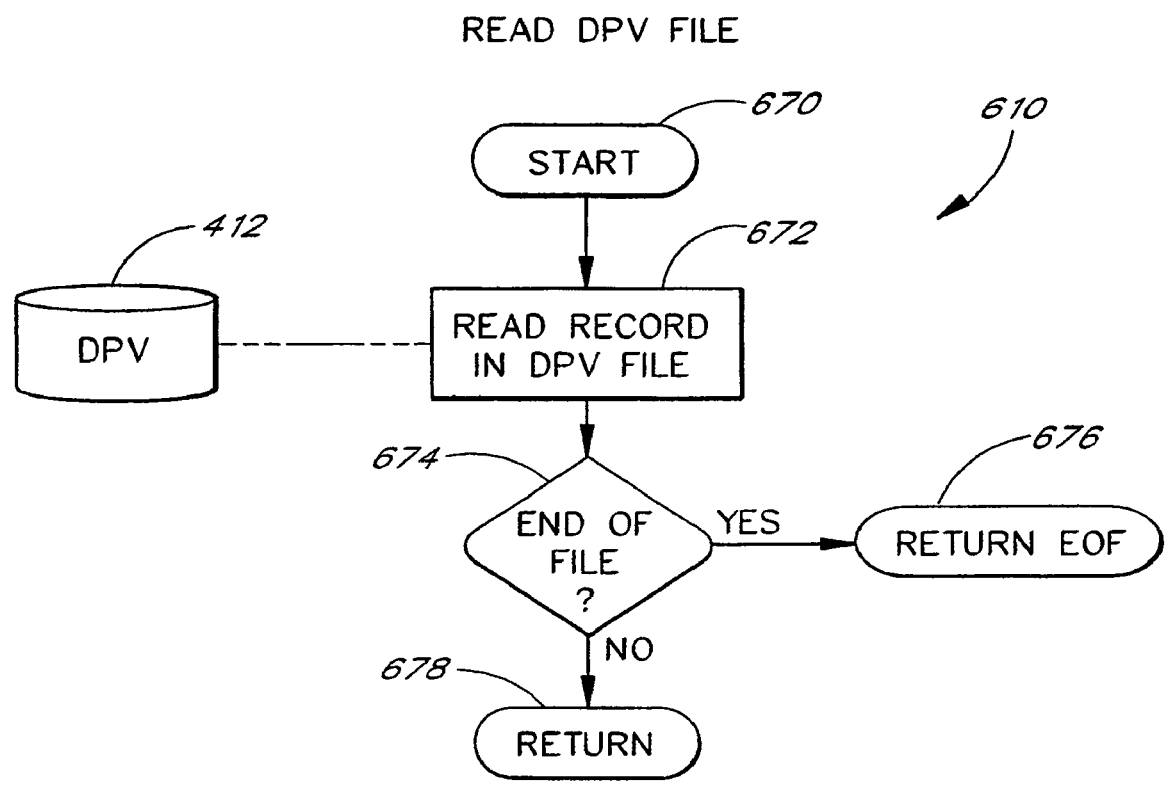
FIG. 14 is a flow diagram of the process for reading a Data Provider Verification file as indicated at function 610 in FIG. 12.

Referring now to FIG. 14, the Read DPV File function 610, defined in process 422 (FIG. 12), will be described. Function 610 begins at a start state 670 and moves to state 672 to read a record in the Data Provider Verification (DPV) file 412. Proceeding to a decision state 674, function 610 determines if the end of the DPV file has been reached. If so, the variable dpv_eof is set to one and function 610 returns at state 676 to process 422 (FIG. 12). If the end of the DPV file 412 has not been reached, as determined at decision state 674, function 610 returns with the DPV record to process 422 at a return state 678.

Figure 15:
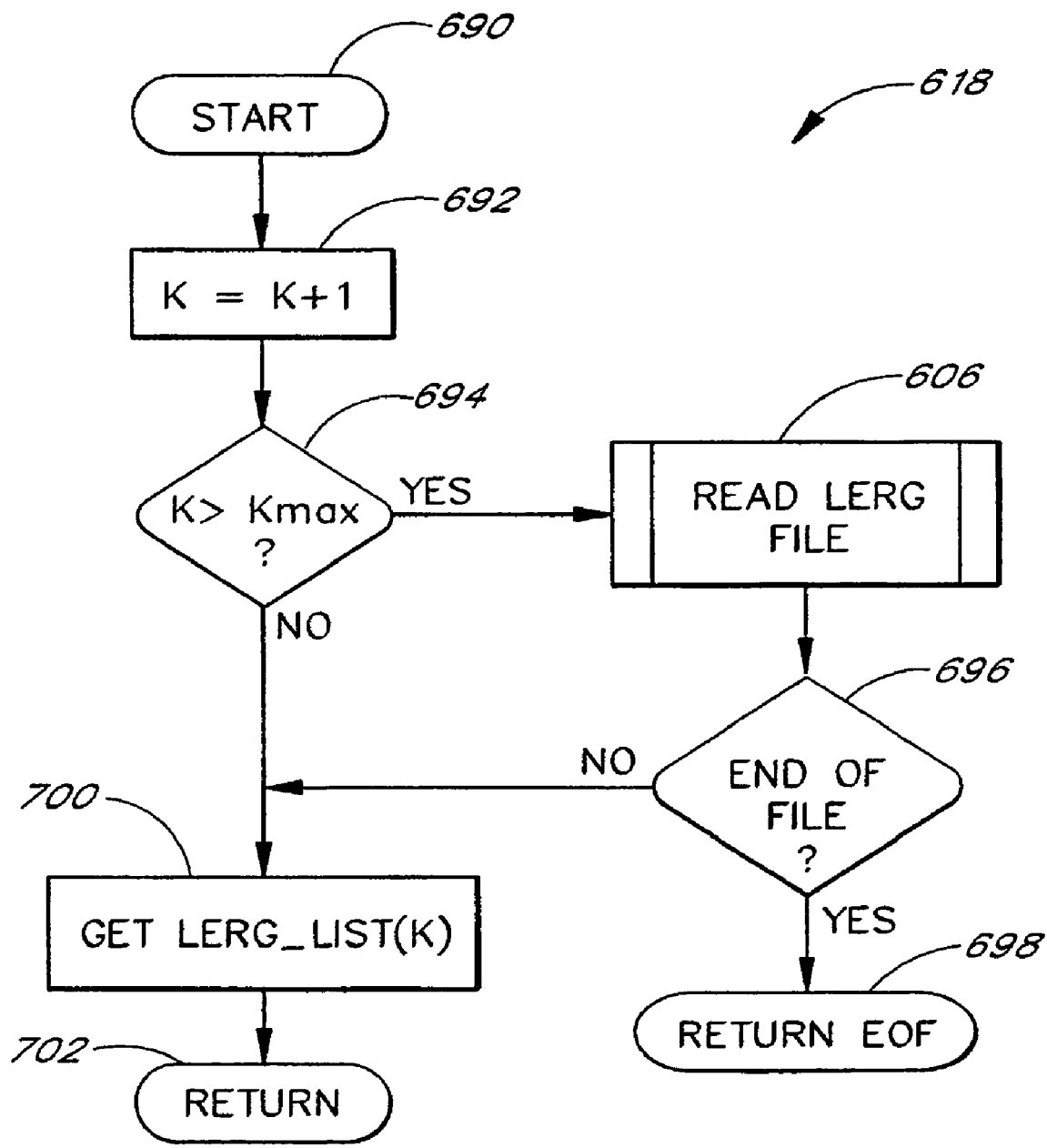
FIG. 15 is a flow diagram of the process for incrementing a LERG List as indicated at function 618 in FIG. 12.

Referring now to FIG. 15, the Increment LERG_LIST function 618, defined in process 422 (FIG. 12), will be described. Function 618 increments the index variable K and either accesses the next entry in the current LERG_LIST or reads the next entry in the LERG file 350 to generate a new LERG_LIST.

Beginning at a start state 690, function 618 moves to state 692 and increments the index variable K by one. Continuing at a decision state 694, function 618 determines if the index variable K is greater than Kmax, the number of telephone numbers in the current LERG_LIST. If not, function 618 proceeds to state 700 and accesses the telephone number and telephone number type in the LERG_LIST at the index K (where K is from state 692 if K is less than or equal to Kmax, as determined at state 694). Function 618 returns at state 702 to process 422 (FIG. 12) with the telephone number and telephone number type.

Returning to decision state 694, if K is greater than Kmax, function 618 proceeds to call the Read LERG File function 606 to read the next record in the LERG file 350 and generate a new LERG_LIST indexed at K=1. Function 606 has been previously described above. At the completion of function 606, function 618 proceeds to a decision state 696 to determine if the end of the LERG file 350 has been reached. If so, function 618 returns with an end of file designation at a state 698 to process 422 (FIG. 12). If the end of the LERG file has not been reached, as determined at decision state 696, function 618 continues to state 700 and accesses the telephone number and telephone number type in the LERG_LIST at the index K (where K is from function 606 if K was greater than Kmax, as determined at state 694). Function 618 returns at state 702 to process 422 (FIG. 12) with the telephone number and telephone number type.

Figure 16:
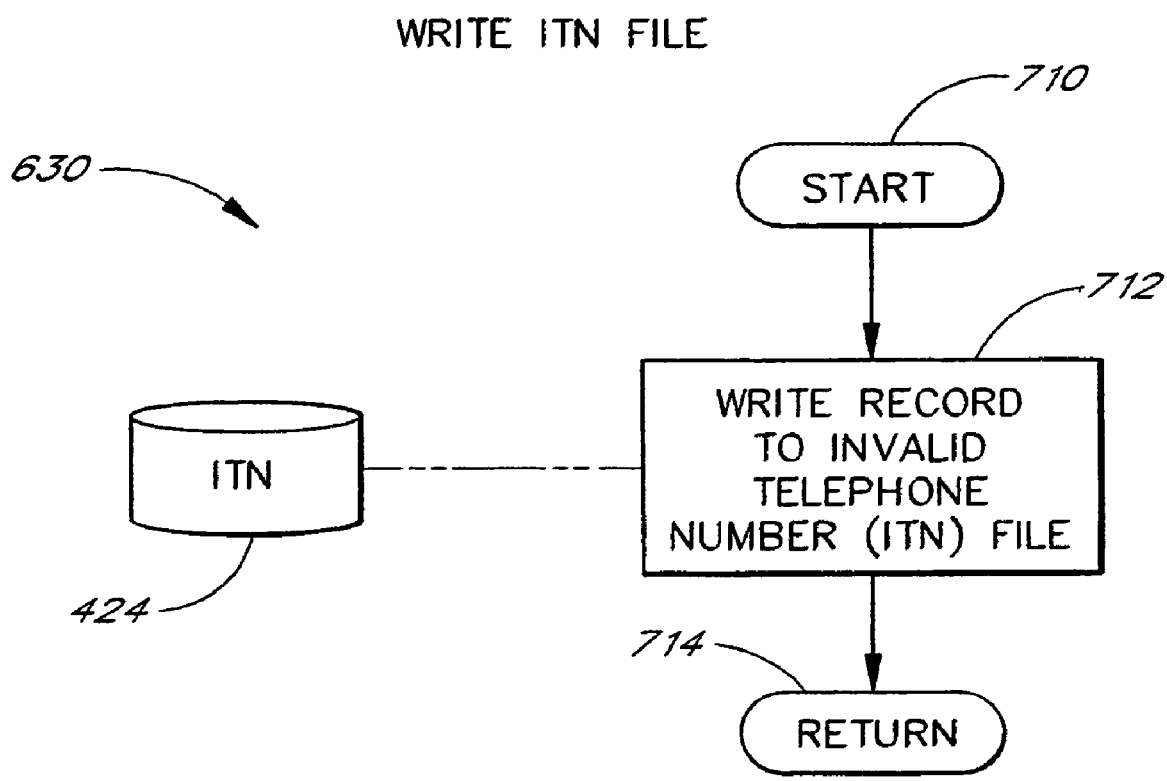
FIG. 16 is a flow diagram of the process for writing an Invalid Telephone Number file as indicated at function 630 in FIG. 12.

Referring now to FIG. 16, the Write Invalid Telephone Number (ITN) File function 630, defined in process 422 (FIG. 12), will be described. Function 630 begins at a start state 710 and moves to state 712 to write a record with the same format as the DPV record to the ITN file 424. Proceeding to a return state 714, function 630 returns to process 422 (FIG. 12).

Figure 17A:
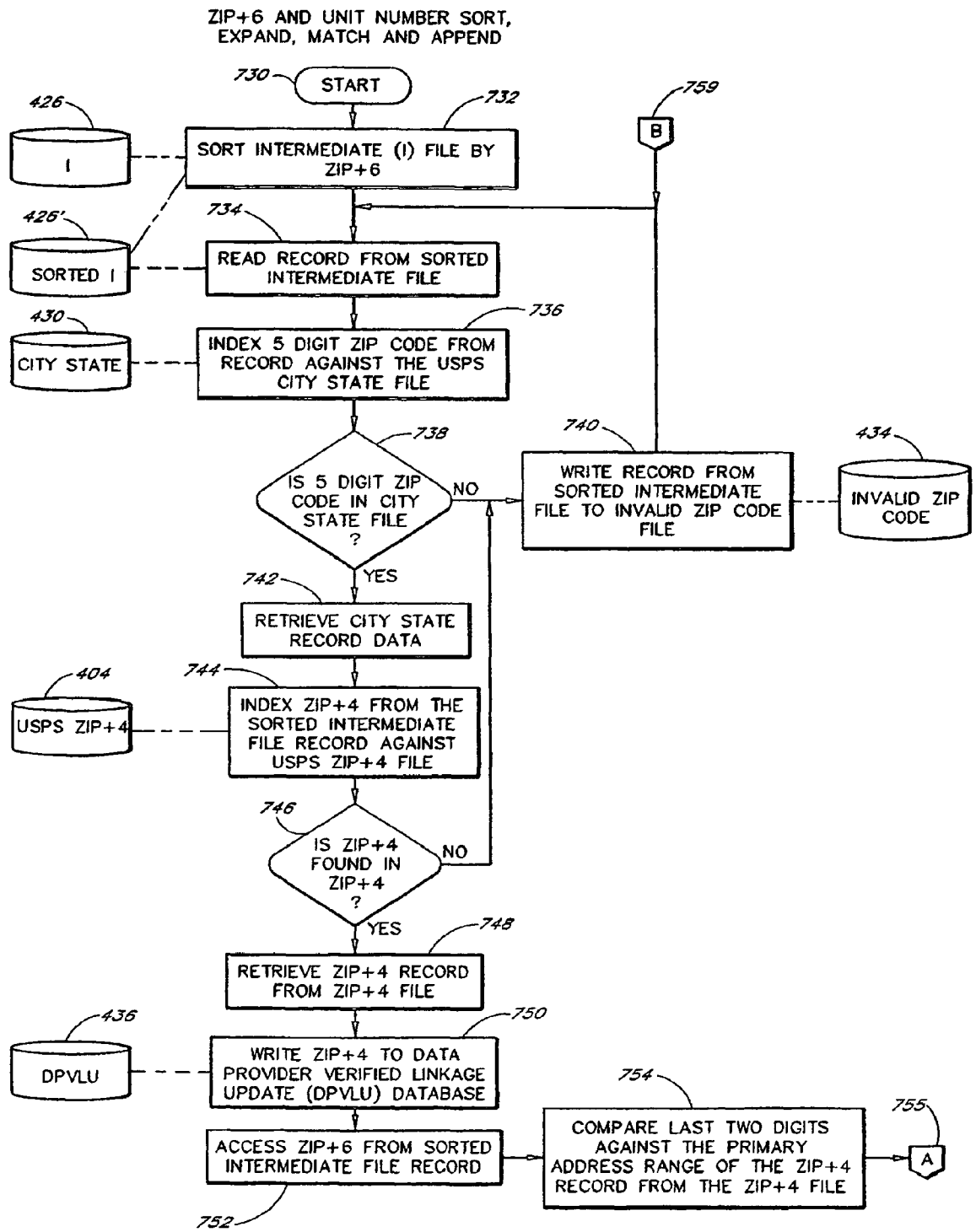
FIGS. 17A and 17B are a flow diagram illustrating the ZIP+6 and Unit Number Sort, Expand, Match and Append process as indicated at 432 in FIG. 11B.
Figure 17B:
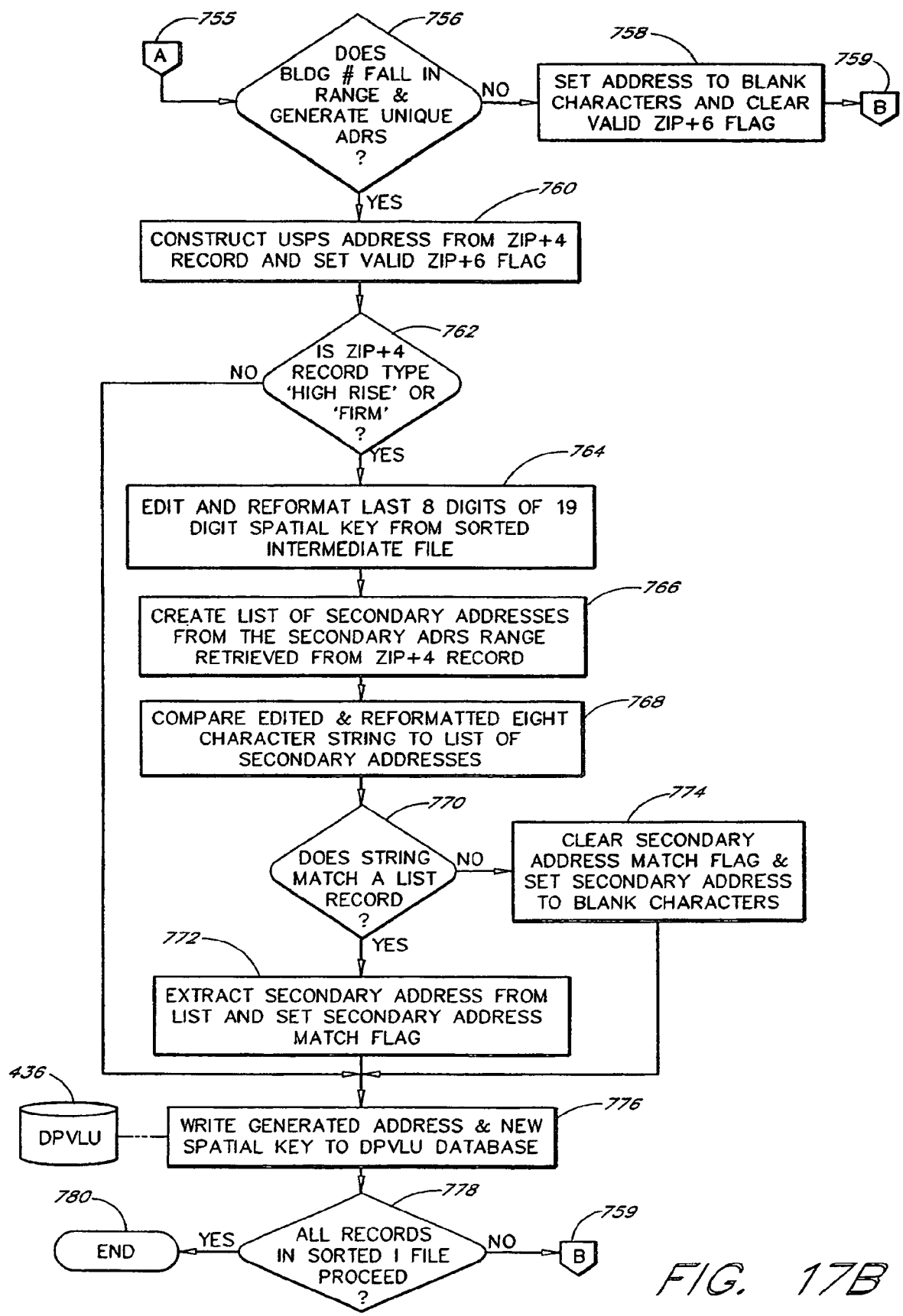

Referring to FIGS. 17A and 17B, the Sort, Expand, Match and Append process 432, previously defined in FIG. 11B, will now be further described. Process 432 utilizes the Intermediate file 426 generated by process 422 (FIG. 12).

Process 432 begins at a start state 730 and moves to a state 732 to sort the Intermediate file 426 by ZIP+6 and create a sorted Intermediate file 426'. Moving to state 734, process 432 reads a record from the sorted Intermediate file 426' and then indexes the 5 digit ZIP Code against the USPS City State file 430 at state 736. Proceeding to a decision state 738, process 432 determines if the 5 digit ZIP Code is found in the City State file 430. If the 5 digit ZIP Code is found, then the City State data is retrieved at state 742. If the 5 digit ZIP Code is not found, as determined at decision state 738, process 432 moves to state 740 and the record from the sorted Intermediate file 426' is written to the Invalid ZIP Code file 434. At the completion of state 740, process 432 moves back to state 734 and the next record is read from the sorted Intermediate file 426'.

After retrieving the city state record at state 742, process 432 moves to state 744 and the ZIP+4 from the sorted Intermediate file 426' is indexed against the USPS ZIP+4 file 404. Proceeding to a decision state 746, process 432 determines if the ZIP+4 record is found in the ZIP+4 file 404. If so, process 432 moves to state 748 and the ZIP+4 record is retrieved from file 404 and the ZIP+4 data is written to a Data Provider Verified Linkage Update database 436 at state 750. If the ZIP+4 record is not found in the ZIP+4 file 404, process 432 proceeds to state 740 wherein the record is written to the Invalid ZIP Code file 434 and then the next record is read from the sorted Intermediate file 426' at state 734.

After retrieving the ZIP+4 record at state 748 and writing the ZIP+4 to the DPVLU database at state 750, process 432 moves to state 752 and accesses the ZIP+6 from the sorted Intermediate file record (obtained at state 734). Proceeding to state 754, process 432 compares the last two digits of the ZIP+6 from the sorted Intermediate file 426' against the primary address range of the ZIP+4 record from file 404. Proceeding through an off-page connector A 755 to a decision state 756 (FIG. 17B), process 432 determines if the building number falls in the primary address range and generates a unique address. If so, process 432 moves to state 760 wherein a USPS address is constructed from the ZIP+4 record and the valid ZIP+6 flag is set to "yes". If the building number does not fall in the primary address range and generate a unique address, as determined at decision state 756, process 432 continues at state 758 wherein the valid ZIP+6 flag is set to "no" and the address is set to blank characters. At the completion of state 758, process 432 proceeds through an off-page connector B 759 to state 734 (FIG. 17A) wherein the next record is read from the sorted Intermediate file 426'.

At the completion of state 760, process 432 moves to a decision state 762 to determine if the ZIP+4 record type is "H" for High-rise or "F" for Firm. If so, process 432 moves to state 764 wherein the last eight digits of the 19 digit Spatial Key from the sorted Intermediate file 426' are processed through an editing and reformatting process utilizing the following edits and reformats:

All lower case letters are set to upper case; for example "3a" is set to "3A".

Any special characters, except "/" when it is both preceded and followed by a number are eliminated; for example, "3-B" is set to "3B" while "½" is left unchanged.

All special character strings, such as APT, STE, FLR, and so forth, are eliminated; for example, "APT B" is set to "B".

All numeric fields are right justified and filled with leading zeros; for example, "123" is set to "00000123".

Fields containing a letter, such as "B" or a "/", are left justified and filled with trailing blank characters; for example, "B123" is set to "B123".

A blank character is inserted prior to the first number preceding a "/"; for example "B3½" is set to "B3½".

At the completion of the edit and reformat state 764, process 432 continues at state 766 wherein a list of secondary addresses is created from the secondary address range retrieved from the ZIP+4 record. The secondary address is similar to the primary address in that there is a range. For example, if the range is 1 to 100, a list of 100 potential secondary addresses are generated. If the range is not a straight numeric, such as 3A to 3N, then secondary addresses 3A, 3B, . . . 3N are generated. In most situations where the secondary address is complex, such as 3B ½, the range or span on the ZIP+4 file is 3B ½ to 3B ½.

Proceeding to state 768, process 432 compares the edited and reformatted eight character string one record at a time to the list of secondary addresses created at state 766. Advancing to a decision state 770, process 432 determines if the eight character string matches one of the list records. If the string matches a list record, process 432 moves to state 772 wherein the secondary address is extracted from the list and the secondary address match flag is set to "yes." If the secondary address does not match, as determined at decision state 770, process 432 proceeds to state 774 wherein the secondary address match flag is set to "no" and the secondary address is set to blank characters.

At the completion of processing the secondary address and the match flag at state 772 or 774, or if decision state 762 evaluates to be false, process 432 advances to state 776 wherein the resultant generated address and new Spatial Key are written to the Data Provider Verified Linkage Update database 436. This database contains phone numbers from the LERG file 350; type codes from the V&H file 356; address, city, state, Spatial Key and Codes from the USPS files 404 and 430; and dates and processing codes from the Data Provider Verification file 412. After writing the DPVLU database 436 at state 776, process 432 advances to a decision state 778 to determine if all records in the sorted Intermediate file 426' have been processed. If not, process 432 proceeds through the off-page connector B 759 to state 734 (FIG. 17A) wherein the next record is read from the sorted Intermediate file 426'. However, if all records in the sorted Intermediate file 426' have been processed, process 432 finishes at an end state 780.

Figure 18A:
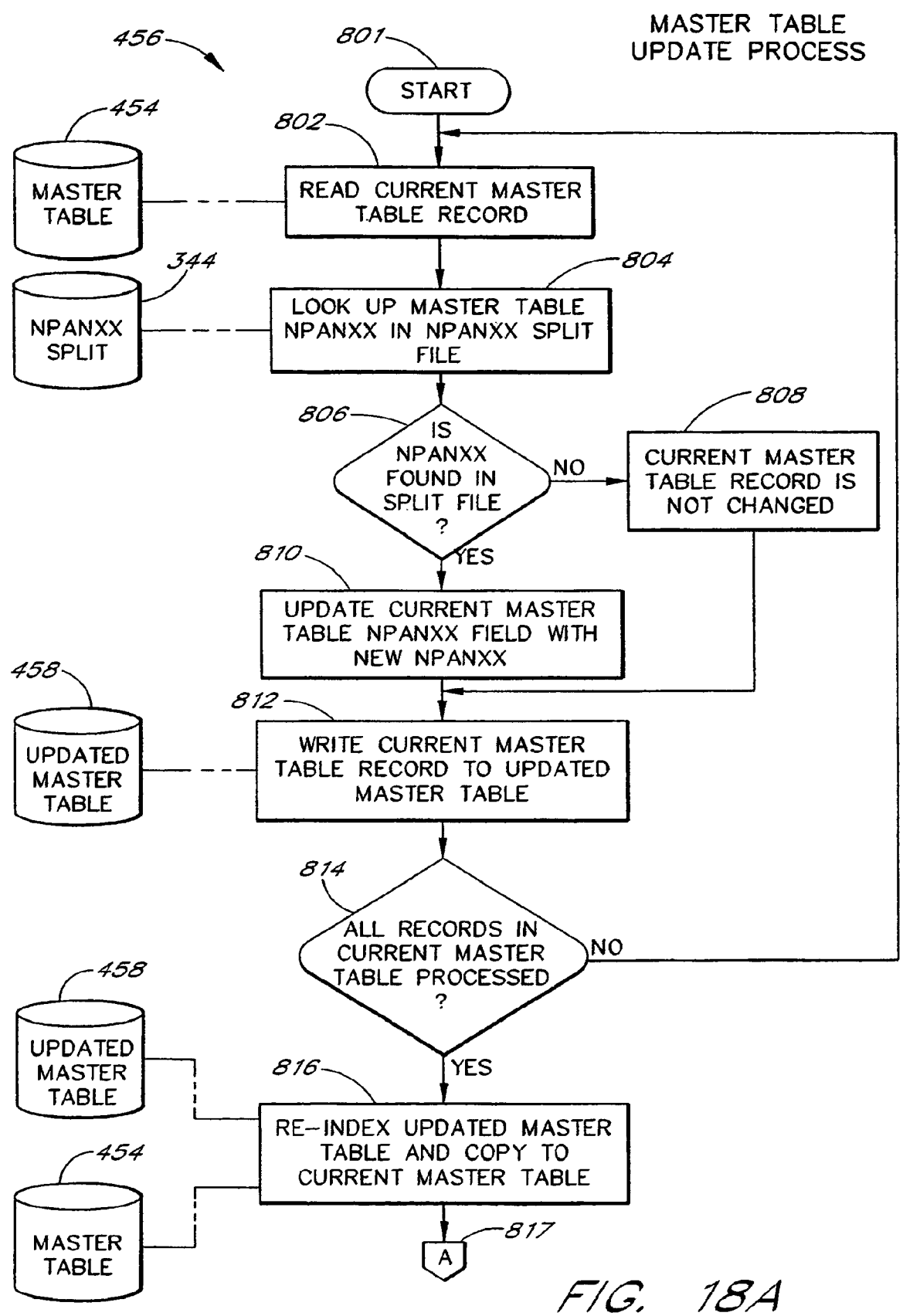
FIGS. 18A, 18B and 18C are a flow diagram illustrating the Master Table Update process as indicated at 456 in FIG. 11D.
Figure 18B:
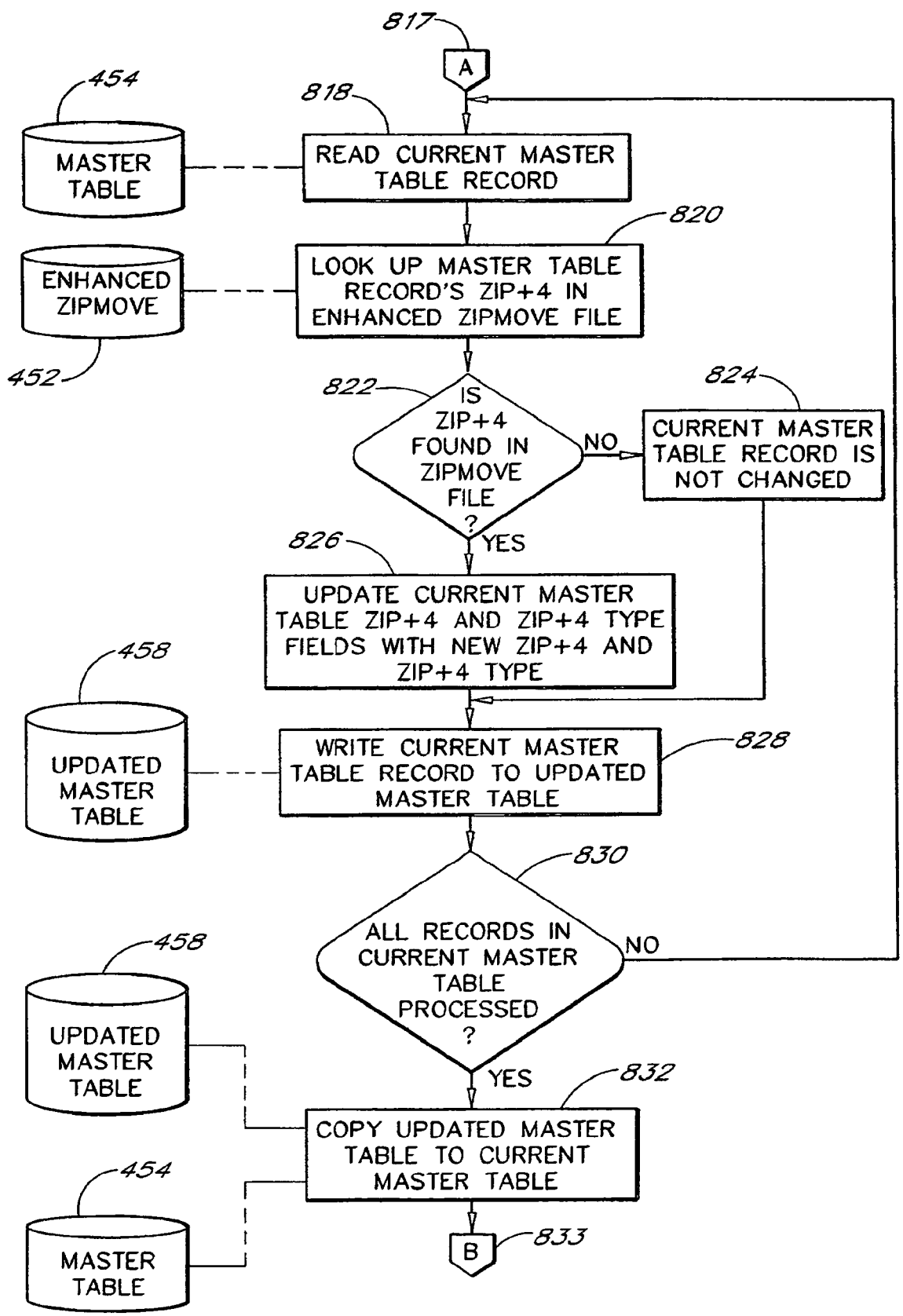
Figure 18C:
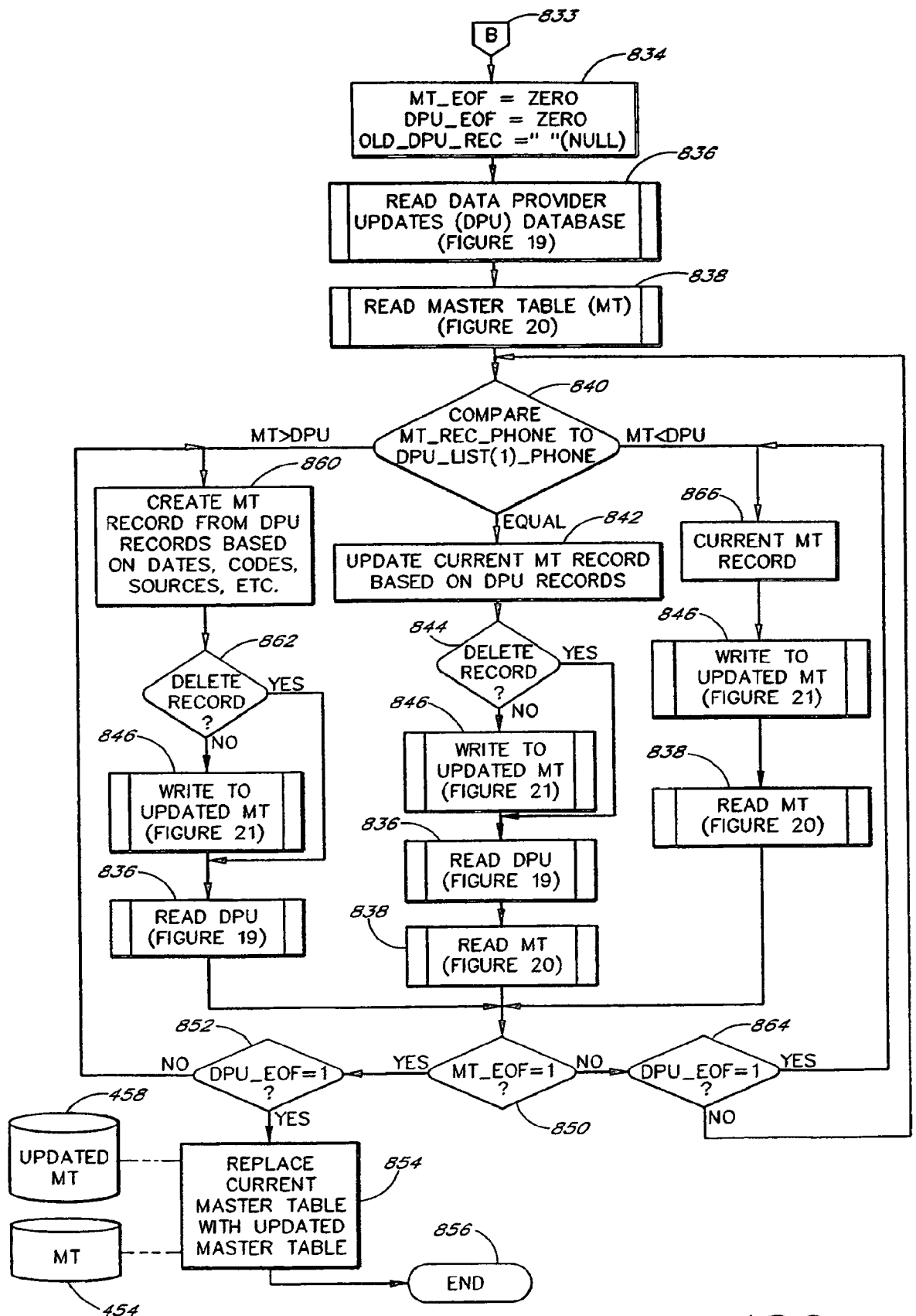

Referring to FIGS. 18A, 18B and 18C, the Master Table Update process 456, previously defined in FIG. 11D, will now be further described. This is a three step process that first updates the telephone numbers and the Spatial Keys in a current Master Table 454 before updating it with time-synchronized transactions. The current Master Table 454 and an Updated Master Table 458 are working copies (as described below) of the Master Table 102 shown in FIGS. 1 and 3. Upon completion of process 456, the Current Master Table 454 is not needed and becomes the Master Table 102.

Prior to the Master Table Update process 456, the Master Table has the following record structure:

| Field | Size | Source |
|---|---|---|
| Telephone number | 10 Characters | Bellcore |
| Spatial Key | 19 Characters | USPS |
| Status (connected or disconnected) | 1 Character | Data provider |
| First Connect Date | 8 Characters | Data provider |
| Last Verified Date | 8 Characters | Data Provider |
| Disconnect Date | 8 Characters | Data Provider |
| Data Provider Code | 2 Characters | Assigned |
| NXX Type | 2 Characters | Bellcore |
| Point Identification | 1 Character | Bellcore |
| ZIP+4 Type | 1 Character | USPS |
| Secondary Address Unit Type | 1 Character | USPS |
| ZIP+6 Unique Match Flag | 1 Character | Assigned |

| Field | Size | Source |
| --- | --- | --- |
| Secondary Address Match Flag | 1 Character | Assigned |
| Matched DSF Flag | 1 Character | Assigned |
| DSF Delivery Type Code | 1 Character | USPS |
| NPANXX-ZZZZZ Overlap Flag | 1 Character | ACXIOM |

A step 1 of process 456 (FIG. 18A) updates telephone numbers based on changes in numbers administered by Bellcore. Beginning at a start state 801, process 456 moves to state 802 and reads a record from the Current Master Table 454. Moving to state 804, process 456 looks up the Master Table NPANXX in the Bellcore NPANXX Split file 344. Continuing to a decision state 806, process 456 determines if the NPANXX is found in the Split file 344 and the split date is prior or equal to the update date. If so, process 456 advances to state 810 wherein the Current Master Table NPANXX field is updated with the new NPANXX. If the NPANXX is not found in the Split file 344 or the NPANXX is found on the split file but the split date is after the update date, process 456 proceeds to state 808 to indicate that the Current Master Table NPANXX field is left unchanged. At the completion of updating the NPANXX field at state 810 or if the record is left unchanged at state 808, process 456 moves to state 812 wherein the Current Master Table record is written to the Updated Master Table 458. This process (states 802 through 812) is repeated until all records in the Current Master Table 454 have been read and processed as determined at a decision state 814. When all records in the Current Master Table 454 have been read and processed, process 456 moves to state 816 wherein the Updated Master Table 458 is re-indexed and becomes the Current Master Table 454. Process 456 then proceeds through an off-page connector A 817 to state 818 (FIG. 18B).

A step 2 of process 456 (FIG. 18B) accounts for changes in Spatial Keys based on ZIP Code changes by the USPS. Starting at state 818, process 456 reads a record from the Current Master Table 454. Proceeding to state 820, process 456 looks up the Master Table record's ZIP+4 in an enhanced USPS ZIPMOVE file 452. The ZIPMOVE file 452 includes ZIP Code changes by the USPS for ZIP+4 codes that have been moved and that have also had a change in finance number or last line name (city). The USPS ZIP+4 Move file is enhanced with ZIP+4 moves that have not changed either finance number or last line name by extracting a list of ZIP+4s that have changed in the current month from the USPS ZIP+4 Change file. All records with these ZIP+4s are extracted from the current Master Table, and USPS addresses are generated from the last month's USPS ZIP+4 address coding guide as described in process 540 (FIG. 10). This address file is then DPC coded using USPS CASS certified address coding software. The old DPC code and the new DPC codes are then compared and if they are different, these records are merged with the USPS ZIP+4 Move file. This new reformatted and deduped file is called the Enhanced ZIP Move file, which contains both ZIP+4 and DPC or ZIP+6 moves. DPC moves occur when a ZIP+4 does not change but, for example, an old building with the ZIP+4 is torn down and replaced with a new high-rise that requires its own ZIP+4.

Continuing at a decision state 822, process 456 determines if the ZIP+4 is found in the enhanced ZIPMOVE file 452 and the ZIP+4 move is applicable to the Current Master Table record DPC. If the ZIP+4 is found in the ZIPMOVE file 452, process 456 advances to state 826 wherein the Current Master Table ZIP+4 and ZIP+4 Type Fields are updated with the new ZIP+4 and ZIP+4 Type. If the ZIP+4 is not found in the ZIPMOVE file 452 or the ZIP+4 is found but is not applicable to the Current Master Table record DPC, as determined at decision state 822, the Current Master Table record is left unchanged. At the completion of updating the ZIP+4 and ZIP+4 type fields at state 826 or if the record is left unchanged at state 824, process 456 moves to state 828 wherein the Current Master Table record is written to the Updated Master Table 458. This process (states 818 through 828) is repeated until all records in the Current Master Table 454 have been read and processed as determined at a decision state 830. When all records in the Current Master Table 454 have been read and processed, process 456 moves to state 832 wherein the Updated Master Table 458 is copied to the Current Master Table 454. Process 456 then proceeds through an off-page connector B 833 to state 834 (FIG. 18C).

A step 3 of process 456 (FIG. 18C) concerns changes due to the connecting and disconnecting of telephone numbers with addresses based on consumers and businesses moving and adding or dropping existing telephone numbers or lines. Starting at state 834, process 456 initializes a variable mt_eof to zero, a variable dpu_eof to zero, and a variable old_dpu_rec to null (" "). The first two of these variables will be used to check for end of file conditions below. Variable old_dpu_rec is used to track the previous read of the Data Provider Updates (DPU) database 448, and is initially set to null before the first read of the database 448. Proceeding to a Read DPU Database function 836, process 456 reads the DPU database and returns either with a DPU record, which includes a 10 digit telephone number, or with the variable dpu_eof set to one if the end of the DPU database 448 has been reached. The DPU database 448 is indexed by 10 digit telephone number in ascending order. Function 836 will be further described in conjunction with FIG. 19 hereinbelow.

Proceeding to a Read Master Table (MT) function 838, process 456 reads a record in the Master Table 454 and returns either with the MT record, which includes a 10 digit telephone number, or with the variable mt_eof set to one if the end of the MT 454 has been reached. The Master Table 454 is indexed by 10 digit telephone number in ascending order. Function 838 will be further described in conjunction with FIG. 20 hereinbelow. After reading both the DPU database 448 and the MT 454, process 456 continues at a decision state 840 and compares the 10 digit telephone number field of the Master Table 454 against the 10 digit telephone number field of the DPU database 448. If the telephone numbers are equal, process 456 moves to state 842 to update the current MT record in memory from the dates, codes and sources of the one or more DPU records obtained from the last execution of the Read DPU function 836. Proceeding to a decision state 844, process 456 examines the updated record in memory to determine if a "Disconnect" transaction type indicator is active in the record. If the "Disconnect" indicator is not active, process 456 continues at a Write to Updated Master Table function 846, wherein the updated record is written to the Updated Master Table 458. The Write to Updated Master Table function 846 is shown in FIG. 21. At the completion of the write at function 846 or if the "Disconnect" indicator is active, as determined at decision state 844, process 456 continues at the Read DPU Database function 836, previously described above, to get the next one or more records (having a new 10 digit telephone number) from the DPU database 448. If the "Disconnect" indicator is active (decision state 844), the updated current MT record in memory is effectively deleted by not writing the record to the Updated Master Table 458 (function 846). Process 456 then proceeds to the Read Master Table function 838, previously described above, to get the next record from the MT 454. Moving to a decision state 850, process 456 determines if the variable mt_eof is set to one, which indicates that the end of the MT 454 has been reached.

If the end of the Master Table 454 has been reached, as determined at decision state 850, process 456 advances to a decision state 852 to determine if the variable dpu_eof is set to one, which indicates that the end of the DPU database 448 has been reached. If so, process 456 moves to state 854 wherein the Updated Master Table 458 is copied to the Current Master Table 454. Process 456 completes at an end state 856.

However, if the end of the DPU database 448 has not been reached, as determined at decision state 852, or alternatively, if the 10 digit telephone from the Master Table record is greater than the 10 digit telephone number from the DPU database (as determined at decision state 840), process 456 continues at state 860. At state 860, process 456 creates a Master Table record in memory from the one or more DPU database records obtained during the last execution of the Read DPU function 836. The DPU database 448 may have multiple records for a particular 10 digit telephone number. Each of these records has a date associated with the record data that is used to determine the most current data to use at state 860. For example, a early first DPU record may have a "Disconnect" indicator which would lead to deleting the record, but a later second DPU record indicates a "Connect" for the 10 digit telephone number, thus effectively negating the "Disconnect" from the first DPU record. Proceeding to a decision state 862, process 456 examines the created MT record in memory to determine if the "Disconnect" indicator is active in the record. If the "Disconnect" indicator is not active, process 456 continues at the Write to Updated Master Table function 846, wherein the created MT record is written to the Updated Master Table 458. The Write to Updated Master Table function 846 is shown in FIG. 21. At the completion of the write at function 846 or if the "Disconnect" indicator is active, as determined at decision state 862, process 456 continues at the Read DPU Database function 836, previously described above, to get the next one or more records (having a new 10 digit telephone number) from the DPU database 448. If the "Disconnect" indicator is active (decision state 862), the created MT record in memory is effectively deleted by not writing the record to the Updated Master Table 458 (function 846). Continuing at decision state 850, process 456 determines if the end of the Master Table 454 has been reached.

If the end of the Master Table 454 has not been reached, as determined at decision state 850, process 456 advances to a decision state 864 to determine if the variable dpu_eof is set to one, which indicates that the end of the DPU database 448 has been reached. If the end of the DPU database 448 has been reached, or alternatively, if the 10 digit telephone from the Master Table record is less than the 10 digit telephone number from the DPU database (as determined at decision state 840), process 456 moves to state 866. At state 866, the current Master Table record in memory is not changed but is passed on to the Write to Updated Master Table function 846, wherein the current MT record is written to the Updated Master Table 458. The Write to Updated Master Table function 846 is shown in FIG. 21. At the completion of the write at function 846, process 456 continues at the Read Master Table function 838, previously described above, to get the next record (having a new 10 digit telephone number) from the Master Table 454. Process 456 continues at the decision state 850 as previously described. Returning to decision state 864, if the end of the DPU database 448 has not been reached, process 456 loops back to the decision state 840 (previously described) to determine the relationship between the current 10 digit telephone from the Master Table record and the current 10 digit telephone number from the DPU database.

Figure 19:
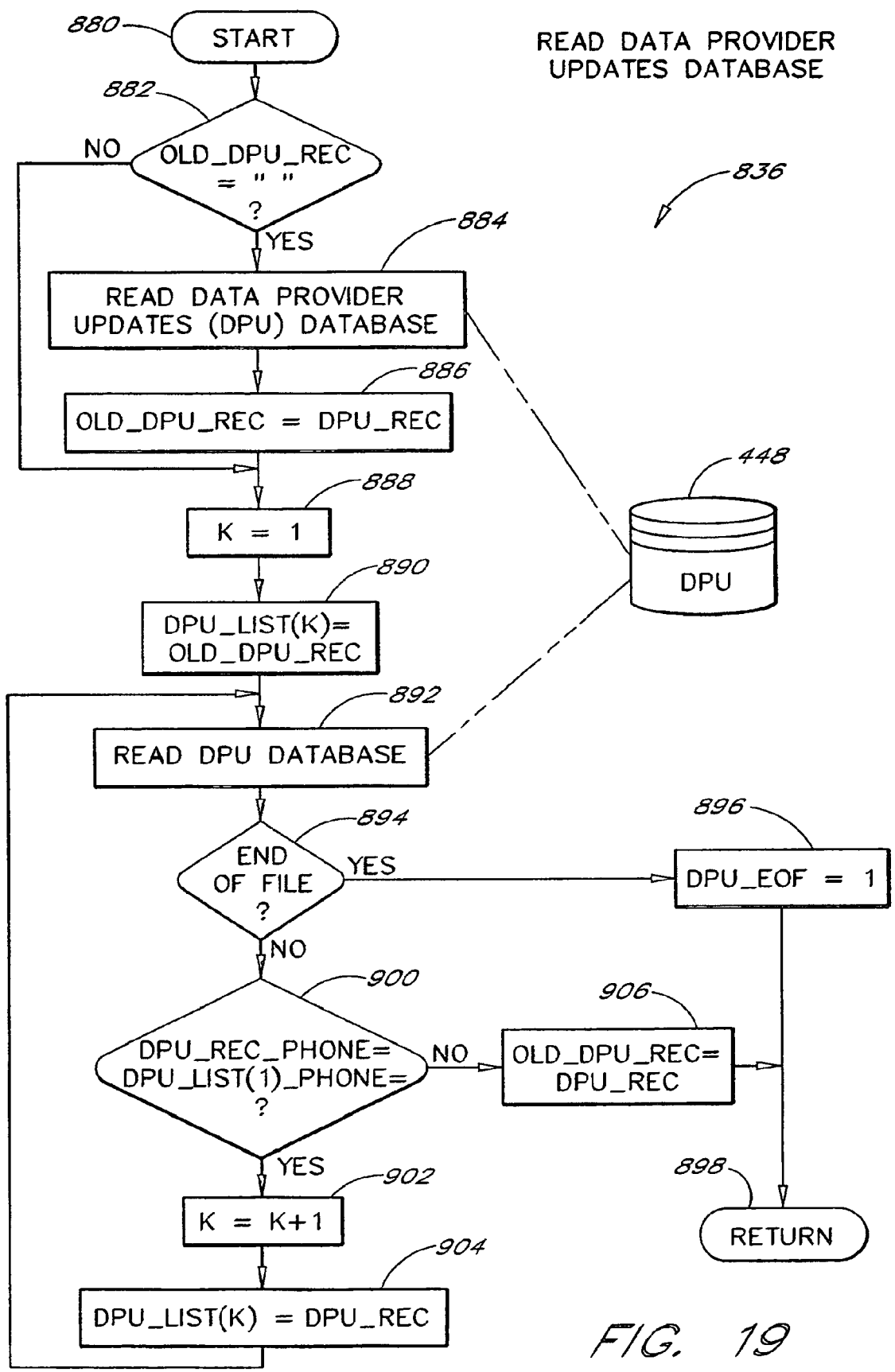
FIG. 19 is a flow diagram of the process for reading a Data Provider Updates database as indicated at function 836 in FIG. 18C.

Referring now to FIG. 19, the Read Data Provider Updates (DPU) Database function 836 will be further described. The Read DPU Database function 836 was previously defined in FIG. 18C. The DPU database 448 is indexed by 10 digit telephone numbers in ascending order.

Beginning at a start state 880, function 836 moves to a decision state 882 to determine if the variable old_dpu_rec is equal to null. If so, this indicates that this is the first call of function 836 and the first record in the Data Provider Updates database 448 is read at state 884. Proceeding to state 886, function 836 moves the DPU record read at state 884 into variable old_dpu_rec. At the completion of state 886, or if the variable old_dpu_rec was not equal to null at decision state 882 (indicating that this is not the first read of the DPU database), function 836 moves to state 888 and set a variable K equal to one. Continuing at state 890, function 836 moves the DPU record in old_dpu_rec into a list dpu_list at an address K of the list. Advancing to state 892, function 836 reads the next record in the DPU database 448 and checks for the end of the DPU database at a decision state 894. If the end of the database is reached, function 836 proceeds to state 896, sets the variable dpu_eof equal to one and returns at state 898 to process 456 (FIG. 18C).

If the end of the DPU database 448 is not reached, as determined at decision state 894, function 836 proceeds to a decision state 900. At decision state 900, function 836 determines if the 10 digit telephone number of the DPU record just read is equal to the 10 digit telephone number of the DPU record stored at address one of the dpu_list (from state 890). If so, this indicates that two consecutive DPU records have the same telephone number but likely have different data in the other fields of the record. In this situation, function 836 advances to state 902 and increments the address variable K by one. Continuing at state 904, function 836 moves the current DPU record (from state 892) into the dpu_list at the incremented address K (state 902). Function 836 then loops back to state 892 to read the next record in the DPU database 448. If this new record also has the same 10 digit telephone number as the 10 digit telephone number of the record previously stored at address one of dpu_list, the new record will be added into dpu_list at the next address K. This loop (states 892, 894, 900, 902 and 904) continues until the 10 digit telephone number of the next DPU record does not equal the 10 digit telephone number of the record previously stored at address one of dpu_list, as determined at decision state 900. When this happens, function 836 moves to state 906 and the new current DPU record read at state 892 is moved into old_dpu_rec. Function 836 then returns at state 898 with one or more records saved in the dpu_list to process 456 (FIG. 18C). During any one call of function 836, the number of records returned in the dpu_list is equal to the number of DPU database records having the same 10 digit telephone number.

Figure 20:
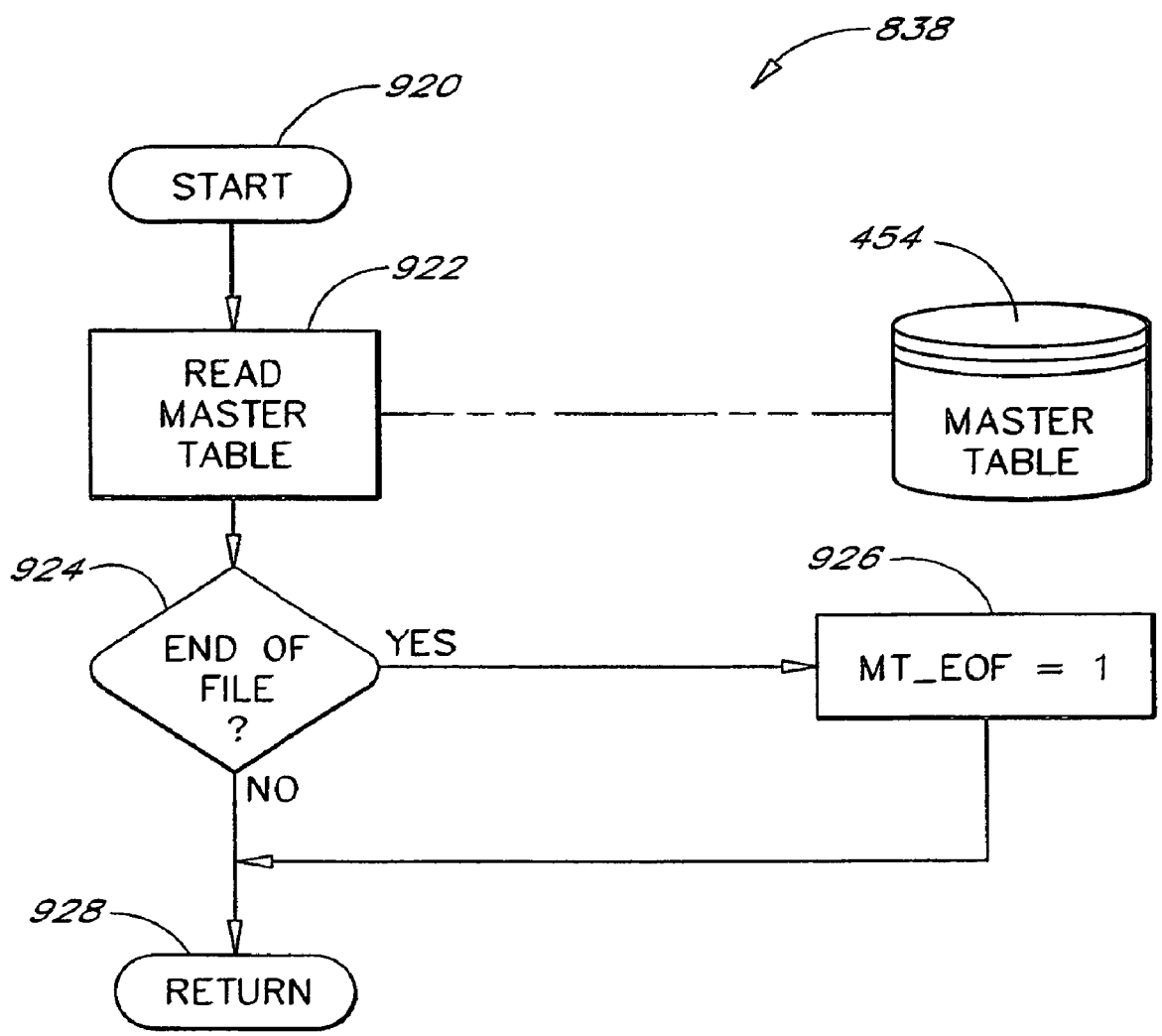
FIG. 20 is a flow diagram of the process for reading the Master Table as indicated at function 838 in FIG. 18C.
Figure 21:
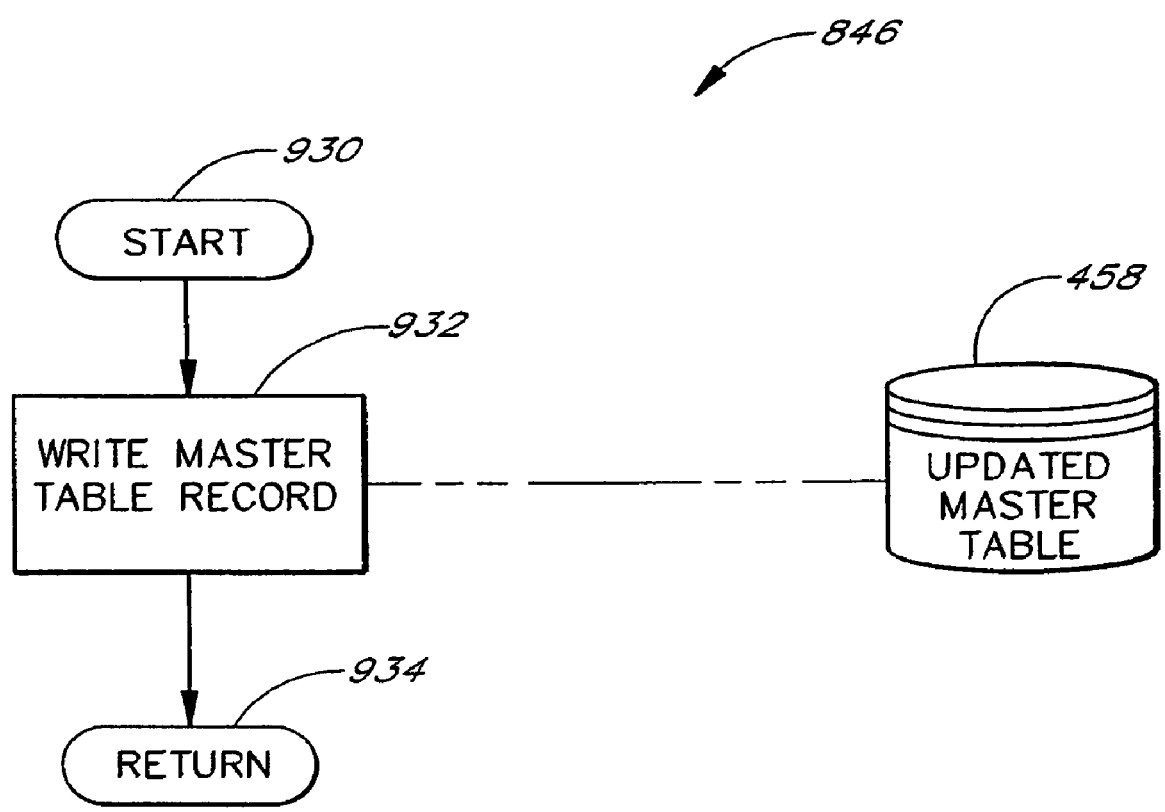
FIG. 21 is a flow diagram of the process for writing an Updated Master Table as indicated at function 846 in FIG. 18C.

Referring now to FIG. 20, the Read Master Table function 838 will be further described. The Read Master Table function 838 was previously defined in FIG. 18C. The Master Table 454 is indexed by 10 digit telephone numbers in ascending order. Beginning at a start state 920, function 838 moves to state 922 and reads a record in the Master Table 454. As is well known in database technology, the first call of function 838 by process 456 (FIG. 18C) will read the first MT record, and subsequent calls of function 838 will read the next record after the record read from a previous call of the function. Proceeding to a decision state 924, function 838 determines if the end of the Master Table 454 is reached. If so, function 838 moves to state 926 and sets the variable mt_eof equal to one to signify the end of file condition. At the completion of state 926, or if it is determined that the end of file was not reached at decision state 924, function 838 returns at state 928 to process 456 (FIG. 18C).

Referring now to FIG. 21, the Write to Updated Master Table function 846, defined in process 456 (FIG. 18C), will be described. Function 846 begins at a start state 930 and moves to state 932 to write a Master Table record to the Updated Master Table 458. Proceeding to a return state 934, function 846 returns to process 456 (FIG. 18C).

In the preferred implementation, the Master Table 102/454 only contains the single most current record for each telephone number with the exception of businesses. For businesses, it is sometimes necessary to keep both a mailing address, such as a PO Box, and a physical address Spatial Key. It would be obvious to one skilled in the art that the Master Table Update process 456 could be modified to write disconnected telephone numbers to create a historical Master Table with multiple records for each telephone number.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. In a Computer Telephone Integration (CTI) network, a call processing system, comprising:
    a master table of telephone numbers with linkage keys, wherein each linkage key is associated with a telephone number, and wherein the linkage key comprises a hierarchical match key encoding an address associated with the telephone number;
    means for capturing a telephone number for a first location;
    means for validating the captured telephone number;
    means for indexing the validated the telephone number into the master table to retrieve a linkage key of the telephone number;
    means for indexing the retrieved linkage key into at least one key indexed database to retrieve, by key linkage, information associated with the telephone number of the first location; and
    means for communicating the retrieved information associated with the telephone number of the first location to at least one recipient selected from a vanity number advertiser, a caller or a servicing location.

2. The system defined in claim 1, wherein the means for communicating the retrieved information provides a service to the recipient, the service comprising providing a selected servicing location telephone number to the network for automatically connecting the caller to the selected servicing location.

3. The system defined in claim 1, wherein the means for communicating the retrieved information provides a service to the recipient, the service comprising:
    determining that the caller requires operator assistance; and
    providing information required by the network to connect the caller to a vanity advertiser operator.

4. The system defined in claim 1, wherein the means for communicating the retrieved information provides a service to the recipient, the service comprising providing an informational item.

5. The system defined in claim 4, wherein the informational item comprises a caller provided telephone number; a dialed number identification service (DNIS) number; an automatic number identification (ANI) number; a caller ID number; a key of a caller/network provided telephone number; a list of one or more locations servicing the caller with a name and address of the servicing location and a distance to the location; days and hours of operation for one or more servicing locations; United States Postal Service (USPS) coding accuracy support system (CASS) certified address of the caller/network provided telephone number; latitude and longitude associated with the caller/network provided telephone number; latitude and longitude associated with the servicing location address; driveable directions from a location of the caller/network provided telephone number to a servicing location; driveable directions from a servicing location to a location of the caller/network provided telephone number; a map showing the location of the caller/network provided telephone number, the servicing location and a street network between the location of the caller/network provided telephone number and the servicing location; micro directions for the servicing location; servicing location daily specials; servicing location product availability, information and pricing; servicing location special events and start times; household information associated with the caller/network provided telephone number; individual information associated with the caller/network provided telephone number; business location information associated with the caller/network provided telephone number; government location information associated with the caller/network provided telephone number; business financial information associated with the caller/network provided telephone number; geographic information associated with the caller/network provided telephone number; property information associated with the caller/network provided telephone number; or vanity advertiser product announcements and promotions.

6. The system defined in claim 1, wherein the means for capturing a telephone number comprises a module for receiving network provided call information.

7. The system defined in claim 6, wherein the module for receiving network provided call information captures a number selected from an automatic number identification (ANI) number, a caller ID number, or a dialed number identification service (DNIS) number.

8. The system defined in claim 1, wherein the means for capturing a telephone number comprises:
    means for producing a prompt signal to invite a caller to provide input to the call processing system; and
    means for receiving said caller input.

9. The system defined in claim 8, wherein the means for producing a prompt signal comprises a voice response unit (VRU) utilizing a prompt comprising a recorded voice, computer synthesized text to speech, a message displayed on a videophone, or a live operator.

10. The system defined in claim 8, wherein the means for receiving said caller input comprises a Voice Response Unit (VRU) utilizing a recognition method selected from voice recognition or Dual Tone Multi-Frequency (DTMF) recognition.

11. The system defined in claim 8, wherein the means for receiving said caller input comprises a live operator, and wherein the live operator enters the input to the call processing system via a keyed input device.

12. The system defined in claim 1, wherein the linkage key is selected from a United States Postal Service Delivery Point Code, a 10 digit telephone number, a 15 digit census block number, an interleaved latitude and longitude coordinate pair, a V and H coordinate pair, a zip code, a United States Postal Service Delivery Point Code, or a derived coordinate pair from latitude and longitude.

13. The system defined in claim 1, wherein the key indexed database comprises a database selected from a spatial database, a geographic database, a United States Postal Service (USPS) address database, a household database, a individual database linked to a household database, a business locations database, a business financial database linked to a business locations database, a government locations database, a property database, a client table, or a service locations table linked to a client table.

14. The system defined in claim 1, wherein the means for communicating the retrieved information to at least one recipient comprises a during call communications process, a post call communications process, or a call parallel communications process.

15. The system defined in claim 14, wherein the during call communications process is configured to utilize a message type comprising a pre-recorded voice message received by a telephone, a synthesized text-to-speech voice received by a telephone, an operator voice received by a telephone after an operator obtains information from a CTI network visual display, text displayed on a videophone, a map displayed on a videophone, a picture displayed on a videophone, or information stored for post call retrieval.

16. The system defined in claim 14, wherein the post call communications process is configured to utilize a message type comprising a pre-recorded voice message received by a telephone, a synthesized text-to-speech voice received by a telephone, an operator voice received by a telephone after an operator obtains information from a CTI network visual display, text displayed on a videophone, a map displayed on a videophone, a picture displayed on a videophone, a facsimile, an E-mail, a mailing to a United States Postal Service (USPS) address, or a computer with a visual display connected to the CTI network.

17. The system defined in claim 14, wherein the call parallel communications process is configured to utilize a message type selected from a facsimile, an E-mail, or a computer with a visual display connected to the CTI network.

18. The system defined in claim 17, wherein the computer is connected to the CTI network by a connection type comprising a dedicated point-to-point connection, a dial-up modem connection to a CTI network modem server, or an Internet connection to a CTI Internet server.

19. In a Computer Telephone Integration (CTI) network, a method of call processing comprising the steps of:
   capturing a telephone number associated with a first location;
   indexing the captured telephone number into a master table of telephone numbers and associated linkage mechanisms, wherein each linkage mechanisms is associated with a telephone number and links the telephone number to a specific geographic location;
   retrieving a first linkage mechanism of the indexed telephone number;
   indexing the first linkage mechanism into at least one key indexed database;
   retrieving, by key linkage, information associated with the telephone number; and
   communicating the retrieved information associated with the telephone number to at least one call recipient that comprises a vanity number advertiser, a caller or a servicing location.

20. The method defined in claim 19, additionally comprising the step of validating the captured telephone number.

21. The method defined in claim 20, wherein the step of validating the captured telephone number comprises the steps of:
   comparing a NPANXX portion of the captured telephone number against an area code split file; and
   updating the NPANXX portion of the captured telephone number with a NEW NPANXX from the split file.

22. The method defined in claim 20, wherein the step of validating the captured telephone number comprises the steps of:
   indexing a NPANXX portion of the captured telephone number against a local exchange routing guide (LERG) file; and
   determining the validity of the captured telephone number using the information in the LERG file.

23. The method defined in claim 20, wherein the step of validating the captured telephone number comprises the steps of:
   comparing a NPANXX portion of the captured telephone number against a V&H coordinate file; and
   determining a type of the NPANXX and a location corresponding to the NPANXX.

24. The method defined in claim 20, wherein the step of validating the captured telephone number comprises the steps of:
   determining whether the telephone number includes a specified number of digits; and
   determining whether selected digits of the telephone number have values present in valid telephone numbers.

25. The method defined in claim 24, wherein the step of determining whether selected digits of the telephone number have values present in valid telephone numbers comprises the steps of:
   determining whether the second, third, and fifth through tenth digits each have a value between zero through nine inclusive; and
   determining whether each of the first digit and the fourth digit has a value between two through nine inclusive.

26. The method defined in claim 19, wherein the step of communicating the retrieved information to at least one call recipient comprises the steps of:
   determining a selected servicing location telephone number;
   providing the servicing location telephone number to the network; and
   automatically connecting the caller to the selected servicing location.

27. The method defined in claim 19, wherein the step of communicating the retrieved information to at least one call recipient comprises the steps of:
   determining that the caller requires operator assistance; and
   providing the network with the information required to connect the caller to a vanity advertiser operator.

28. The method defined in claim 19, wherein the step of capturing the telephone number comprises the steps of:
   producing a prompt signal to invite a caller to provide input; and
   receiving said caller input.

29. The method defined in claim 19, wherein the step of capturing the telephone number comprises the step of recognizing voice input.

30. The method defined in claim 19, wherein the linkage mechanism comprises a United States Postal Service Delivery Point Code.

31. The method defined in claim 19, wherein the key indexed database comprises a spatial database, a geographic database, a USPS address database, a household database, an individual database linked to a household database, a business locations database, a business financial database linked to a business locations database, a government locations database, a property database, a client table, or a service locations table linked to a client table.

32. In a Computer Telephone Integration (CTI) network, a method of generating a master telephone number to key database including a plurality of records, one of the records comprising a telephone number, a key, and information related to the telephone number and the key, the method comprising the steps of:

providing a master database of telephone numbers including a plurality of records, one of the records comprising a telephone number;

utilizing a data provider verification file, said file having a plurality of records, wherein one of the records comprises a telephone number, a key, and related data, wherein the key comprises a hierarchical match key encoding an address associated with the telephone number;

identifying a record from the master database of telephone numbers having a telephone number that matches a telephone number in a record of the data provider verification file;

appending a key and related data from the data provider verification file to the matching record of the master database of telephone numbers, thereby generating an intermediate database;

providing a master database of keys, comprising a plurality of records, one of the records comprising a key;

comparing a record from the intermediate database to records of the master database of keys to identify a key match; and appending the telephone number and the data provider related data from the record of the intermediate database to the matching record of the master key database, wherein the resultant record does not include the telephone number and the key from the data provider verification file.

33. The method defined in claim 32, wherein the related data comprises a linkage item, said linkage item indicative of a linkage between the telephone number and the key.

34. The method defined in claim 33, wherein the linkage item comprises a connected status code.

35. The method defined in claim 33, wherein the linkage item comprises a disconnected status code.

36. The method defined in claim 33, additionally comprising the step of updating one telephone number to key linkage item in the master telephone number to key database based on a change in the data provider verification file.

37. The method defined in claim 36, wherein the change in the data provider verification file is one of a plurality of changes made necessary by consumers and businesses moving, and thereby disconnecting and connecting telephone numbers.

38. The method defined in claim 36, wherein the change in the data provider verification file is one of a plurality of changes made necessary by a caller initially calling a service provider.

39. The method defined in claim 32, wherein the key comprises a United States Postal Service Delivery Point Code.

40. The method defined in claim 32, wherein the master database of telephone numbers is generated using a local exchange routing guide (LERG) file.

41. The method defined in claim 32, wherein the master database of telephone numbers is generated using a V&H Coordinate file.

42. The method defined in claim 32, wherein the master key database is generated using a United States Postal Service delivery sequence file (DSF).

43. The method defined in claim 32, wherein the master key database is generated using a United States Postal Service ZIP+4 file.

44. The method defined in claim 32, wherein an official nation-wide administrator is the source of the telephone numbers in the master telephone number to key database.

45. The method defined in claim 32, wherein a United States Postal Service is the source of the key in the master telephone number to key database.

46. The method defined in claim 32, additionally comprising the step of assigning a key to a record of the data provider verification file using United States Postal Service coding accuracy support system (CASS) certified software.

47. The method defined in claim 32, additionally comprising the step of updating a telephone number of the data provider verification file using a NPANXX split file.

48. The method defined in claim 32, additionally comprising the step of updating a telephone number in the master telephone number to key database based on changes in telephone numbers maintained by a nation-wide administrator.

49. The method defined in claim 32, additionally comprising the step of updating a key in the master telephone number to key database based on ZIP Code changes by a United States Postal Service.

50. In a Computer Telephone Integration (CTI) network, a method of call processing comprising the steps of:

capturing a first location telephone number during a call;
validating the captured telephone number;
indexing the validated telephone number into a master table of telephone numbers and associated hierarchical keys, wherein each hierarchical key is associated with a telephone number, and wherein each hierarchical key comprises a hierarchical match key encoding an address associated with the telephone number;
transferring the call to an exceptions handling operator if the validated number is not present in the master table;
obtaining an address associated with the validated telephone number;
assigning a first hierarchical key for the address;
connecting the call to a service location based on the first hierarchical key and a dialed telephone number; and
storing the validated telephone number and the first hierarchical key.

51. The method defined in claim 50, additionally comprising the steps of:

indexing the first hierarchical key into at least one key indexed database; and
retrieving, by key linkage, information to connect the call.

52. The method defined in claim 50, additionally comprising the step of updating the master table by use of the stored validated telephone number and the first hierarchical key.

53. The method defined in claim 50, additionally comprising the step of displaying the validated telephone number and the dialed telephone number to the operator.

54. The method defined in claim 50, additionally comprising the step of requesting the address associated with the validated telephone number.

55. The method defined in claim 50, additionally comprising the step of standardizing the address.

56. The method defined in claim 55, additionally comprising the step of validating the standardized address.

57. The method defined in claim 50, wherein the step of connecting the call comprises the steps of:
retrieving a list of service locations, each service location having an associated telephone number; and
selecting one of the service locations from the list.

58. In a Computer Telephone Integration (CTI) network, a method of maintaining a call processing master table, comprising the steps of:
capturing a first location telephone number during a call;
validating the captured telephone number;
indexing the validated telephone number into a master table of telephone numbers and associated records, the records comprising direct translator mechanisms, wherein each direct translator mechanism is associated with a telephone number and translates the telephone number to a specific geographic location associated with the telephone number;
transferring the call to an exceptions handling operator if the validated number is not present in the master table;
obtaining an address associated with the validated telephone number;
assigning a first of the associated records to the address;
storing the validated telephone number and the first of the associated records; and
updating the master table by use of the stored validated telephone number and the first of the associated records.

59. The method of claim 1 wherein the hierarchical match key can be used to retrieve data from one or more data sources coded having at least a part of the same hierarchical match key.

60. The method of claim 19 wherein each linkage mechanism also links a telephone number to household information for a household associated with the telephone number, the household information comprising information associated with members of the household.

61. The method of claim 32 wherein the hierarchical match key can be used to retrieve data from one or more data sources coded having at least a part of the same hierarchical match key.

62. The method of claim 50 wherein the hierarchical match key can be used to retrieve data from one or more data sources coded having at least a part of the same hierarchical match key.

63. The method of claim 58 wherein each direct translator mechanism also links a telephone number to household information for a household associated with the telephone number, the household information comprising information associated with members of the household.

* * * * *